(12) United States Patent
Ando et al.

(10) Patent No.: US 8,281,314 B2
(45) Date of Patent: Oct. 2, 2012

(54) INFORMATION PROCESSING DEVICE AND METHOD

(75) Inventors: Katsutoshi Ando, Kanagawa (JP); Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1164 days.

(21) Appl. No.: 12/109,918

(22) Filed: Apr. 25, 2008

(65) Prior Publication Data
US 2008/0288953 A1 Nov. 20, 2008

(30) Foreign Application Priority Data

May 17, 2007 (JP) ................................ 2007-131288

(51) Int. Cl.
G06F 9/46 (2006.01)
(52) U.S. Cl. .......................... 718/106; 718/102; 711/100
(58) Field of Classification Search .................. 382/190, 382/239, 240; 385/462; 375/240.01–240.29; 711/100; 718/100–108
See application file for complete search history.

(56) References Cited

U.S. PATENT DOCUMENTS

| | | | | |
|---|---|---|---|---|
| 5,838,821 A * | 11/1998 | Matsubara et al. | ........... | 382/190 |
| 6,100,931 A | 8/2000 | Mihara | | |
| 6,560,369 B1 * | 5/2003 | Sato | .............. | 382/239 |
| 7,302,516 B2 * | 11/2007 | Hanaki | ........ | 711/100 |
| 2001/0024529 A1 * | 9/2001 | Chao et al. | ..... | 382/240 |
| 2003/0086127 A1 * | 5/2003 | Ito et al. | ........ | 358/462 |

FOREIGN PATENT DOCUMENTS

| | | |
|---|---|---|
| JP | 6-59906 | 3/1994 |
| JP | 10-111792 | 4/1998 |
| JP | 2001-197500 | 7/2001 |
| JP | 2003-37725 | 2/2003 |
| JP | 2003-167751 | 6/2003 |
| JP | 2003-319185 | 11/2003 |
| JP | 2005-309912 | 11/2005 |
| JP | 2006-352531 | 12/2006 |
| WO | WO 2006/098377 A1 | 9/2006 |

OTHER PUBLICATIONS

U.S. Appl. No. 11/814,257, filed Jul. 18, 2007, Takahiro Fukuhara, et al.
Wim Sweldens, "The Lifting Scheme: A Custom-Design Construction of Biorthogonal Wavelets", Applied and Computational Harmonic Analysis, vol. 3, No. 2, 1996, pp. 186-200.
Christos Chrysafis, et al., "Line-Based, Reduced Memory, Wavelet Image Compression", IEEE Transactions on Image Processing, vol. 9, No. 3, Mar. 2000, pp. 378-389.

* cited by examiner

Primary Examiner — Sath V Perungavoor
Assistant Examiner — Nathnael Aynalem
(74) Attorney, Agent, or Firm — Oblon, Spivak, McClelland, Maier & Neustadt, L.L.P.

(57) ABSTRACT

An information processing device to execute programs performing encoding processing configured from a plurality of processes, includes: a program storage unit to store a plurality of encoding programs wherein an allocation pattern for a computation processing unit as to each of a plurality of processes comprising the encoding processes or the disposal pattern of memory utilized in the plurality of processes are each different; a program selecting unit to select an encoding program to be utilized in the event of executing encoding processing from a plurality of encoding programs stored with the program storage unit, as a utilized encoding program; and a program executing unit to execute the encoding processing employing a utilized encoding program selected with the program selecting unit.

19 Claims, 41 Drawing Sheets

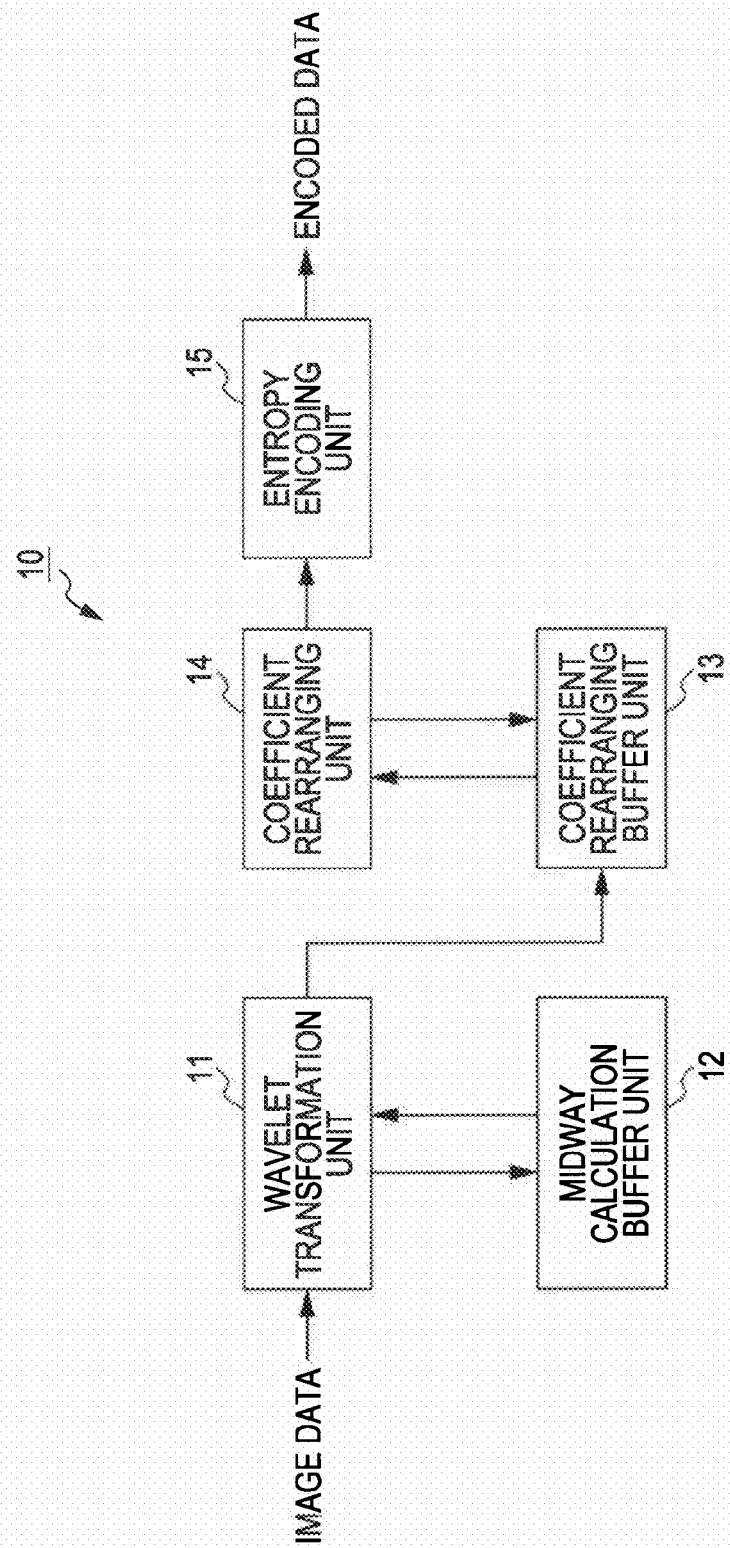

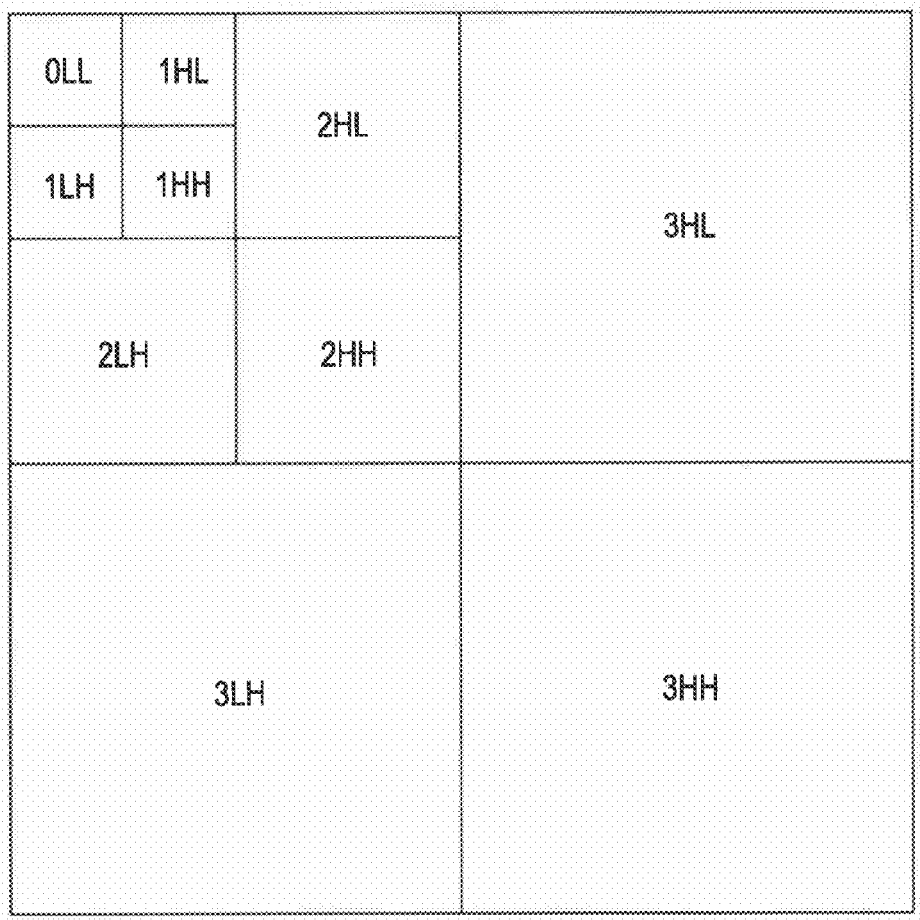

DIVISION LEVEL = 1

DIVISION LEVEL = 3

IMAGE INPUT

WAVELET TRANSFORMATION RESULTS (ANALYSIS)

IMAGE OUTPUT

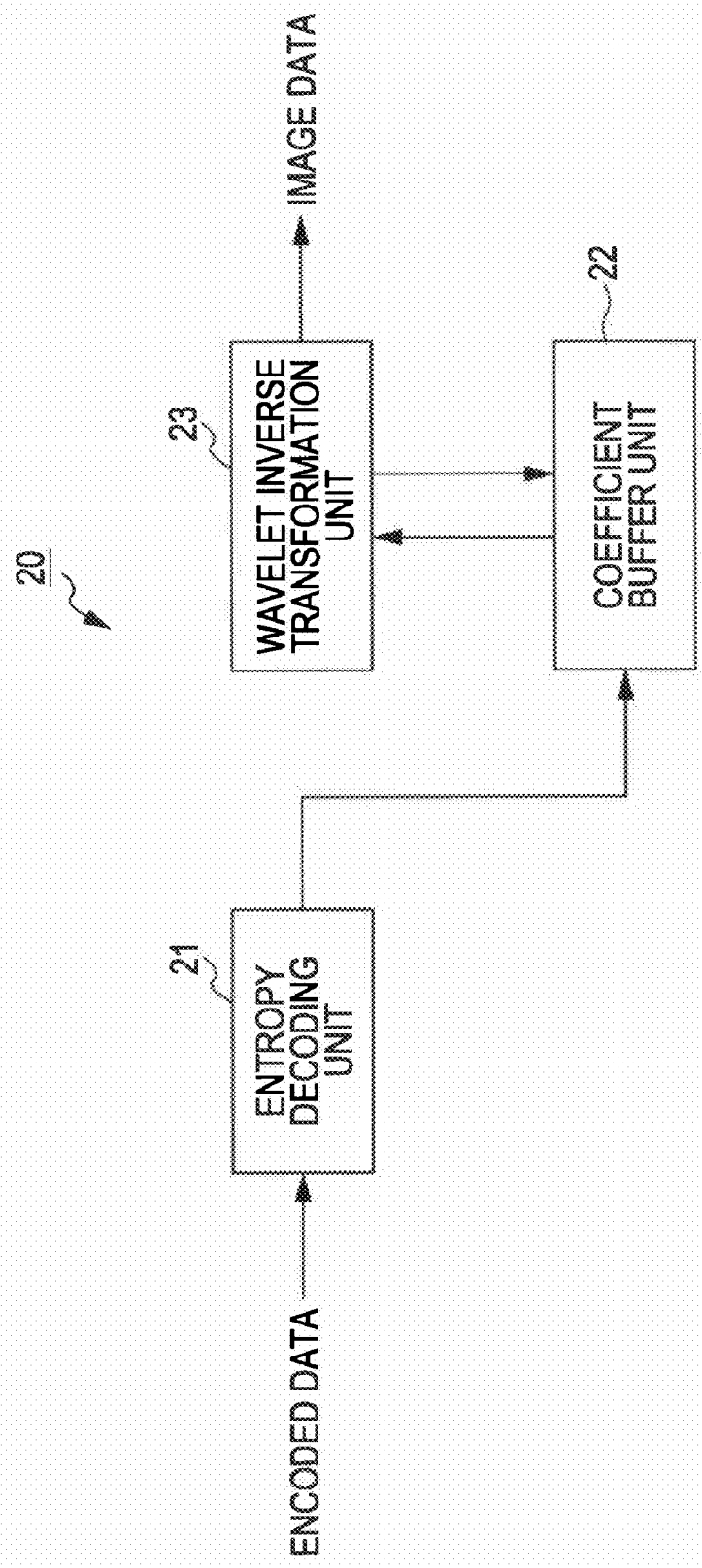

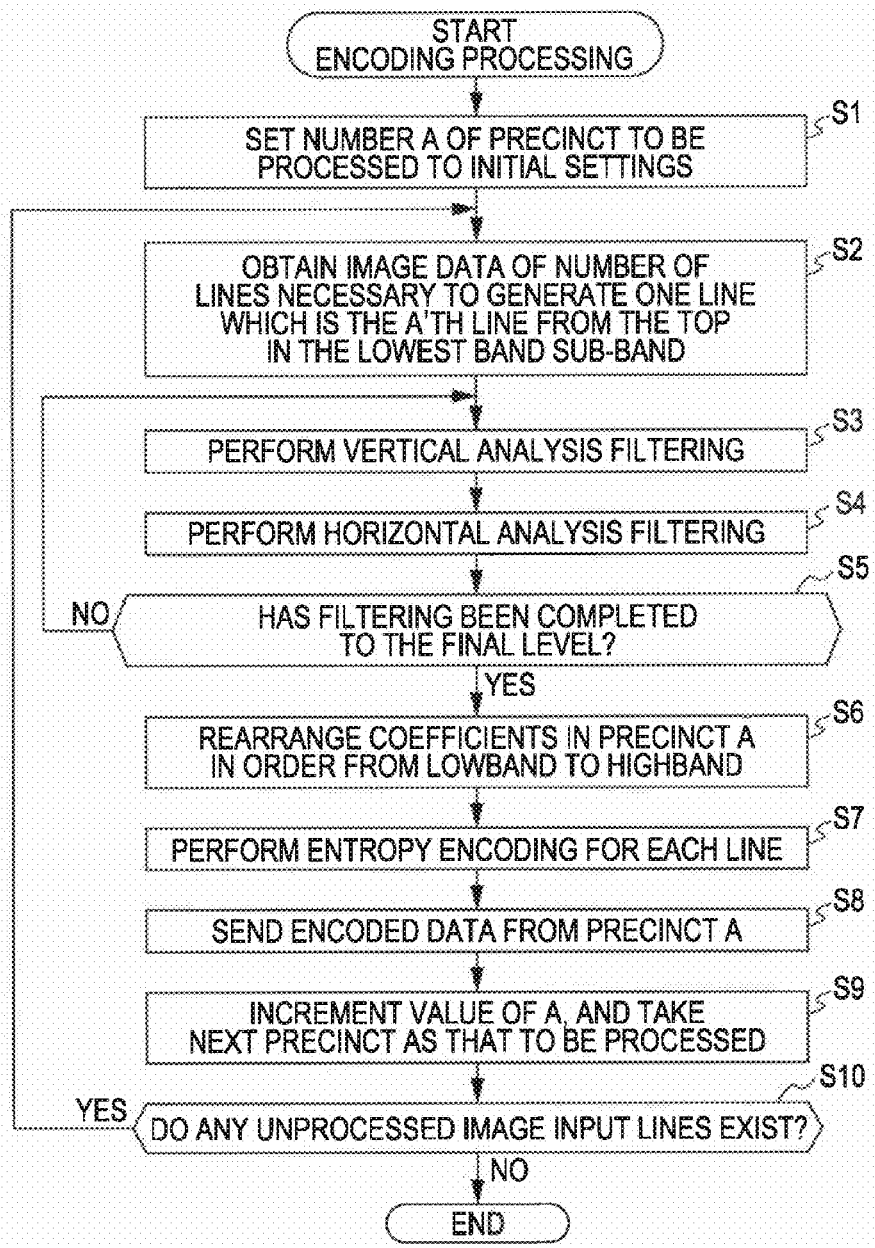

| BREAKDOWN NUMBER | 5×3 FILTER | 9×7 FILTER |
|---|---|---|
| 1 | 4 | 6 |
| 2 | 6 | 9 |
| 3 | 7 | 10.5 |
| 4 | 7.5 | 11.25 |
| 5 | 7.55 | 11.325 |

| BREAKDOWN NUMBER | 5×3 FILTER | 9×7 FILTER |
|---|---|---|
| 1 | 2 | 2 |
| 2 | 7 | 13 |
| 3 | 18.5 | 39.5 |
| 4 | 42.25 | 94.75 |
| 5 | 90.125 | 206.375 |

INFORMATION PROCESSING DEVICE AND METHOD

CROSS REFERENCES TO RELATED APPLICATIONS

The present invention contains subject matter related to Japanese Patent Application JP 2007-131288 filed in the Japanese Patent Office on May 17, 2007, the entire contents of which are incorporated herein by reference.

BACKGROUND OF THE INVENTION

1. Field of the Invention

The present invention relates to an information processing device and method, and particularly relates to an information processing device and method wherein hardware resources can be appropriately allocated to a software encoding unit and software decoding unit under an increased variety of conditions.

2. Description of the Related Art

Heretofore, there have been encoding units which subject image data to compression encoding (e.g. Japanese Unexamined Patent Application Publication No. 9-261633). Such encoding units can be realized with hardware, but can also be realized with a software program. In the case of a software encoding unit, for example, with a personal computer or the like, a software program is loaded into RAM (Random Access Memory), and the various processing included in the software program is executed with the CPU (Central Processing Unit). Also, encoded image data, encoded data generated by encoding, and various types of data generated during processing are held in the RAM as appropriate.

Similarly, there have been software decoding units which are decoding units that realize decoding of encoded data wherein image data is subjected to compression encoding using a software program. As with the software encoding units, with the software decoding units also, a software program is loaded into the RAM on a personal computer or the like, and various processing included in the software program is executed by the CPU. Also, the encoded data to be decoded, the image data to be decoded, and various types of data generated during processing are held in the RAM as appropriate.

In the case of a normal personal computer, between the CPU and RAM is connected by a shared bus. Generally, an operation frequency of a shared bus is low compared to an operation frequency of the CPU, and also the shared bus is used to transfer data between other devices. Accordingly, the RAM provided externally to the CPU has a large capacity, but the speed of reading or writing data is basically slower than the operation speed of the CPU. Also, depending on the congestion state of the shared bus, delays may become greater.

Conversely, a cache memory provided internally in the CPU is configured with a high-speed operating SRAM (Static Random Access Memory) or the like, and in a normal case, the operation frequency is higher than a shared bus, enabling reading or writing at a higher speed than with a RAM external to the CPU. Also, the cache memory is exclusively used by the CPU thereof, so the CPU can perform reading or writing at high speed without influence from the data transferring between other devices. However, from the point of cost, the cache memory capacity is limited to be small compared to a RAM provided external to the CPU. Also, in recent years, there have been computers wherein multiple CPUs operate in parallel.

In the case of software encoding units or software decoding units, allocating hardware resources such as CPU or memory is necessary, but it is necessary to allocate the hardware resources such as CPU or memory as to encoding processing and decoding processing appropriately so that the encoding processing or decoding processing efficiency is not reduced unnecessarily.

SUMMARY OF THE INVENTION

However, in recent years, with the configuration of hardware resources such as the CPU or memory becoming more complex, readily allocating hardware resources has become difficult. Also, there have been cases wherein features demanded of software encoding units or software decoding units differed based on various conditions such as image data content (image), encoding method, decoding method, usable hardware resources, or use objectives and the like, whereby appropriate allocating patterns for hardware resources may differ.

In the case of a normal personal computer, there are cases wherein the operating system (hereafter abbreviated to "OS") performs hardware resource allocation, even if the software program does not specify the hardware resources, but allocating with consideration for the features demanded of the software encoding unit or software decoding unit is not often performed, the hardware resources are not necessarily allocated appropriately so as to improve processing efficiency as the software encoding unit or software decoding unit, and in some cases processing efficiency may be unnecessarily reduced or delay time may be unnecessarily increased.

There has been found a need to enable the hardware resources to be appropriately allocated as to a software encoding unit or software decoding unit under increasingly varied conditions.

According to an embodiment of the present invention, an information processing device to execute programs performing encoding processing configured from multiple processes includes: program storage means to store multiple encoding programs wherein an allocation pattern for a computation processing unit as to each of multiple processes comprising the encoding processes or the disposal pattern of memory utilized in the multiple processes are each different; program selecting means to select an encoding program to be utilized in the event of executing encoding processing from multiple encoding programs stored with the program storage means, as a utilized encoding program; and program executing means to execute the encoding processing employing a utilized encoding program selected with the program selecting means.

The program selecting means may select the utilized encoding program in accordance with the number of usable computation processing units or memory capacity stored in the computing processing units.

The program selecting means may select the utilized encoding program in accordance with image parameters of image data to be subjected to encoding processing.

The program selecting means may select the utilized encoding program in accordance with encoding parameters in the event of encoding the image data.

The program selecting means may select the utilized encoding program in accordance with the type of codec indicating an encoding processing method.

The encoding processing may be encoding processing following the MPEG (Moving Picture Experts Group) 2 standard or H.264/AVC (Advanced Video Coding) standard.

The encoding processing may be encoding processing following the JPEG (Joint Photographic Experts Group) 2000 standard.

The multiple processes making up the encoding processing may include: filtering processing to perform filtering processing hierarchically as to the image data and generate multiple sub-bands made up of coefficient data broken down by each frequency band; intermediate data holding processing to hold intermediate data generated midway in the filtering processing; coefficient holding processing to hold the coefficient data generated with the filtering processing; coefficient rearranging processing to rearrange the coefficient data held by the coefficient holding processing so as to output the coefficient data in a predetermined order; and entropy encoding processing to entropy encode the coefficient data, the order of which has been rearranged by the coefficient rearranging processing.

The allocating pattern may include: a pattern to execute the filtering processing, the coefficient rearranging processing, and the entropy encoding processing by using a shared computation processing unit.

The allocating pattern may include: a pattern to execute the filtering processing, the coefficient rearranging processing, and the entropy encoding processing by using the shared computation processing unit as to any of luminance components and color difference components of the image data.

The allocating pattern may include: a pattern to execute the filtering processing, the coefficient rearranging processing, and the entropy encoding processing by using different computation processing units for processing as to luminance components of the image data and for processing as to color difference components of the image data.

An arrangement may be made wherein the allocating pattern includes: a pattern to execute the filtering processing, the coefficient rearranging processing, and the entropy encoding processing by using different computation processing units.

Also provided is an information processing method for an information processing device to execute programs performing encoding processing configured from multiple processes, comprising the steps of: selecting an encoding program to be utilized in the event of executing encoding processing from multiple encoding programs which are stored beforehand in a storage unit, the allocation pattern for the computation processing unit or disposal pattern of memory utilized in the multiple processes as to each of multiple processing making up the encoding processes are each different, as a utilized encoding program; and executing the encoding processing by employing the selected utilized encoding program.

With the above configuration, multiple encoding programs each with different allocation patterns of the computation processing unit as to multiple processes making up the encoding processing, or disposal patterns for memory used with the multiple processes, are stored, and of the multiple encoding programs, the encoding program used in the event of executing encoding processing is selected as the utilized encoding program, whereby the selected utilized encoding program is used to execute encoding processing.

According to an embodiment of the present invention, an information processing device to execute decoding programs performing decoding processing configured from multiple processes includes: program storage means to store multiple decoding programs wherein an allocation pattern for a computation processing unit as to each of multiple processes comprising the decoding processing or the disposal pattern of memory utilized in the multiple processes are each different; program selecting means to select a decoding program to be utilized in the event of executing decoding processing from multiple decoding programs stored with the program storage means, as a utilized decoding program; and program executing means to execute the decoding processing employing a utilized decoding program selected with the program selecting means.

The multiple processes making up the decoding processing may include: entropy decoding processing to entropy decode the encoded data and generate coefficient data for the multiple sub-bands subjected to hierarchical filtering processing as to image data and broken down by frequency band; coefficient holding processing to hold the coefficient data generated by the entropy decoding processing; and filtering processing to perform filtering processing by reading out the coefficient data held by the coefficient holding processing, and generate image data by synthesizing the coefficient data of the multiple sub-bands broken down by frequency bands.

Also provided is an information processing method for an information processing device to execute decoding programs performing decoding processing configured from multiple processes, comprising the steps of: selecting a decoding program to be utilized in the event of executing decoding processing as a utilized decoding program from multiple decoding programs which are stored beforehand in a storage unit, the allocation pattern for a computation processing unit or disposal pattern of memory utilized in the multiple processes as to each of the multiple processes making up the decoding processing, of which each pattern is different; and executing the decoding processing by employing the selected utilized decoding program.

With the above configuration, multiple decoding programs each with different allocation patterns of the computation processing unit as to multiple processes making up the decoding processing, or disposal patterns for memory used with the multiple processes, are stored, and of the multiple decoding programs, the decoding program used in the event of executing decoding processing is selected as the utilized decoding program, whereby the selected utilized decoding program is used to execute decoding processing.

According to the present invention, a software encoding unit or a software decoding unit can be implemented on a computer. Particularly, hardware resources can be more appropriately allocated to the software encoding unit or software decoding unit under increasingly varied conditions.

BRIEF DESCRIPTION OF THE DRAWINGS

FIG. 1 is a block diagram illustrating a configuration example of an encoding unit to which an embodiment of the present invention has been applied;

FIG. 2 is a schematic drawing for schematically describing wavelet transformation;

FIG. 6 is a block diagram illustrating a configuration example of the decoding unit to which an embodiment of the present invention has been applied;

FIG. 7 is a flowchart describing an example of flow of encoding processing;

FIG. 31 is a diagram illustrating a configuration example of a wavelet transformation relation table;

FIG. 32 is a diagram illustrating a configuration example of a coefficient rearranging relation table;

DESCRIPTION OF THE PREFERRED EMBODIMENTS

Figure 3A:
FIG. 3 is a schematic drawing for schematically describing wavelet transformation.

FIG. 1 is a block diagram showing a configuration example of an encoding unit to which an embodiment of the present invention has been applied. An encoding unit 10 shown in FIG. 1 is made up of a software program, and schematically shows a function wherein a software encoding unit which encodes image data to generate encoded data is realized by the CPU (Central processing Unit) of a predetermined information processing device executing the software program. As shown in FIG. 1, the encoding unit 10 has the functions of a wavelet transformation unit 11, midway calculation buffer unit 12, coefficient rearranging buffer unit 13, coefficient rearranging unit 14, and entropy encoding unit 15.

The image data input in the encoding unit 10 is temporarily accumulated in the midway calculation buffer unit 12 via the wavelet transformation unit 11. The wavelet transformation unit 11 performs wavelet transformation as to the image data accumulated in the midway calculation buffer unit 12. That is to say, the wavelet transformation unit 11 reads the image data from the midway calculation buffer unit 12 and performs filtering processing with an analyzing filter to generate coefficient data of lowband components and highband components, and stores the generated coefficient data in the midway calculation buffer unit 12. The wavelet transformation unit 11 has a horizontal analyzing filter and a vertical analyzing filter, and performs analyzing filter processing as to an image data group, in both the screen horizontal direction and screen vertical direction. The wavelet transformation unit 11 rereads the coefficient data of lowband components which are stored in the midway calculation buffer unit 12, and performs filtering processing as to the read coefficient data with the analyzing filter to generate coefficient data of highband components and lowband components. The generated coefficient data is stored in the midway calculation buffer unit 12.

Following repeating this processing until the division level arrives at a predetermined level, the wavelet transformation unit 11 reads coefficient data from the midway calculation buffer unit 12, and writes the read coefficient data into the coefficient rearranging buffer unit 13.

The coefficient rearranging unit 14 reads the coefficient data, written into the coefficient rearranging buffer unit 13, in a predetermined order, and supplies this to the entropy encoding unit 15. The entropy encoding unit 15 quantizes the supplied coefficient data with a predetermined method, and encodes this with a predetermined entropy encoding method such as Huffman coding or arithmetic coding, for example. The entropy encoding unit 15 outputs the generated encoded data externally to the encoding unit 10.

The processing performed with the wavelet transformation unit 11 in FIG. 1 will be described in greater detail. First, wavelet transformation will be generally described. With the wavelet transformation as to the image data, as shown schematically in FIG. 2, processing which divides the image data into bands with high spatial frequency and bands with low spatial frequency is repeated recursively as to the data with low spatial frequency bands which are obtained as a result of the division. Thus, driving the data with low spatial frequency bands into smaller regions enables efficient compression encoding.

Note that FIG. 2 is an example in the case wherein dividing processing of the image data is repeated 3 times, dividing the region L of the lowband components and the region H of the highband components into the lowest band component region, wherein the division level shows the total number of division levels to be 3. In FIG. 2, "L" and "H" respectively indicate lowband components and highband components, and the order of "L" and "H" is shown such that the front side thereof indicates the band of the result of division in the horizontal direction, with the back side indicating the band of the result of division in the vertical direction. Also, the numbers preceding "L" and "H" denote the hierarchical level of region therein, with the hierarchical levels of the lowband components being denoted by smaller values. The greatest value of the hierarchical level indicates the division level (division number) at the time of the wavelet transformation.

Also, as we can see from the example in FIG. 2, processing is performed hierarchically from the region at the lower right of the screen to the region at the upper left, driving in the lowband components. That is to say, with the example in FIG. 2, the region at the lower right of the screen becomes region 3HH which has the least lowband components (contains the most highband components), the region of the screen on the upper left divided in four regions are further divided into four, and of these regions divided into four, the region at the upper left is further divided into four. The region on the farthest upper left corner becomes 0LL which contains the most lowband components.

Figure 3B:
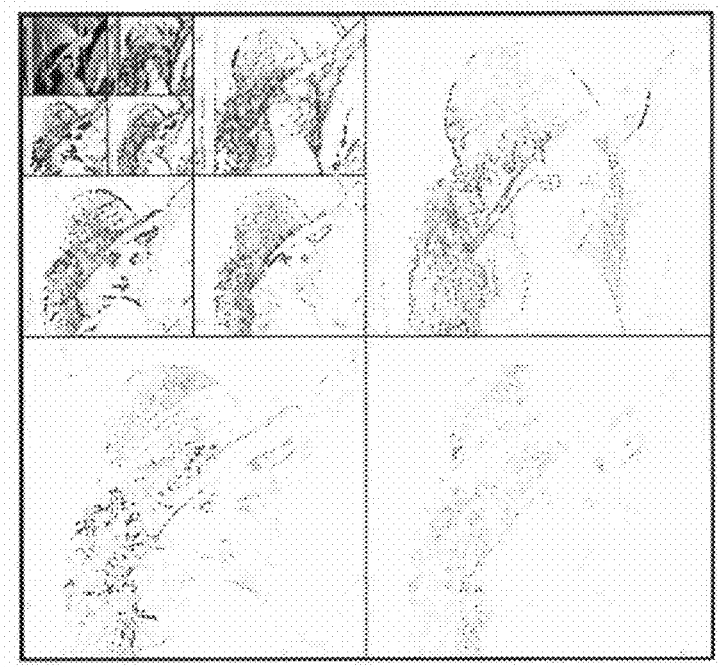

Repeatedly performing transformation and division as to the lowband components is for the reason that image energy is concentrated in the lowband components. This can be understood from the sub-bands forming as shown in FIG. 3B, as the division level advances from the state of division level=1 as one example shows in FIG. 3A to the state of division level=3 as one example shows in FIG. 3B. For example, the division level of the wavelet transformation in FIG. 2 is 3, and consequently, ten sub-bands are formed.

The wavelet transformation unit 11 normally employs a filter bank made up of a lowband filter and highband filter to perform the processes as described above. Note that a digital filter normally has an impulse response of the decoding tap length, i.e. filter coefficient, so as much input image data or coefficient data as can be subjected to filtering processing needs to be buffered beforehand. Also, similar to the case of performing wavelet transformation over multiple stages, as many wavelet transformation coefficients as can be subjected to filtering processing needs to be buffered beforehand.

As a specific example of wavelet transformation, a method using a 5×3 filter will be described. The method using a 5×3 filter is also employed with JPEG (Joint Photographic Experts Group) 2000, and is an excellent method from the point that wavelet transformation can be performed with few filter taps.

The 5×3 filter impulse response (Z transform expression) is made up of a lowband filter $H_0(z)$ and a highband filter $H_1(z)$, as shown in the following Expression (1) and Expression (2).

$$H_0(z)=(-1+2z^{-1}+6z^{-2}+2z^{-3}-z^{-4})/8 \quad (1)$$

$$H_1(z)=(-1+2z^{-1}+z^{-2})/2 \quad (2)$$

According to Expression (1) and Expression (2), the coefficients for lowband components and highband components can be directly computed. Here, by using a lifting technique, calculations for the filtering processing can be reduced.

Figure 4:
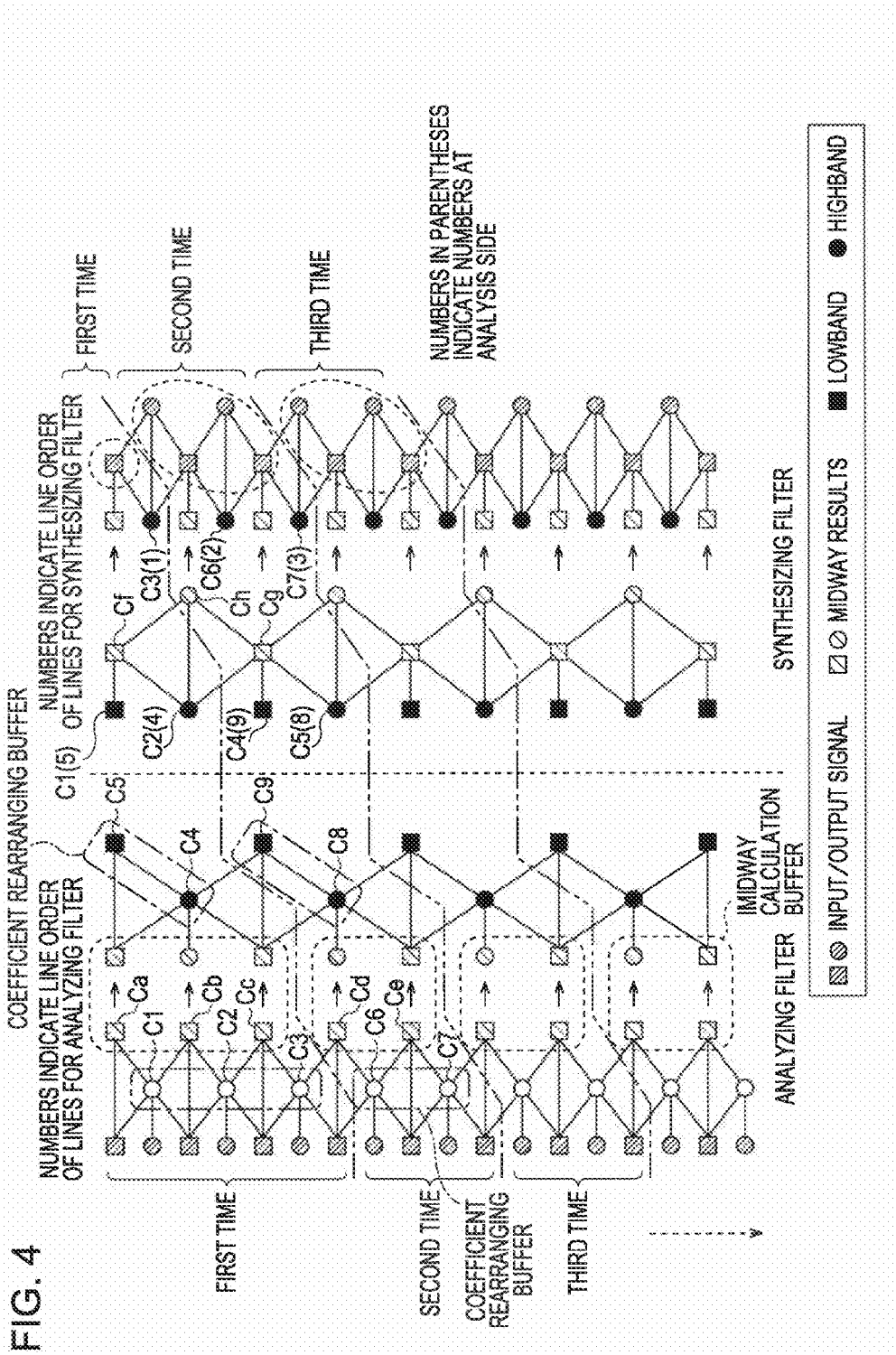
FIG. 4 is a schematic drawing illustrating an example of performing filtering by lifting with a 5×3 filter, to division level=2.

Next, the wavelet transformation method will be described more specifically. FIG. 4 shows an example of executing filtering processing using lifting with a 5×3 filter to the division level=2. Note that in FIG. 4, the portion shown as an analyzing filter on the left side of the diagram is a filter of the wavelet transformation unit 11 in FIG. 1. Also, the portion shown as a synthesizing filter on the right side of the diagram is a filter of a wavelet inverse transformation unit to be described later.

Note that with the description below, one line is configured with a display device or the like for example, scanning the pixels from the left edge of the screen to the right edge thereof, with the pixel at the farthest upper left of the screen as the lead, and scanning is performed from the upper edge of the screen to the lower edge thereof for each line to configure one screen.

In FIG. 4, the column on the left edge shows pixel data, which are in positions corresponding to the lines of the original image data, arranged in the vertical direction. That is to say, the filtering processing with the wavelet transformation unit 11 is performed by employing a vertical filter to scan the pixels vertically across the screen. The first column through third column from the left edge show filtering processing at division level=1, and the fourth column through sixth column show filtering processing at division level=2. The second column from the left edge shows highband component output based on the pixels of the original image data at the left edge, and the third column from the left edge shows lowband component output based on original image data and highband component output. The filtering processing with division level=2, as shown in the fourth through sixth columns from the left edge, is processed as to the output of the filtering processing with division level=1.

With the division level=1 filtering processing, as a filtering processing of a first stage, highband component coefficient data is computed based on the pixels of the original image data, and as a filtering processing of the second stage, lowband component coefficient data is computed based on the highband component coefficient data computed with the first stage filtering processing and the pixels of the original image data. The filtering processing of an example of division level=1 is shown in the first through third columns on the left side (analyzing filter side) in FIG. 4. The computed highband component coefficient data is stored in the coefficient rearranging buffer unit 13 in FIG. 1. Also, the computed lowband component coefficient data is stored in the midway calculation buffer unit 12 in FIG. 1.

In FIG. 4, the coefficient rearranging buffer unit 13 is shown as the portion surrounded by a dashed-dotted line, and the midway calculation buffer unit 12 is shown as the portion surrounded by a dotted line.

Filtering processing for division level=2 is performed based on the results of the filtering processing for division level=1 which is held in the midway calculation buffer unit 12. With the filtering processing for division level=2, the coefficient data computed as lowband component coefficients in the filtering processing for division level=1 is viewed as coefficient data containing lowband components and highband components, so filtering processing similar to that of division level=1 is performed. The highband component coefficient data and lowband component coefficient data computed with the filtering processing in division level=2 is stored in the coefficient rearranging buffer unit 13.

With the wavelet transformation unit 11, filtering processing such as described above is performed for each of the horizontal direction and vertical direction of the screen. For example, first, filtering processing for division level=1 is performed in the horizontal direction, and the generated highband component and lowband component coefficient data is stored in the midway calculation buffer unit 12. Next, filtering processing for division level=1 is performed in the vertical direction as to the coefficient data stored in the midway calculation buffer unit 12. With the processing for division level=1 in the horizontal and vertical directions, the region HH and region HL are made up respectively from coefficient data wherein highband components are further divided into highband components and lowband components, and the region LH and region LL are made up respectively from coefficient data wherein lowband components are further divided into highband components and lowband components, thus forming four regions.

With division level=2, filtering processing as to the lowband component coefficient data generated in division level=1 is performed for each of the horizontal direction and vertical direction. That is to say, with the division level=2, the region LL formed by diving the division level=1 is further divided into four, thus further forming region HH, region HL, region LH, and region LL within region LL.

The wavelet transformation unit 11 performs filtering processing hierarchically with wavelet transformation over multiple times, dividing into processing for every few lines in the vertical direction of the screen. In the example in FIG. 4, the processing at the first time which is the processing from the first line on the screen performs filtering processing for seven lines, and the processing of the second time and thereafter which is processing from the eighth line performs filtering processing for every four lines. The number of lines is based on the number of lines needed for one line worth of lowest band components to be generated after dividing into the two which are the highband components and lowband components.

Note that hereafter, a collection of lines containing other sub-bands necessary to generate one line worth of lowest band components (coefficient data of one line worth of lowest band component sub-band) will be called a "precinct" (or line block). Here a line indicates one line worth of pixel data or coefficient data formed within a picture or field, or within each sub-band, corresponding to the image data before wavelet transformation. That is to say, precinct (line block) indicates a pixel data group of several lines worth necessary to generate the coefficient data of one line worth of lowest band component sub-band after wavelet transformation, or a coefficient data group for each sub-band obtained by subjecting the pixel data group to wavelet transformation, in the original image data before wavelet transformation.

According to FIG. 4, the coefficient C5 obtained from the filtering processing results of division level=2 is computed based on the coefficients C4 and $C_a$ stored in the midway calculation buffer unit 12, and the coefficient C4 is computed based on the coefficients $C_a$, $C_b$, and $C_c$ which are stored in the midway calculation buffer unit 12. Further, the coefficient $C_c$ is computed based on the coefficients C2 and C3 which are stored in the coefficient rearranging buffer unit 13 and the pixel data of the fifth line. Also, the coefficient C3 is computed based on pixel data of the fifth through seventh lines. Thus, in order to obtain the lowband component coefficient C5 with division level=2, the pixel data of the first through seventh lines are necessary.

Conversely, with the filtering processing of the second time and thereafter, coefficient data which is already computed with the filtering processing through the previous time and is stored in the coefficient rearranging buffer unit 13 can be used, so fewer lines are necessary.

That is to say, according to FIG. 4, of the lowband component coefficient obtained with the filtering processing results of division level=2, the coefficient C9, which is the coefficient following the coefficient C5, is computed based on the coefficients C4 and C8 and on the coefficient $C_c$ stored in the midway calculation buffer unit 12. The coefficient C4 is already computed with the above-described filtering processing at the first time, and is stored in the coefficient rearranging buffer unit 13. Similarly, the coefficient $C_c$ is already computed with the above-described filtering processing at the first time, and stored in the midway calculation buffer unit 12. Accordingly, the filtering processing of the second time only has new filtering processing for computing the coefficient C8. The new filtering processing is performed further using the eighth through eleventh lines.

Thus, the filtering processing of the second time and thereafter can use data which is computed with the filtering processing through the previous time and stored in the midway calculation buffer unit 12 and coefficient rearranging buffer unit 13, so the processing thereof only needs to be performed for every four lines respectively.

Note that in the case that the line numbers on the screen do not match the number of encoded lines, the lines of the original image data can be replicated with a predetermined method so that the number of lines match the number of encoded lines, whereby filtering processing is performed.

Thus, by hierarchically performing filtering processing for only as much as coefficient data of one line worth of lowest band components can be obtained, by dividing the lines across the entire screen in the multiple times (in increments of precincts), a decoded image can be obtained with little delay in the event that encoded data is transferred.

In order to perform wavelet transformation, a first buffer used to execute the wavelet transformation itself, and a second buffer for storing the coefficients generated during the processing to a predetermined division level, are necessary. The first buffer corresponds to the midway calculation buffer unit 12, and is shown in FIG. 4 as surrounded by a dotted line. Also, the second buffer corresponds to the coefficient rearranging buffer unit 13, and is shown in FIG. 4 as surrounded by a dashed-dotted line. The coefficients stored in the second buffer are used in the event of decoding, so are subjected to entropy encoded processing for a later stage.

Next, the processing of the coefficient rearranging unit 14 in FIG. 1 will be described. As described above, the coefficient data computed with the wavelet transformation unit 11 is stored in the coefficient rearranging buffer unit 13, the order thereof is rearranged by the coefficient rearranging unit 14 and read out, and is transferred to the entropy encoding unit 15 in increments of coding units.

As described above, with wavelet transformation, coefficients are generated from the highband component side to the lowband component side. In the example in FIG. 4, at the first time, with the pixel data of the original image, the highband component coefficient C1, coefficient C2, and coefficient C3 are sequentially generated with the filtering processing of division level=1. Filtering processing of division level=2 is then performed as to the lowband component coefficient data obtained with the filtering processing of division level=1, whereby the lowband component coefficients C4 and C5 are sequentially generated. That is to say, at the first time, coefficient data is generated in the order of coefficient C1, coefficient C2, coefficient C3, coefficient C4, and coefficient C5. The generating order or the coefficient data is always in this order (in the order from highband to lowband) based on the principles of wavelet transformation.

Conversely, on the decoding side, performing decoding immediately with little delay necessitates generating and outputting an image from lowband components. Therefore, rearranging the coefficient data generated on the encoding side from the lowest band components toward highband components and supplying this to the decoding side is desirable.

Using the example in FIG. 4, description will be given in greater detail. The right side of FIG. 4 shows the synthesizing filter side which performs inverse wavelet transformation. The synthesizing processing (inverse wavelet transformation processing) at the first time which contains the first line of output image data, on the decoding side, is performed using the lowest band component coefficients C4, C5, and C1 which are generated with the filtering processing at the first time on the encoding side.

That is to say, with the synthesizing processing at the first time, coefficient data is supplied to the decoding side from the encoding side in the order of coefficient C5, coefficient C4, coefficient C1, and on the decoding side synthesizing process is performed as to the coefficients C5 and C4 with the processing of synthesizing level=2 which is synthesizing processing corresponding to division level=2, generating coefficient $C_f$, and this is stored in the buffer. With the processing of synthesizing level=1 which is synthesizing processing corresponding to division level=1, synthesizing processing is performed as to the coefficient $C_f$ and the coefficient C1, and the first line is output.

Thus, with the synthesizing processing of the first time, the coefficient data which has been generated on the encoding side in the order of coefficient C1, coefficient C2, coefficient C3, coefficient C4, coefficient C5, and stored in the coefficient rearranging buffer unit 13 is rearranged in the order of coefficient C5, coefficient C4, coefficient C1, and so forth, and supplied to the decoding side.

Note that with the synthesizing filter side shown on the right side of FIG. 4, coefficient numbers on the encoding side are shown inside parenthesis for the coefficients supplied from the encoding side, and the line order of the synthesizing filter is shown outside the parenthesis. For example, coefficient C1(5) shows that the coefficient is C5 on the analyzing filter side on the left side of FIG. 4, and is on the first line on the synthesizing filter side.

The synthesizing processing on the decoding side with the coefficient data generated with the filtering processing at the second time and thereafter on the encoding side can be performed using coefficient data supplied from the encoding side or synthesized in the event of the synthesizing processing at the previous time. With the example in FIG. 4, the synthesizing processing at the second time on the decoding side, which is performed using the lowband components C8 and C9 generated with filter processing at the second time on the encoding side, further necessitates the coefficients C2 and C3 generated with the filtering processing at the first time on the encoding side, whereby the second through fifth lines are decoded.

That is to say, with the synthesizing processing at the second time, coefficient data is supplied from the encoding side to the decoding side in the order of coefficient C9, coefficient C8, coefficient C2, and coefficient C3. On the decoding side, with the processing of synthesizing level=2, the coefficient $C_g$ is generated by using the coefficients C8 and C9, and the coefficient C4 which is supplied from the encoding side in the event of synthesizing processing at the first time, and the coefficient $C_g$ is stored in the buffer. With the coefficient $C_g$, the above-described coefficient C4, and the coefficient $C_f$ stored with the synthesizing processing at the first time and stored in the buffer, coefficient $C_h$ is generated and stored in the buffer.

With the processing of synthesizing level=1, synthesizing processing is performed by using the coefficients $C_g$ and $C_h$ generated with the processing of synthesizing level=2 and stored in the buffer, and the coefficient C2 (shown as coefficient C6(2) with the synthesizing filter) and coefficient C3 (shown as coefficient C7(3) with the synthesizing filter) supplied from the encoding side, whereby the second through fifth lines are decoded.

Thus, with the synthesizing processing at the second time, the coefficient data generated on the encoding side in the order of coefficient C2, coefficient C3, (coefficient C4, coefficient C5), coefficient C6, coefficient C7, coefficient C8, coefficient C9 are rearranged in the order of coefficient C9, coefficient C8, coefficient C2, coefficient C3, and so forth and supplied to the decoding side.

With the synthesizing processing at the third time and thereafter, similarly, the coefficient data stored in the coefficient rearranging buffer unit 13 is rearranged in a predetermined order and supplied to the decoding unit, and the lines are decoded four lines at a time.

Note that with synthesizing processing on the decoding side corresponding to the filtering processing containing the line at the lower edge of the screen on the encoding side (hereafter called the last time), the coefficient data generated with the processing up to that point and stored in the buffer is all output, so the number of output lines is increased. With the example in FIG. 4, eight lines are output at the last time.

Note that the rearranging processing of coefficient data with the coefficient rearranging unit 14 sets a readout address in the event of reading coefficient data stored in the coefficient rearranging buffer unit 13 so as to be in a predetermined order, for example.

Figure 5A:
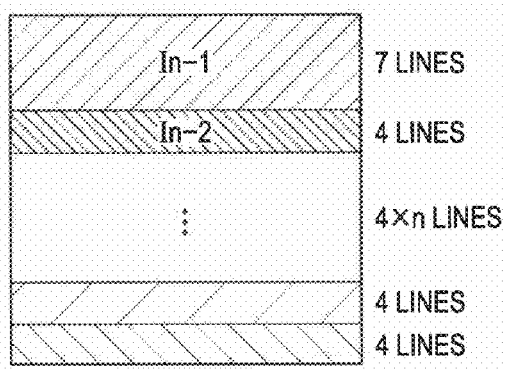
FIG. 5 is a schematic drawing schematically illustrating the flow of wavelet transformation and wavelet inverse transformation according to the present invention.

The processing described above will be described more specifically with reference to FIG. 5. FIG. 5 is an example wherein filtering processing is performed with wavelet transformation up to division level=2, utilizing a 5×3 filter. With the wavelet transformation unit 11, as one example shows in FIG. 5A, filter processing at the first time as to the first through seventh lines of input image data is performed in each of the horizontal and vertical directions (In-1 of FIG. 5A).

Figure 5B:
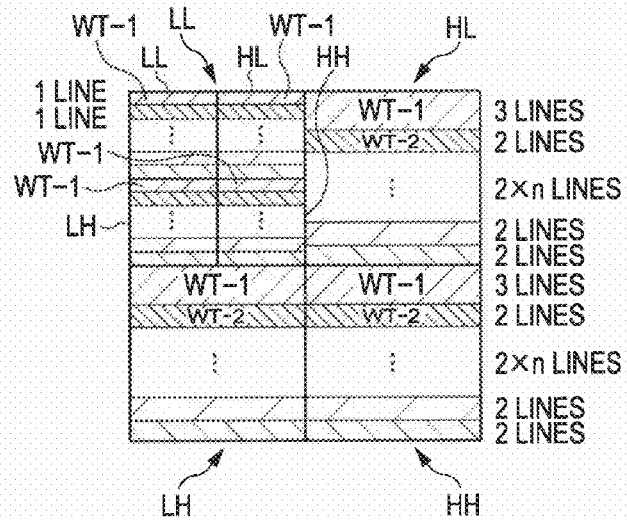

With the processing of division level=1 of the filtering processing at the first time, three lines worth of coefficient data is generated for coefficients C1, C2, and C3, and as one example shows in FIG. 5B, the coefficient data is disposed in region HH, HL, and LH, which are formed with division level=1, respectively (WT-1 in FIG. 5B).

Also, the region LL formed with division level=1 is further divided into four with the filtering processing in the horizontal and vertical directions with division level=2. The coefficients C5 and C4 generated with division level=2 are disposed within the region LL in the division level=1, one line by coefficient C5 in region LL, and one line by coefficient C4 in each of regions HH, HL, and LH.

With the filtering processing at the second time and thereafter by the wavelet transformation unit 11, filtering processing is performed every four lines (In-2 and so forth in FIG. 5A), coefficient data for two lines at a time is generated at the division level=1 (WT-2 in FIG. 5B), and coefficient data of one line at a time is generated at the division level=2.

In the example of the second time in FIG. 4, the coefficient data of two lines worth of coefficients C6 and C7 is generated with the filtering processing of division level=1, and as one example shows in FIG. 5B, the coefficient data is disposed next after the coefficient data generated with the filtering processing at the first time of the regions HH, HL, and LH which are formed in division level=1. Similarly, within the region LL in division level=1, the coefficient C9 worth one line generated with the filtering processing in division level=2 is disposed in region LL, and the coefficient C8 worth one line is disposed in each of regions HH, HL, and LH.

Figure 5C:
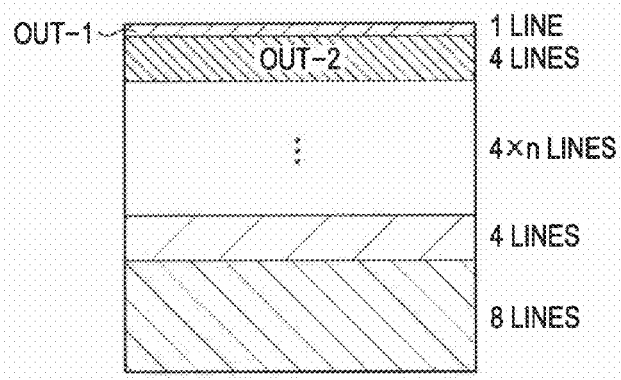

In the event that data subjected to wavelet transformation is decoded as in FIG. 5B, as one example shows in FIG. 5C, a first line by the synthesizing processing at the first time on the decoding side is output (Out-1 in FIG. 5C) as to the filtering processing at the first time with the first through seventh lines on the encoding side. Hereafter, four lines at a time are output on the decoding side as to the filtering processing from the second time to before the last time on the encoding side (Out-2 and so forth in FIG. 5C). Eight lines are then output on the decoding side as to the filtering processing at the last time on the encoding side.

The coefficient data generated from the highband component side to the lowband component side with the wavelet transformation unit 11 is sequentially stored in the coefficient rearranging buffer unit 13. Upon coefficient data accumulating in the coefficient rearranging buffer unit 13 until the above-described coefficient data rearranging can be performed, the coefficient rearranging unit 14 rearranges coefficient data in an order necessary for synthesizing processing from the coefficient rearranging buffer unit 13 and reads this out. The read out coefficient data is sequentially supplied to the entropy encoding unit 15.

The entropy encoding unit 15 sequentially encodes the supplied coefficient data, and outputs the generated encoded data externally from the encoding unit 10.

Next, the decoding unit corresponding to the encoding unit 10 in FIG. 1 will be described. FIG. 6 is a block diagram showing a configuration example of a decoding unit to which an embodiment of the present invention has been applied. The decoding unit 20 shown in FIG. 6 is made up of a software program, and schematically shows a function wherein a software decoding unit which decodes encoded data, which is image data that has been encoded, to restore image data is realized by the CPU of a predetermined information processing device executing the software program. As shown in FIG. 6, the decoding unit 20 has the functions of an entropy decoding unit 21, coefficient buffer unit 22, and wavelet inverse transformation unit 23.

The entropy decoding unit 21 decodes the supplied encoded data with a decoding method corresponding to the encoding method with the entropy encoding unit 15, and obtains coefficient data. The coefficient data is stored in the coefficient buffer unit 22. The wavelet inverse transformation unit 23 uses the coefficient data stored in the coefficient buffer unit 22 to perform synthesizing filter processing (wavelet inverse transformation) with the synthesizing filter, and stores the results of the synthesizing filtering processing again in the coefficient buffer unit 22. The wavelet inverse transformation unit 23 repeats the processing according to the division level, and upon obtaining the decoded image data (output image data), outputs this externally.

Next, a flow example of the processing executed with the encoding unit 10 and decoding unit 20 will be described. First, an example of the flow of the encoding processing executed with the encoding unit 10 will be described with reference to the flowchart in FIG. 7.

Upon the encoding processing starting, in step S1 the wavelet transformation unit 11 sets a number A of the precinct to be processed to initial settings. In a normal case, the number A is set to "1". Upon the setting ending, in step S2 the wavelet transformation unit 11 obtains image data of the number of lines necessary to generate one line (i.e. one precinct) which is the A'th from the top in the lowest band sub-band, and for this image data, in step S3 performs vertical analyzing filtering processing which performs analyzing filtering as to the image data arranged in the vertical direction of the screen, and in step S4 performs horizontal analyzing filtering processing which performs analyzing filtering processing as to the image data arranged in the horizontal direction of the screen.

In step S5, the wavelet transformation unit 11 determines whether or not the analyzing filtering processing is performed to the final level. In the case determination is made that the division level has not achieved the final level, the processing is returned to step S3, and the analyzing filtering processing in steps S3 and S4 are repeated as to the current division level.

In step S5, in the event that determination is made that the analyzing filtering processing is performed to the final level, the processing advances to step S6.

In step S6, the coefficient rearranging unit 14 rearranges the coefficients of the precinct A (A'th precinct from the top of the picture (frame or field)) in order from lowband to highband. In step S7, the entropy encoding unit 15 entropy encodes the coefficients thereof for every line, and in step S8, sends out the encoded data of the precinct A.

In step S9, the wavelet transformation unit 11 increments the value of number A by "1" and subjects the next precinct to processing, and in step S10 determines whether or not the picture (frame or field) to be processed has any unprocessed image input lines. In the case determination is made that there are unprocessed image input lines, the processing is returned to step S2, and the processing thereafter is repeated as to the new precinct to be processed.

Thus, the processing in steps S2 through S10 is repeatedly executed, and each precinct is encoded. In step 10, in the case determination is made that there are no unprocessed image input lines, the encoding processing as to this picture is ended. New encoding processing is started as to the next picture.

Thus, the wavelet transformation unit 11 continuously performs vertical analyzing filtering processing and horizontal analyzing filtering processing in increments of precincts until the final level, so compared to a currently used method, the amount of data needed to hold (buffer) at one time (synchronously) is small, so the amount of memory in the buffer to be prepared can be greatly reduced. Also, by performing analyzing filtering processing until the final level, latter stage processing such as coefficient rearranging or entropy encoding can also be performed (i.e. coefficient rearranging and entropy encoding can be performed in increments of precincts). Accordingly, compared to the method to perform wavelet transformation as to the entire screen, the delay time can be greatly reduced.

Figure 8:
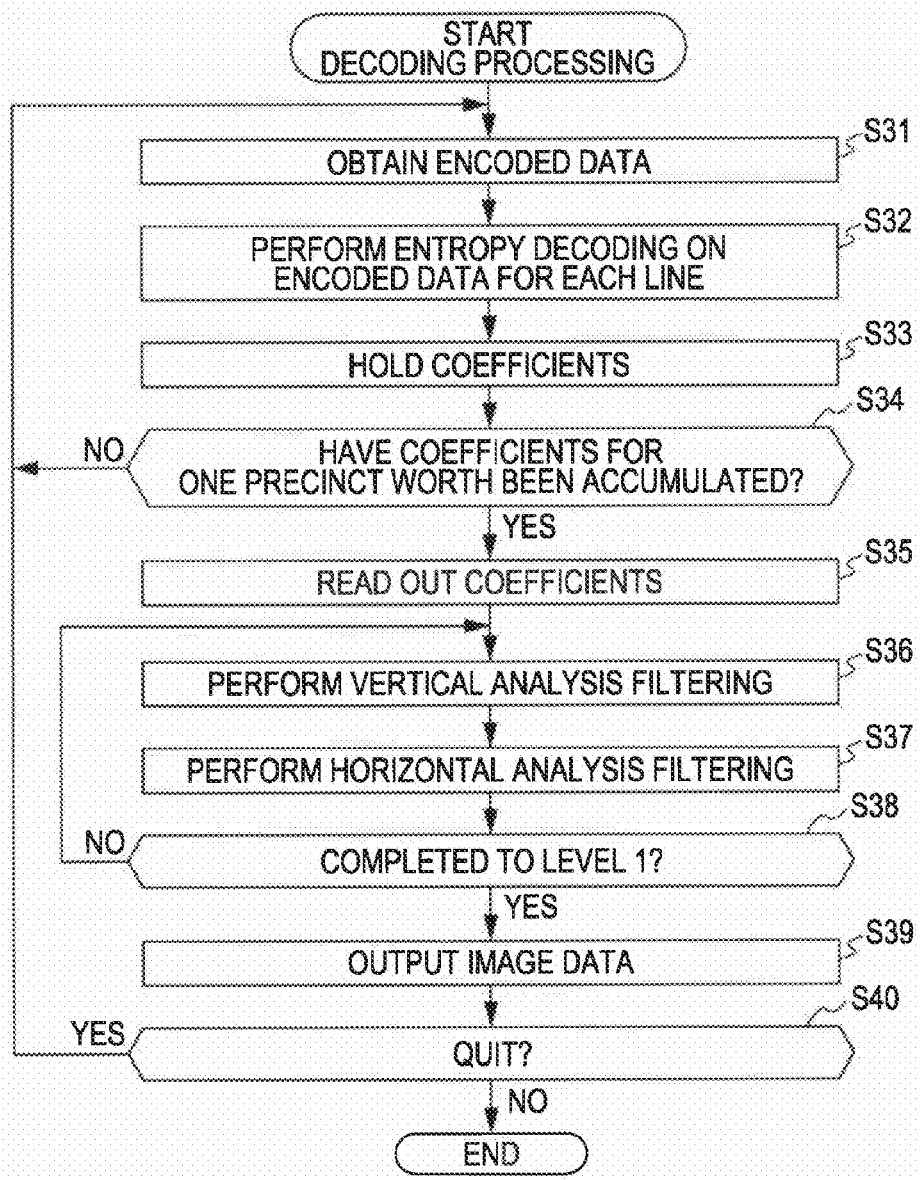
FIG. 8 is a flowchart describing an example of flow of decoding processing.

Next, an example of flow of the decoding processing executed with the decoding unit 20 will be described with reference to the flowchart in FIG. 8.

Upon the decoding processing starting, in step S31 the entropy decoding unit 21 obtains encoded data supplied externally from the decoding unit 20, and in step S32 entropy decodes the encoded data for each line. In step S33, the coefficient buffer unit 22 holds the coefficient data which has been decoded and obtained. In step S34 the wavelet inverse transformation unit 23 determines whether or not one precinct worth of coefficient data is accumulated in the coefficient buffer unit 22. In the case determination is made that one precinct worth of coefficient data is not accumulated, the processing is returned to step S31, and the processing thereafter is executed. That is to say, the wavelet inverse transformation unit 23 waits until one precinct worth of coefficient data is accumulated in the coefficient buffer unit 22.

In the case determination is made in step S34 that one precinct worth of coefficient data is accumulated in the coefficient buffer unit 22, the processing is advanced to step S35. In step S35, the wavelet inverse transformation unit 23 reads the one precinct worth of coefficient data which is held in the coefficient buffer unit 22, and in step S36, for the read out coefficient data, performs vertical synthesizing filtering processing which performs synthesizing filtering processing as to the coefficient data arranged in the vertical direction on the screen, and in step S37 performs horizontal synthesizing filtering processing which performs synthesizing filtering processing as to the coefficient data arranged in the horizontal direction on the screen. In step S38, the wavelet inverse transformation unit 23 determines whether or not the synthesizing filtering processing is finished through level 1 (the level wherein the division level value is "1"), i.e., whether or not inverse transformation has been performed until the state before wavelet transformation is achieved. In the case that determination is made that level 1 has not been achieved, the processing is returned to step S36, and the filtering processing of steps S36 and S37 is repeated.

In step S38, in the case determination is made that wavelet inverse transformation processing is finished through level 1, the processing is advanced to step S39. In step S39, the wavelet inverse transformation unit 23 outputs the image data externally which is obtained from the wavelet inverse transformation processing.

In step S40, the entropy decoding unit 21 determines whether or not to end the decoding processing. In the case determination is made to not end the decoding processing, the processing is returned to step S31, and the processing thereafter is repeated. Also, in step S40, in the case determination is made to end decoding processing by finishing the precinct and so forth, the decoding processing is ended.

In the case of a currently used wavelet inverse transformation method, horizontal synthesizing filtering processing is first performed in the horizontal direction of the screen as to all coefficients of a division level to be processed, and will next perform vertical synthesizing filtering processing in the vertical direction of the screen. That is to say, for each time of synthesizing filtering processing, the results of the synthesizing filtering processing needs to be held in the buffer, but in such event, the synthesizing filtering results of the division level at that point-in-time and all of the coefficients of the next division level need to be held, necessitating large memory capacity (amount of data to be held is large).

Also in this case, image data output is not performed until all wavelet inverse transformations within a picture (frame or field) are ended, so the delay time from input to output is greatly increased.

Conversely, in the case of the wavelet inverse transformation unit 23 of the decoding unit 20, the vertical synthesizing filtering processing and horizontal synthesizing filtering processing are continuously performed in increments of precincts until the level is 1, as described above, so compared to a currently used method, the amount of data needed to hold (buffer) at one time (simultaneously) is small, so the amount of memory in the buffer to be prepared can be greatly reduced. Also, synthesizing filtering processing (wavelet inverse transformation processing) is performed to level 1, thereby enabling image data to be output sequentially before obtaining all of the picture data within the picture (in increments of precincts), and greatly reducing the delay time as compared to a currently used method.

Figure 9:
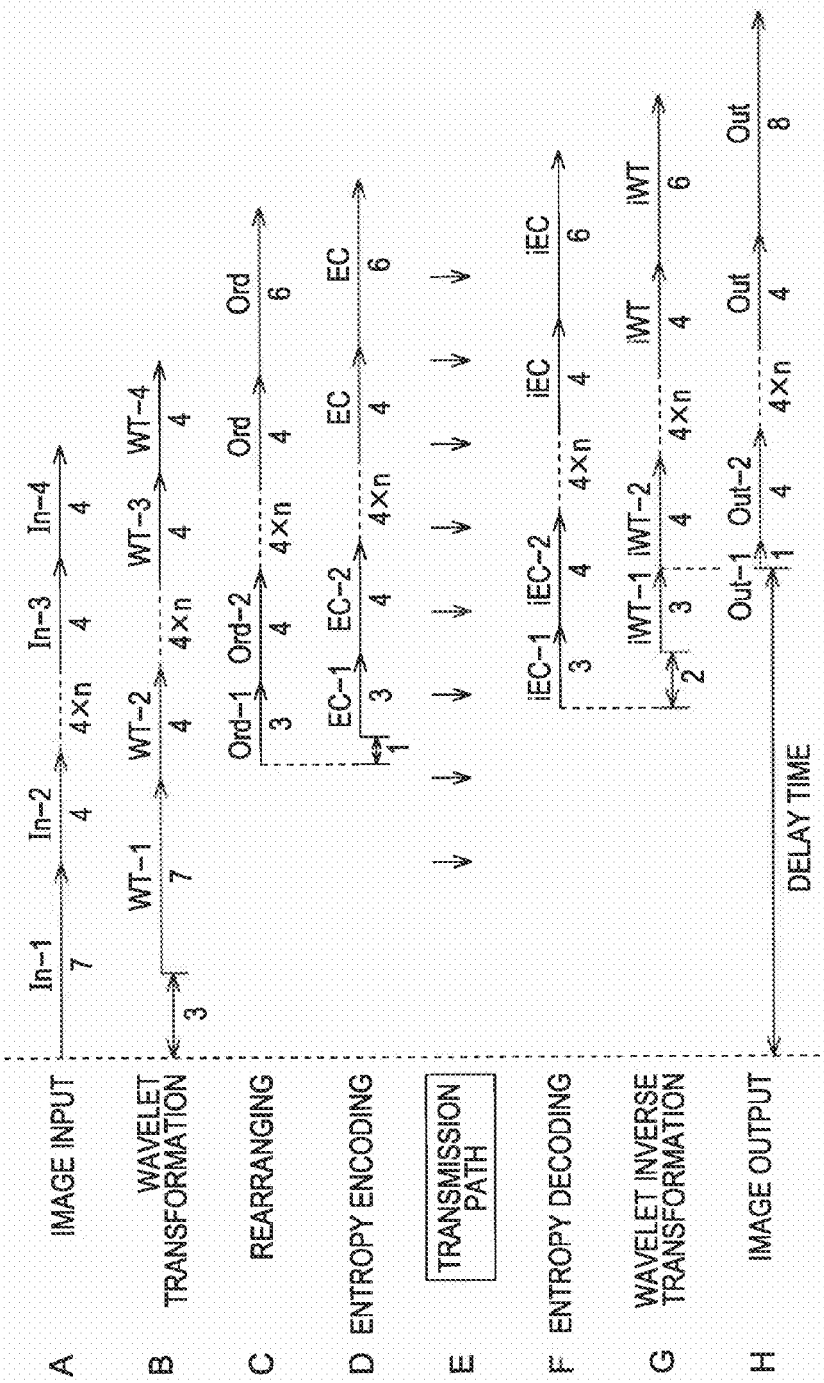
FIG. 9 is a schematic drawing schematically describing an example of parallel actions performed by various elements of an encoding unit and a decoding unit.

Various processing such as that described above can also be executed in parallel as appropriate, as shown in FIG. 9, for example.

FIG. 9 is a diagram schematically showing an example of parallel operations for various elements of the processing executed with various portions of the encoding unit 10 shown in FIG. 1 and the decoding unit 20 shown in FIG. 6. FIG. 9 corresponds to the above-described FIG. 5. Wavelet transformation WT-1 at the first time is performed (FIG. 9B) with the wavelet transformation unit 11 (FIG. 1) as to the input In-1 (FIG. 9A) of the image data. As described with reference to FIG. 4, the wavelet transformation WT-1 at the first time is started at the point-in-time that the first three lines are input, and the coefficient C1 is generated. That is to say, a delay of three lines worth occurs from the input of the image data In-1 to the start of the wavelet transformation WT-1.

The generated coefficient data is stored in the coefficient rearranging buffer unit 13 (FIG. 1). Thereafter, wavelet transformation is performed as to the input image data and the processing at the first time is finished, whereby the processing is transferred without change to the wavelet transformation WT-2 at the second time.

The rearranging Ord-1 of three coefficients C1, C4, and C5 is executed (FIG. 9C) with the coefficient rearranging unit 14 (FIG. 1) in parallel with the input of image data In-2 for the purpose of wavelet transformation WT-2 at the second time and the processing of the wavelet transformation WT-2 at the second time.

Note that a delay from the end of the wavelet transformation WT-1 until the rearranging Ord-1 starts is a delay based on a device or system configuration, and for example is a delay associated with the transmission of a control signal to instruct rearranging processing to the coefficient rearranging unit 14, a delay needed for processing starting of the coefficient rearranging unit 14 as to the control signal, or a delay needed for program processing, and is not an essential delay associated with encoding processing.

The coefficient data is read from the coefficient rearranging buffer unit 13 in the order that rearranging is finished, is supplied to the entropy encoding unit 15 (FIG. 1), and is subjected to entropy encoding EC-1 (FIG. 9D). The entropy encoding EC-1 can be started without waiting for the end of all rearranging of the three coefficients C1, C4, and C5. For example, at the point-in-time that the rearranging of one line by the coefficient C5 output at first is ended, entropy encoding as to the coefficient C5 can be started. In this case, the delay from the processing start of the rearranging Ord-1 to the processing start of the entropy encoding EC-1 is one line worth.

The encoded data wherein the entropy encoding EC-1 with the entropy encoding unit 15 is ended is transmitted to the decoding unit 20 (FIG. 6) after having been subjected to predetermined signal processing.

Thus, following the image data input of seven lines worth with the processing at the first time, the image data to the lower edge of the screen is sequentially input into the encoding unit 10. With the encoding unit 10, along with the image data input In-n (n is 2 or greater), as described above, wavelet transformation WT-n, rearranging Ord-n, and entropy encoding EC-n is performed for every four lines. The rearranging Ord and entropy encoding EC as to the processing at the last time with the encoding unit 10 is performed as to six lines. This processing is performed in parallel with the encoding unit 10, as exemplified in FIGS. 9A through 9D.

The encoded data encoded with the entropy encoding EC-1 of the encoding unit 10 is supplied to the decoding unit 20. The entropy decoding unit 21 (FIG. 6) of the decoding unit 20 sequentially performs decoding iEC-1 of entropy encoding as to the encoded data which is encoded with the entropy encoding EC-1, and restores the coefficient data (FIG. 9F). The restored coefficient data is sequentially stored in the coefficient buffer unit 22. Upon as much coefficient data as can be subjected to wavelet inverse transformation being stored in the coefficient buffer unit 22, the wavelet inverse transformation unit 23 reads the coefficient data from the coefficient buffer unit 22, and performs wavelet inverse transformation iWT-1 using the read coefficient data (FIG. 9G).

As described with reference to FIG. 4, the wavelet inverse transformation iWT-1 with the wavelet inverse transformation unit 23 can be started at the point-in-time of the coefficients C4 and C5 being stored in the coefficient buffer unit 22. Accordingly, the delay from the start of decoding iEC-1 with the entropy decoding unit 21 to the start of the wavelet inverse transformation iWT-1 with the wavelet inverse transformation unit 23 is two lines worth.

With the wavelet inverse transformation unit 23, upon the wavelet inverse transformation iWT-1 of three lines worth with the wavelet transformation at the first time ending, output Out-1 of the image data generated with the wavelet inverse transformation iWT-1 is performed (FIG. 9H). With the Out-1, as described with reference to FIGS. 4 and 5, the image data of the first line is output.

Following the input of the encoded coefficient data worth three lines with the processing at the first time with the encoding unit 10, the coefficient data encoded with the entropy encoding EC-n (n is two or greater) is sequentially input as to the decoding unit 20. With the decoding unit 20, the input coefficient data is subjected to entropy decoding iEC-n and wavelet inverse transformation iWT-n for every four lines, as described above, and sequentially performs output Out-n of the image data restored with the wavelet inverse transformation iWT-n. The entropy decoding iEC and wavelet inverse transformation iWT corresponding to the last time with the encoding unit 10 is performed as to six lines, and the output Out outputs eight lines. This processing is performed in parallel as exemplified in FIGS. 9F through 9H.

As described above, by performing each processing in parallel with the encoding unit 10 and decoding unit 20, in order from the top of the image toward the bottom thereof, the image compression processing and image decoding processing can be performed with little delay.

With reference to FIG. 9, the delay time from the image input to the image output in the case of performing wavelet transformation to division level=2 using a 5×3 filter will be calculated. The delay time from inputting the image data of the first line into the encoding unit 10 until the image data of the first line is output from the decoding unit 20 becomes the sum total of the various elements described below. Note that delays differing base on the system configuration, such as delays in the transfer bus and delays associated with actual processing timing of the various portions of the device are excluded.

(1) Delay D_WT from the first line input until the wavelet transformation WT-1 worth seven lines ends (2) Time D_Ord associated with three lines worth of coefficient rearranging Ord-1

(3) Time D_EC associated with three lines worth of entropy encoding EC-1

(4) Time D_iEC associated with three lines worth of entropy decoding iEC-1

(5) Time D_iWT associated with three lines worth of wavelet inverse transformation iWT-1

Delays with the various elements described above will be calculated with reference to FIG. 9. The delay D_WT in (1) is ten lines worth of time. The time D_Ord in (2), time D_EC in (3), time D_iEC in (4), and time D_iWT in (5) are each three lines worth of time. Also, with the encoding unit 10, the entropy encoding EC-1 can be started after one line from the start of the rearranging Ord-1. Similarly, with the decoding unit 20, the wavelet inverse transformation iWT-1 can be started after two lines from the start of entropy decoding iEC-1. Also, the entropy decoding iEC-1 can start processing at the point-in-time of one line worth of encoding with the entropy encoding EC-1 being finished.

Accordingly, with the example in FIG. 9, the delay time from the image data of the first line input into the encoding unit 10 until the image data of the first line output from the decoding unit 20 becomes 10+1+1+2+3=17 lines worth.

The delay time will be considered with a more specific example. In the case that the input image data is an interlace video signal of an HDTV (High Definition Television), for example one frame is made up of a resolution of 1920 pixels× 1080 lines, and one field is 1920 pixels×540 lines. Accordingly, in the case that the frame frequency is 30 Hz, the 540 lines of one field is input into the encoding unit 10 in the time of 16.67 msec (=1 sec/60 fields).

Accordingly, the delay time associated with the input of seven lines worth of image data is 0.216 msec (=16.67 msec× 7/540 lines), and becomes an extremely short time as to the updating time of one field, for example. Also, delay time of the sum total of the above-described delay D_WT in (1), time D_Ord in (2), time D_EC in (3), time D_iEC in (4), and time D_iWT in (5) is significantly shortened, since the number of lines to be processed is small.

Figure 10:
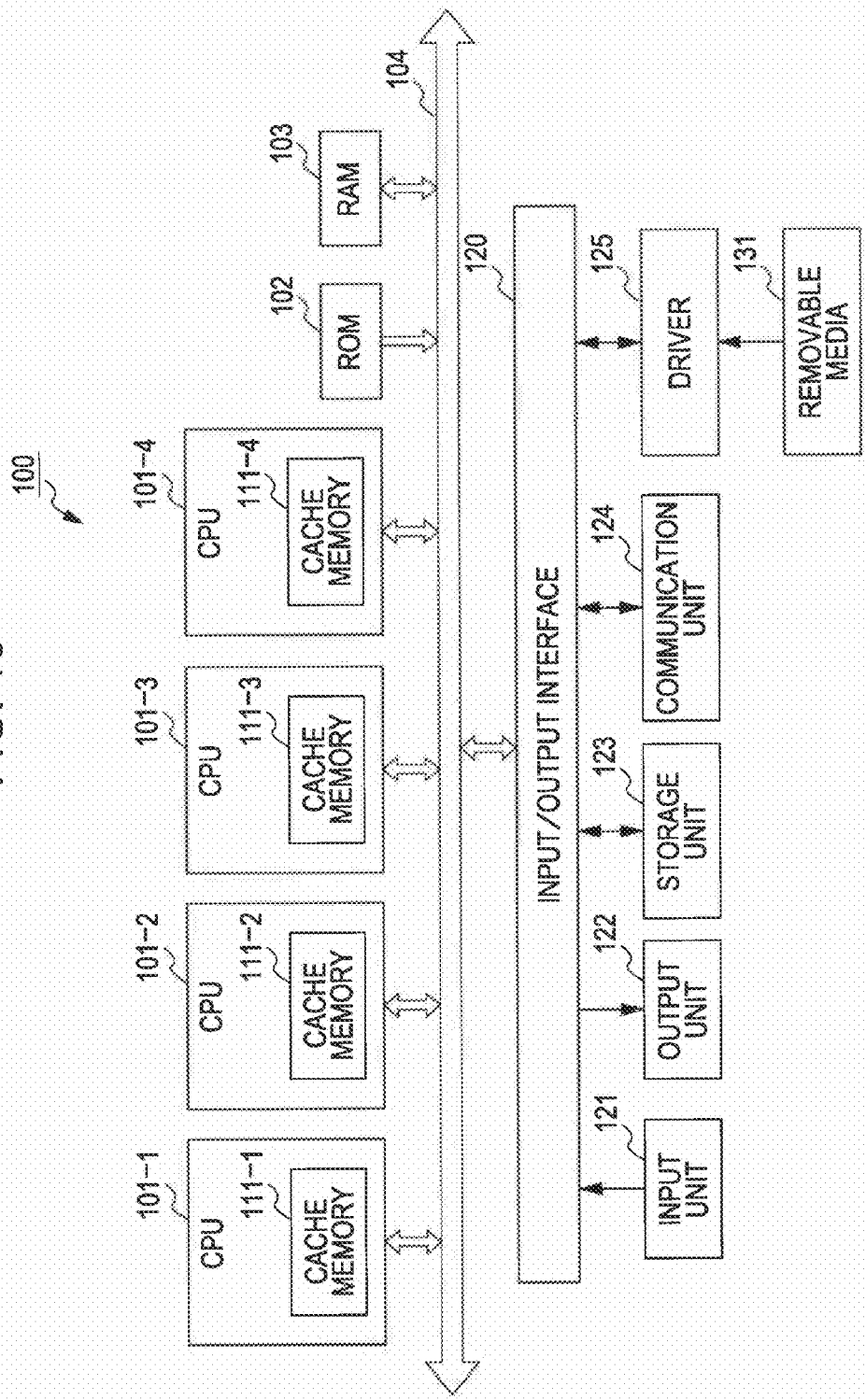
FIG. 10 is a block diagram illustrating a configuration example of a personal computer.

Next, an example of hardware resources allocated to a software encoding unit or software decoding unit as described above will be described. FIG. 10 is a block diagram showing a configuration example of a personal computer.

With FIG. 10, a CPU 101-1, CPU 101-2, CPU 101-3, and CPU 101-4 of a personal computer 100 are each computation processing units to execute various types of processing according to the software program. Hereafter, in the case that there is no need to distinguish the CPU 101-1 through CPU 101-4 for description, this will be called CPU 101. The CPU 101 is mutually connected to ROM (Read Only Memory) 102 and RAM (Random Access Memory) 103 via a bus 104 which is a shared bus. Software programs and data are stored in the ROM 102 beforehand. The software programs and data stored in the ROM 102 or storage unit 123 is loaded in the RAM 103.

A cache memory 111-1 is built into the CPU 101-1, a cache memory 111-2 is built into the CPU 101-2, a cache memory 111-3 is build into the CPU 101-3, and a cache memory 111-4 is built into the CPU 101-4. Hereafter, in the case that there is no need to distinguish the cache memory 111-1 through cache memory 111-4 for description, this will be called cache memory 111.

The cache memory 111 is a storage medium which operates at a high speed, such as SRAM (Static Random Access Memory) for example, and is exclusively used by the CPU 101 wherein the cache memory 111 is built in. The unit value per storage capacity of the cache memory 111 is high, and also the cache memory 111 is built into the CPU 101, so if the storage capacity of the cache memory 111 is greatly increased, the scale of the circuit in the CPU 101 also greatly increases. Thus in order to suppress the decrease in cost and increase in scale of the circuit, the storage capacity of the cache memory 111 is suppressed to a capacity smaller than the RAM 103 which is provided externally to the CPU 101, which generally has a storage capacity of several hundred kilobytes to several megabytes, and several hundred megabytes to several gigabytes, for example.

Of course, the cache memory may be arranged to have any type of memory, and the storage capacity thereof may be any amount, but here let us say that the cache memory 111 is a storage medium which is exclusively used by the CPU 101 where the cache memory 111 is built in, and while the data reading and writing can be performed at a higher speed than the RAM 103, let us say that the storage capacity thereof is a smaller capacity than the RAM 103, and that there is a limit to the amount of information that can be stored.

Regarding the cache memory 111, let us say that the RAM 103 is shared by the CPU 101-1 through CPU 101-4, the data reading and writing is at a slower speed than the cache memory 111, and has a larger capacity than the cache memory 111. Note that in actuality the storage capacity of the RAM 103 also is limited, but for ease of description, hereafter let us say that the storage capacity of the RAM 103 is sufficiently large as to the capacity necessary for the above-described encoding processing and decoding processing, and so limits to the capacity will not be particularly considered.

That is to say, with the cache memory 111, input/output of programs and data can be made at a high speed, but there is a limit to the capacity thereof, so storing all of the software programs or data of the software encoding unit and software decoding unit can be difficult. Conversely, the RAM 103 can store software programs and data as needed, but the input/output thereof is at a slow speed.

The CPU 101 loads software programs and data into the cache memory 111 built internally or the RAM 103, and performs various types of programming for encoding and decoding by using these.

An input/output interface 120 is also connected to the bus 104. The input/output interface 120 is connected to an input unit 121 made up of a keyboard, mouse, or the like, an output unit 122 made up of a display made up of a CRT (Cathode Ray Tube), LCD (Liquid Crystal Display), speakers and so forth, a storage unit 123 configured with a hard disk or the like, and a communication unit 124 configured with a modem or the like. The communication unit 124 performs communication processing via a network which includes the Internet.

Also, the input/output interface 120 is connected to a driver 125 as necessary, removable media 131 such as a magnetic disk, optical disk, magneto-optical disk, or semiconductor memory is mounted thereupon as appropriate, and the software program read out therefrom is installed in the storage unit 123 as needed. Note that the software program can also be installed with the communication unit 124 via the network.

Note that with FIG. 10, description is made such that four CPUs 101 are provided on the personal computer 100, but the number of CPUs 101 is arbitrary. However, depending on the implementation method of the software encoding unit or software decoding unit to be described later, there may be cases with a limit to the minimum number of CPUs 101, and for example, there may be cases wherein two CPU 101s, or four CPU 101s, are necessary. Also, the CPU 101-1 through CPU 101-4 may be arranged as one CPU 101 physically, having four cores. In such a case, an arrangement may be made wherein a cache memory 111-1 through cache memory 111-4 is provided to each CPU core (CPU 101-1 through CPU 101-4), or an arrangement may be made wherein a partial region of the cache memory 111 allocated to each CPU core is the cache memory 111-1 through cache memory 111-4.

With a personal computer 100 with such a configuration, in order to prevent the encoding unit 10 in FIG. 1 and decoding unit 20 in FIG. 6 from unnecessarily decreasing the processing efficiency, or from increasing the delay time, it is necessary for hardware resources of the personal computer 100, such as the CPU 101 or RAM 103 or the like, to be appropriately allocated as to each processing of the encoding unit 10 and decoding unit 20. An example of such allocation will be described below.

Figure 11:
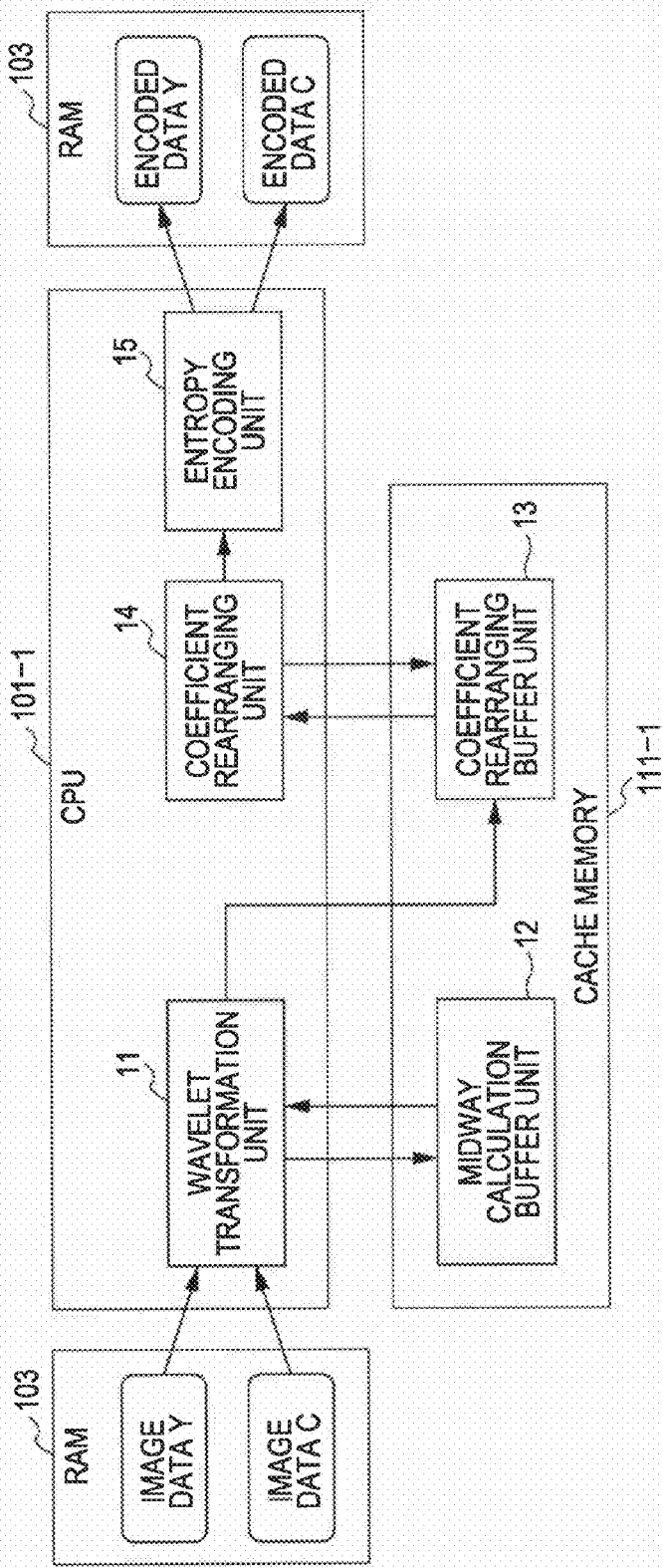
FIG. 11 is a diagram illustrating an example of allocating hardware resources as to the encoding unit.

FIG. 11 is a diagram showing an example of hardware resource allocation as to the encoding unit 10 in FIG. 1. With the example shown in FIG. 11, the CPU 101-1 is allocated to all of the processes of the wavelet transformation unit 11, coefficient rearranging unit 14, and entropy encoding unit 15 of the encoding unit 10, and the midway calculation buffing unit 12 and coefficient rearranging buffer unit 13 are formed in the cache memory 111-1.

At this time, the software program to realize the various functions of the wavelet transformation unit 11, coefficient rearranging unit 14, and entropy encoding unit 15 are loaded in the cache memory 111-1. The CPU 101-1 reads the functions of the software program from the cache memory 111-1 as needed, and executes the program.

Image data Y which is luminance components of the image data to be encoded, and image data C which is color difference components, are held in the RAM 103. Note that in actuality, color difference components have Cb and Cr, but for the purpose of simplicity of description here, Cb and Cr will be collectively called C. Note that a YC (YCbCr) component made up of a luminance component Y and color difference component C will be described, but the case of an RGB component made up of an R-component, G-component, and B-component is also similar.

In the case of the example in FIG. 11, the image data Y and image data C are both encoded with the CPU 101-1. That is to say, the CPU 101-1 executes processing of the wavelet transformation unit 11, thereby reading the image data Y from the RAM 103 to perform wavelet transformation processing. In this event, the CPU 101-1 uses a portion of the storage region of the cache memory 111-1 as the midway calculation buffer unit 12, and the intermediate data (lowband component of a midway division level) occurring in the analyzing filtering processing in the vertical direction and horizontal direction of the wavelet transformation processing is held in the midway calculation buffer unit 12. Also, the CPU 101-1 uses another portion of the storage region of the cache memory 111-1 as the coefficient rearranging buffer unit 13, and holds the coefficient data generated with the wavelet transformation in the coefficient rearranging buffer unit 13.

By executing the processing of the coefficient rearranging unit 14, the CPU 101-1 reads out while rearranging in a predetermined order the coefficient data held in the coefficient rearranging buffer unit 13 of the cache memory 111-1. By executing the processing of the entropy encoding unit 15, the CPU 101-1 encodes the coefficient data read from the cache memory 111-1 while the order is rearranged with the processing of the coefficient rearranging unit 14, and generates encoded data Y. The CPU 101-1 supplies and stores the generated encoded data Y in the RAM 103.

The CPU 101-1 performs processing as to the image data C similarly to the case of the image data Y.

As shown in FIG. 11, in the case of implementing the encoding unit 10 in the personal computer 100, all of the processing of the encoding unit 10 is executed with one CPU 101, and the intermediate data and coefficient data of the wavelet transformation generated during encoding processing is all stored in the cache memory 111 of the CPU 101.

At this time, for example, the other CPU 101-2 through CPU 101-4 may also be allocated to the encoding unit 10 similarly to the CPU 101-1. That is to say, similar to the case of the CPU 101-1 shown in FIG. 11, the software program realizing the various functions of the wavelet transformation unit 11, coefficient rearranging unit 14, and the entropy encoding unit 15 is also loaded into each of the cache memory 111-2 through cache memory 111-4. The CPU 101-2 through CPU 101-4 read and execute the software programs from the respective cache memory 111, and execute the various processing for the wavelet transformation unit 11, coefficient rearranging unit 14, and entropy encoding unit 15 of the encoding unit 10. At this time, similar to the cache memory 111-1, a midway calculation buffer unit 12 and coefficient rearranging buffer unit 13 are formed in each of the cache memory 111-2 through cache memory 111-4.

That is to say, in this case, four encoding units 10 are realized with the CPU 101-1 through CPU 101-4. Encoding processing is allocated to these encoding units 10, for each picture of encoded moving image data, for example. That is to say, in this case, the CPU 101-1 through CPU 101-4 execute encoding processing as to mutually different pictures, in parallel. The flow of the processing in such a case is shown schematically in FIG. 12.

Figure 12:
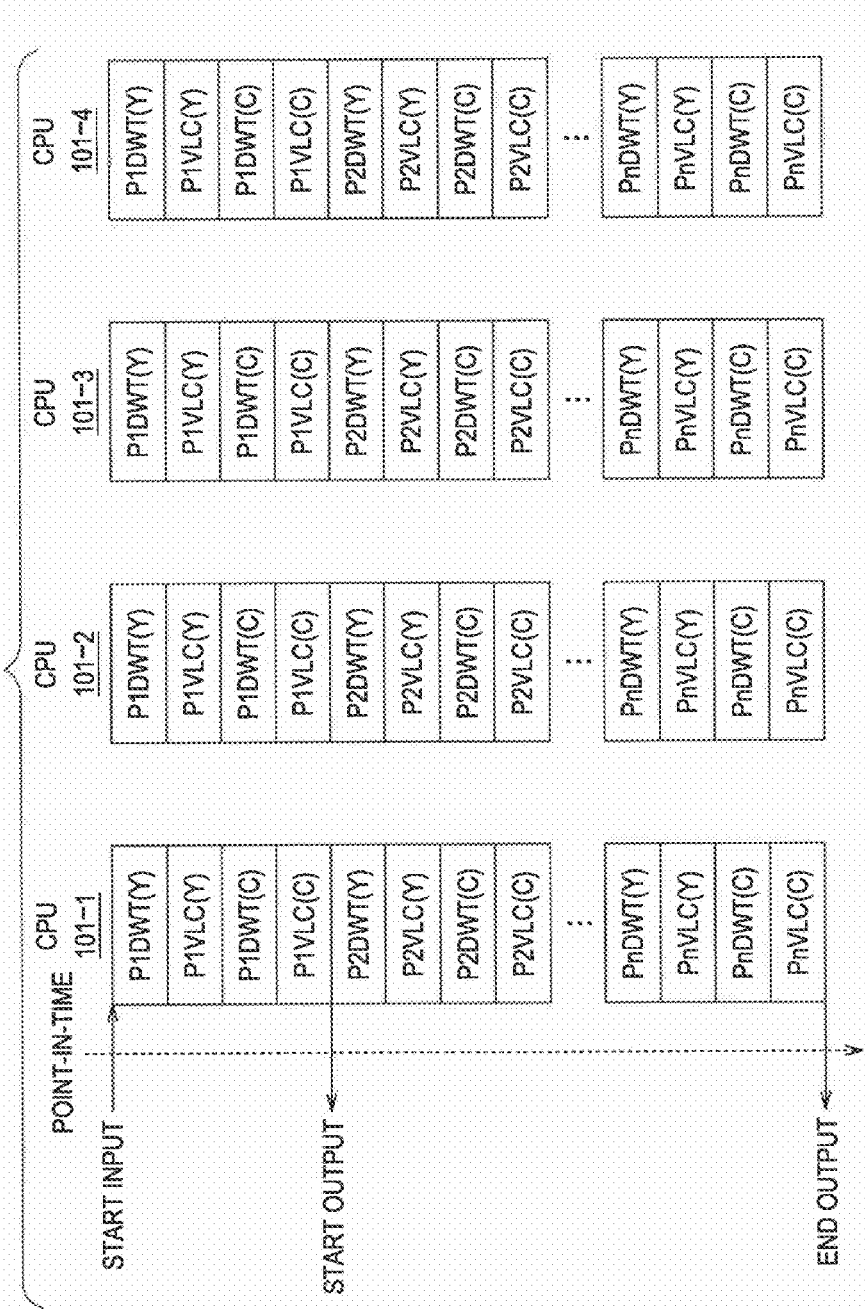
FIG. 12 is a schematic diagram illustrating the processing flow in the case of the example in FIG. 11.

In FIG. 12, a time-series is shown from the top in the vertical direction towards the bottom, and processing executed with each CPU is indicated with a quadrangle.

With the example in FIG. 12, the CPU 101-1 first reads the image data Y, which is the luminance component Y of the lead precinct (P1) of the lead picture, from the RAM 103, performs wavelet transformation (P1DWT(Y)) as to the image data Y while holding the intermediate data in the cache memory 111-1, and following holding the obtained coefficient data in the cache memory 111-1, subjects the coefficient data to order rearranging and entropy encoding (P1VLC(Y)). The encoded data Y generated with the entropy encoding is accumulated in the RAM 103. Next, the CPU 101-1 reads the image data C, which is the color difference component C of the lead precinct (P1), from the RAM 103, performs wavelet transformation (P1DWT(C)) as to the image data C while holding the intermediate data in the cache memory 111-1, and following holding the obtained coefficient data in the cache memory 111-1, subjects the coefficient data to order rearranging and entropy encoding (P1VLC(C)). The encoded data C generated with the entropy encoding is accumulated in the RAM 103.

At this point in time, at least one precinct worth of encoded data Y and encoded data C is accumulated in the RAM 103, so the output of the encoded data Y and encoded data C is started.

Thus, the wavelet transformation unit 11 through entropy encoding unit 15 which are realized in the CPU 101-1 and cache memory 111-1 perform similar processing together, or hold the data, as to both of the image data Y and image data C. In other words, the CPU 101-1 and cache memory 111-1 perform processing relating to the encoding or hold the data, similar as to either of the image data Y and image data C.

Upon the processing as to the lead precinct ending, the CPU 101-1 then reads the image data Y of the second precinct (P2) of the lead picture from the RAM 103, performs wavelet transformation as to the image data Y (P2DWT(Y)) while holding the intermediate data in the cache memory 111-1, and after the obtained coefficient data is held in the cache memory 111-1, order rearranging and entropy encoding is performed (P2VLC(Y)) as to the coefficient data. The encoded data Y generated with the entropy encoding is output after accumulating in the RAM 103. Next, the CPU 101-1 reads the image data C of the second precinct (P2) of the second picture from the RAM 103, performs wavelet transformation as to the image data Y (P2DWT(C)) while holding the intermediate data in the cache memory 111-1, and after the obtained coefficient data is held in the cache memory 111-1, performs order rearranging and entropy encoding (P2VLC(C)) as to the coefficient data. The encoded data C generated with the entropy encoding is output after accumulating in the RAM 103.

The CPU 101-1 performs similar processing as to the third precinct and thereafter of the lead picture, and performs wavelet transformation, coefficient rearranging, and entropy encoding as to each of the image data Y and image data C of the last n'th precinct (Pn) (PnDWT(Y), PnVLC(Y), PnDWT(C), PnVLC(C)). The obtained encoded data Y and encoded data C are output after accumulating in the RAM 103, similar to the precincts up to that point. When the encoded data C of the n'th precinct is output, the encoded data of the lead picture is all output, so the output of the encoded data of the lead picture is ended.

In parallel with the processing of the CPU 101-1, as shown in FIG. 12, the CPU 101-2 subjects the second picture, the CPU 101-2 subjects the third picture, and the CPU 101-4 subjects the fourth picture, each to the various processing of wavelet transformation, coefficient rearranging, and entropy encoding from the lead precinct to the n'th precinct, similar to the case of the CPU 101, generates encoded data Y and encoded data C from the image data Y and image data C, and outputs the data after holding the data in the RAM 103.

That is to say, in this case, similar to the CPU 101-1 and cache memory 111-1, the CPU 101-2 and cache memory 111-2, the CPU 101-3 and cache memory 111-3, and the CPU 101-4 and cache memory 111-4 each perform processing relating to encoding similarly as to both of the image data Y and image data C, or hold the data.

In this case, upon the processing as to the lead picture ending, the CPU 101-1 performs encoding processing as to the fifth picture. Similar to the processing of the CPU 101-1, the CPU 101-2 through CPU 101-4 also perform encoding processing as to the sixth through eighth pictures, respectively. Note that the ninth picture and thereafter are also similarly processed.

Thus, in the case of the example of allocation shown in FIG. 11, the encoding unit 10 can perform encoding processing for four pictures simultaneously in parallel. Further, in this case, there is no need to switch the CPU during a string of encoding processing. Also, processing can be performed by using only the cache memory 111 and without using the RAM 103, whereby the wavelet transformation unit 11 and coefficient rearranging unit 14 can perform reading and writing of data to the midway calculation buffer unit 12 and coefficient rearranging buffer unit 13 at a high speed. Accordingly, with such allocation of hardware resources, the encoding unit 10 can encode the image data at a high speed. That is to say, in the case of the allocation example shown in FIG. 11, the encoding unit 10 can perform encoding with a high throughput. Also, the personal computer 100 is not limited to the number of the CPUs 101 (i.e. even if there is only one), and the encoding unit 10 can be implemented.

However, the capacity of the cache memory 111 is small, so there is a limit to the amount of data that can be accumulated at one time, and depending on the data amount or content of the image data to be encoded, the cache memory 111 capacity may be insufficient, resulting in leakage. Therefore, there may be cases wherein the example of allocation shown in FIG. 11 cannot be applied in cases where a large buffer capacity is needed to execute the encoding.

Also, encoding of the image data Y and encoding of image data C are also performed with one CPU 10, so the time from the start of encoding processing until the encoded data of the lead precinct is output by the encoding unit 10, i.e. the encoding processing delay time, is long. Accordingly, the delay time from when the encoded data is decoded with the decoding unit 20 until the image of the restored image data is displayed becomes long. For the same reason, the time is long for the lead picture to be displayed on the monitor.

Figure 13:
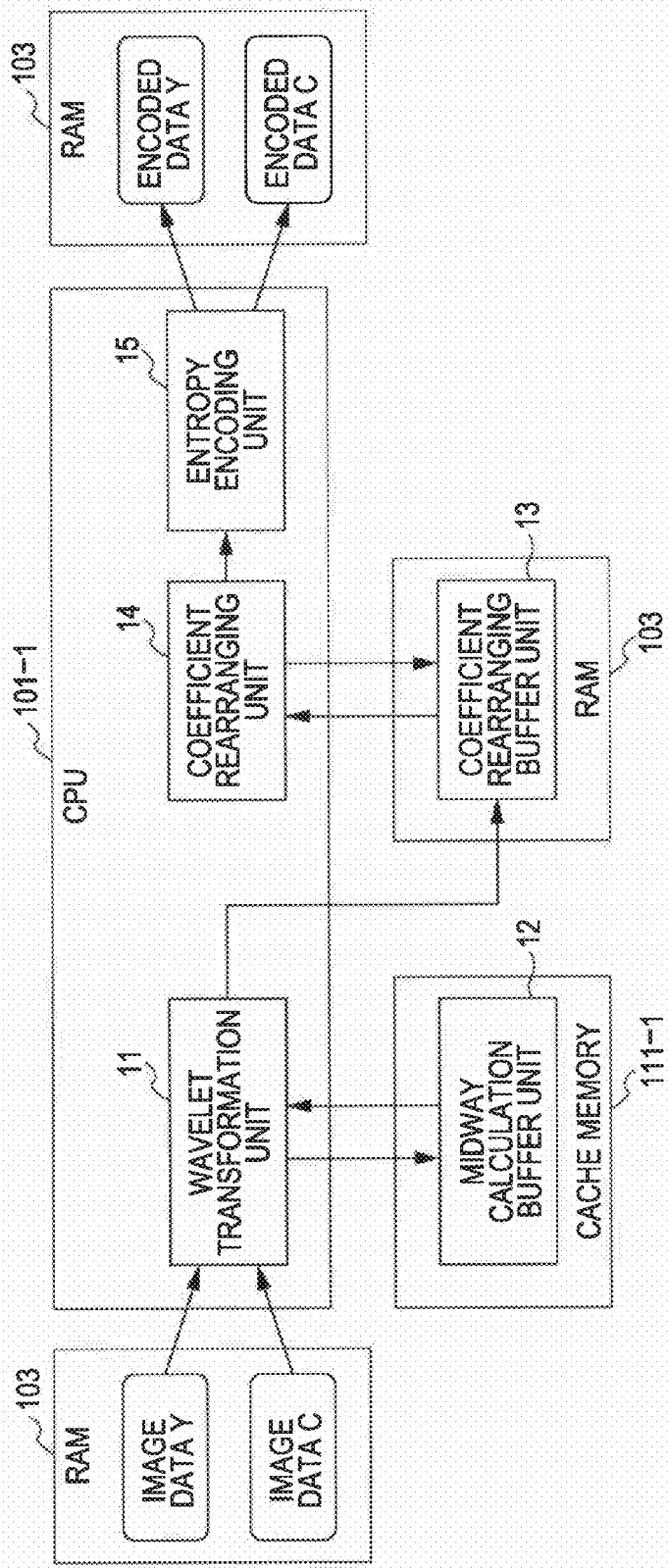
FIG. 13 is a diagram illustrating another example of allocating hardware resources as to the encoding unit.

Another example of hardware resource allocation as to the encoding unit 10 in FIG. 1 is shown in FIG. 13. With the example shown in FIG. 13, similar to the case in FIG. 11, the CPU 101-1 is allocated to all of the processing of the wavelet transformation unit 11, coefficient rearranging unit 14, and entropy encoding unit 15 of the encoding unit 10. However, while the midway calculation buffer unit 12 is formed with the cache memory 111-1, the coefficient rearranging buffer unit 13 is formed with the RAM 103.

At this time, the software program realizing the various functions of the wavelet transformation unit 11, coefficient rearranging unit 14, and entropy encoding unit 15 is loaded in the cache memory 111-1. The CPU 101-1 reads the functions of the software program from the cache memory 111-1 as needed to execute the program.

In the case of the example in FIG. 13, similar to the case of the example in FIG. 11, the image data Y and the image data C are both encoded with the CPU 101-1. That is to say, the CPU 101-1 executes the processing of the wavelet transformation unit 11, whereby image data Y is read from the RAM 103 to perform wavelet transformation processing. In this event, the CPU 101-1 uses a portion of the storage region of the cache memory 111-1 as the midway calculation buffer unit 12, and holds the intermediate data (e.g., the lowband component of a midway division level) which occurs in the analyzing filtering processing in the vertical direction and horizontal direction of the wavelet transformation processing in the midway calculation buffer unit 12.

However, in the case of the example in FIG. 13, this is different from the case of the example in FIG. 11, and the CPU 101-1 uses a portion of the storage region of the RAM 103 as a coefficient rearranging buffer unit 13, and the coefficient data generated with the wavelet transformation is held in the coefficient rearranging buffer unit 13.

The CPU 101-1 reads the coefficient data held in the coefficient rearranging buffer unit 13 of the RAM 103 while rearranging the coefficient data in a predetermined order, by executing the processing of the coefficient rearranging unit 14. The CPU 101-1 encodes the coefficient data read from the RAM 103 while rearranging the order thereof with the coefficient rearranging unit 14, by executing the processing in the entropy encoding unit 15, and generates the encoded data Y. The CPU 101-1 supplies and stores the generated encoded data in the RAM 103.

The CPU 101-1 performs the same processing as to the image data C as in the case of the image data Y.

As shown in FIG. 13, in the case of implementing the encoding unit 10 in the personal computer 100, all of the processing of the encoding unit 10 is executed with one CPU 101, and the intermediate data of the wavelet transformation which is generated during the encoding processing is stored in the cache memory 111 of the CPU 101 which operates at a high speed, and the coefficient data generated with the wavelet transformation is stored in a large capacity RAM 103.

At this time, for example, the other CPU 101-2 through CPU 101-4 also may be allocated to the encoding unit 10 similar to the CPU 101-1. That is to say, similar to the case in FIG. 13, the software programs realizing the various functions of the wavelet transformation unit 11, coefficient rearranging unit 14, and entropy encoding unit 15 are loaded into the cache memory 111-2 through cache memory 111-4 respectively. The CPU 101-2 through CPU 101-4 read and execute the software programs from the respective cache memory 111, and execute the various processing of the wavelet transformation unit 11, coefficient rearranging unit 14, and entropy encoding unit 15 of the encoding unit 10. At this time, a midway calculation buffer unit 12 is formed in each of the cache memory 111-2 through cache memory 111-4, similar to the cache memory 111-1, and each coefficient rearranging buffer unit 13 is formed in the RAM 103.

In this case, four encoding units 10 are realized by the CPU 101-1 through CPU 101-4. Encoding processing is allocated to these encoding units 10 for every picture of the encoded moving image data. That is to say, in this case, the CPU 101-1 through CPU 101-4 execute encoding processing in parallel with one another as to each different picture. The flow of processing in this case is schematically shown in FIG. 12, similar to the case in FIG. 11.

In the case of the above example of allocation as shown in FIG. 13, the coefficient rearranging buffer unit 13 is formed on the RAM 103, so more of the cache memory 111 can be used as the midway calculation buffer unit 12 than in the case of the allocation example in FIG. 11. That is to say, the capacity of the midway calculation buffer unit 12 can be increased. Also, the capacity of the coefficient rearranging buffer unit can be increased. That is to say, in the case of allocation as in the example in FIG. 13, the encoding unit 10 can suppress the occurrence of buffer leakage more than in the case of location in FIG. 11, and allocation can be realized under a wider range of conditions.

However, the coefficient rearranging unit 13 is formed on the RAM 103 which has a lower speed of reading and writing than the cache memory 111, whereby the throughput is lower than in the case of the allocation example in FIG. 11. However, the midway calculation buffer unit 12 having a larger number of times of reading and writing data is formed in the cache memory 111 which operates at a high speed, so decrease in throughput is small.

Figure 14:
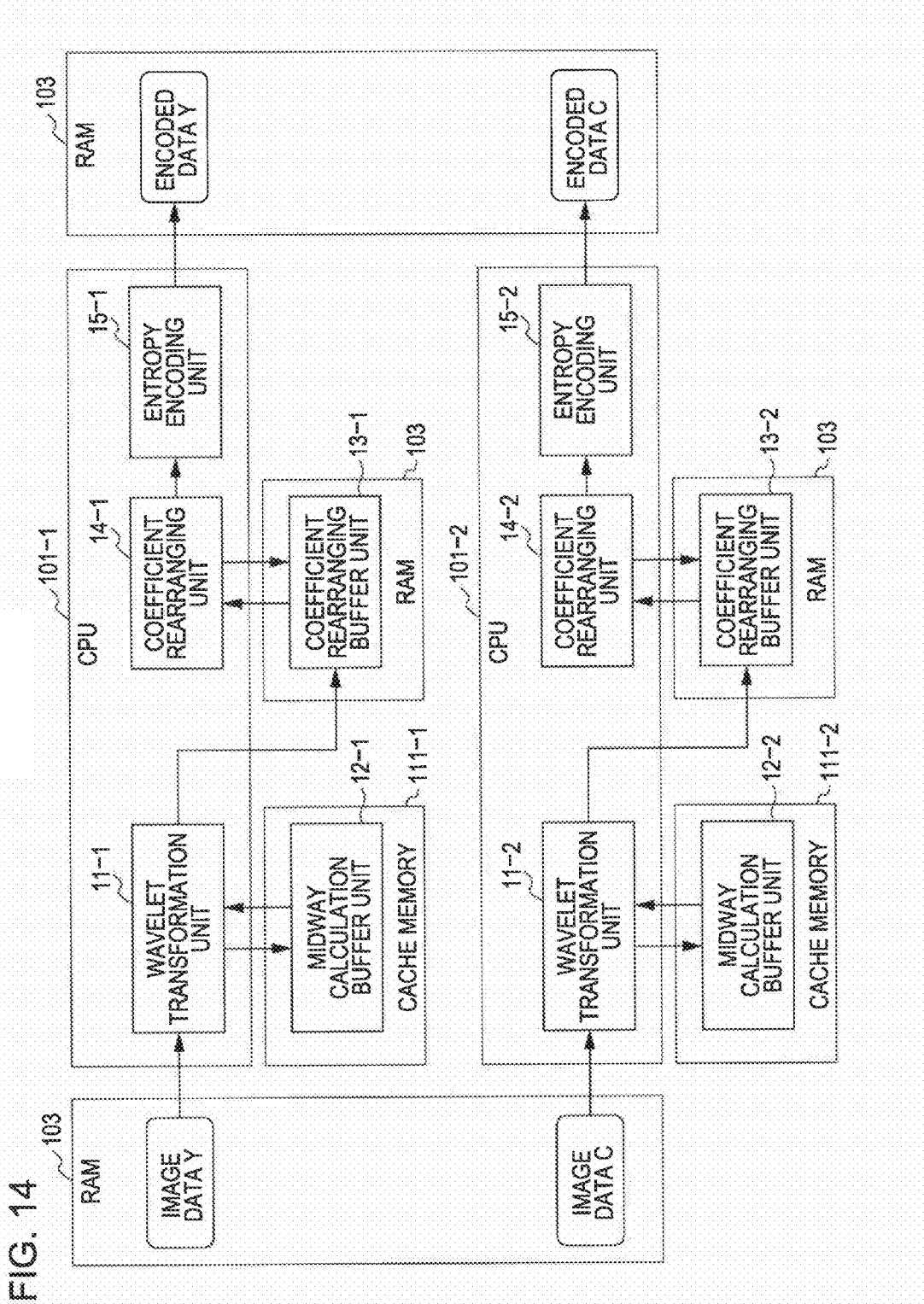
FIG. 14 is a diagram illustrating yet another example of allocating hardware resources as to the encoding unit.

Another example of hardware resource allocation as to the encoding unit 10 in FIG. 1 is shown in FIG. 14. With the example shown in FIG. 14, a different CPU is allocated for each encoding unit performing encoding of the image data Y and the encoding unit performing encoding of the image data C. That is to say, the CPU 101-1 is allocated to all of the processing of the wavelet transformation unit 11-1, coefficient rearranging unit 14-1, and entropy encoding unit 15-1, the midway calculation buffer unit 12-1 is formed in the cache memory 111-1, and the coefficient rearranging buffer unit 13-1 is formed in the RAM 103. Also, the CPU 101-2 is allocated to all of the processing of the wavelet transformation unit 11-2, coefficient rearranging unit 14-2, and entropy encoding unit 15-2, the midway calculation buffer unit 12-2 is formed in the cache memory 111-2, and the coefficient rearranging buffer unit 13-2 is formed in the RAM 103.

At this time, the software programs realizing the various functions of the wavelet transformation unit 11, coefficient rearranging unit 14, and entropy encoding unit 15 are loaded in the cache memory 111-1 and cache memory 111-2. The CPU 101-1 and CPU 101-2 read and execute the functions of the software programs as needed from the cache memory 111-1 or cache memory 111-2.

In the case of the example in FIG. 14, the image data Y is encoded with the CPU 101-1, and the image data C is encoded with the CPU 101-2. That is to say, the CPU 101-1 executes processing of the wavelet transformation unit 11-1 as to the image data Y, similar to the case of the example in FIG. 13, thereby reading the image data Y from the RAM 103 and performing wavelet transformation processing. In this event, the CPU 101-1 uses a portion of the storage region of the cache memory 111-1 as the midway calculation buffer unit 12, and the intermediate data generated with the analyzing filtering processing in the vertical direction and horizontal direction of the wavelet transformation processing is held in the midway calculation buffer unit 12.

The CPU 101-1 uses a portion of the storage region of the RAM 103 as the coefficient rearranging buffer unit 13, similar to the case of the example in FIG. 13, and holds the coefficient data generated with the wavelet transformation in the coefficient rearranging buffer unit 13. The CPU 101-1 executes processing of the coefficient rearranging unit 14, thereby reading the coefficient data held in the coefficient rearranging buffer unit 13 of the RAM 103 while rearranging the data in a predetermined order. The CPU 101-1 executes the processing of the entropy encoding unit 15, thereby encoding the coefficient data read from the RAM 103 while the order thereof being rearranged with the processing of the coefficient rearranging unit 14, and generates the encoded data Y. The CPU 101-1 supplies and stores the generated encoded data Y in the RAM 103.

However, in the case of the example in FIG. 14, this is different from the case of the example in FIG. 13, and the CPU 101-2 performs wavelet transformation, coefficient rearranging, and entropy encoding of the image data C similar to the case of the example in FIG. 13, in parallel with the processing of the CPU 101-1.

As shown in FIG. 14, in the case of implementing the encoding unit 10 in the personal computer 100, all of the processing of the encoding unit 10 as to the image data Y and image data C is executed with a different CPU 101 each, the intermediate data of the wavelet transformation generated during the encoding processing is stored in the cache memory 111 built into each of the CPUs 101, and the coefficient data generated with each wavelet transformation is stored together in the RAM 103. That is to say, encoding processing is performed with two CPUs as one set.

At this time, an arrangement may be made wherein, for example, the other CPU 101-3 and CPU 101-4 also are allocated to the encoding unit 10 similar to the CPU 101-1 and CPU 101-2. That is to say, similar to the case in FIG. 14, the software programs realizing the various functions of the wavelet transformation unit 11, coefficient rearranging unit 14, and entropy encoding unit 15 is also loaded in each of the cache memory 111-3 and cache memory 111-4. The CPU 101-3 and CPU 101-4 read and execute the software programs from each of the cache memory 111, and executes the various processing of the wavelet transformation unit 11, coefficient rearranging unit 14, and entropy encoding unit 15 of the encoding unit 10. At this time, the midway calculation buffer unit 12-1 for the image data Y is formed in the cache memory 111-3, the midway calculation buffer unit 12-2 for the image data C is formed in the cache memory 111-4, and the coefficient rearranging buffer unit 13-1 for the image data Y and coefficient rearranging buffer unit 13-2 for the image data C are both formed in the RAM 103.

That is to say, in this case, two encoding units 10 are realized with the CPU 101-1 through CPU 101-4. The encoding processing is allocated to these encoding units 10 for every picture of the encoded moving image data, for example. For example, an arrangement may be made wherein the CPU 101-1 and CPU 101-2 perform encoding processing of the odd-numbered pictures, and the CPU 101-3 and CPU 101-4 perform encoding processing of the even-numbered pictures. The flow of the processing in such a case is shown in FIG. 15.

Figure 15:
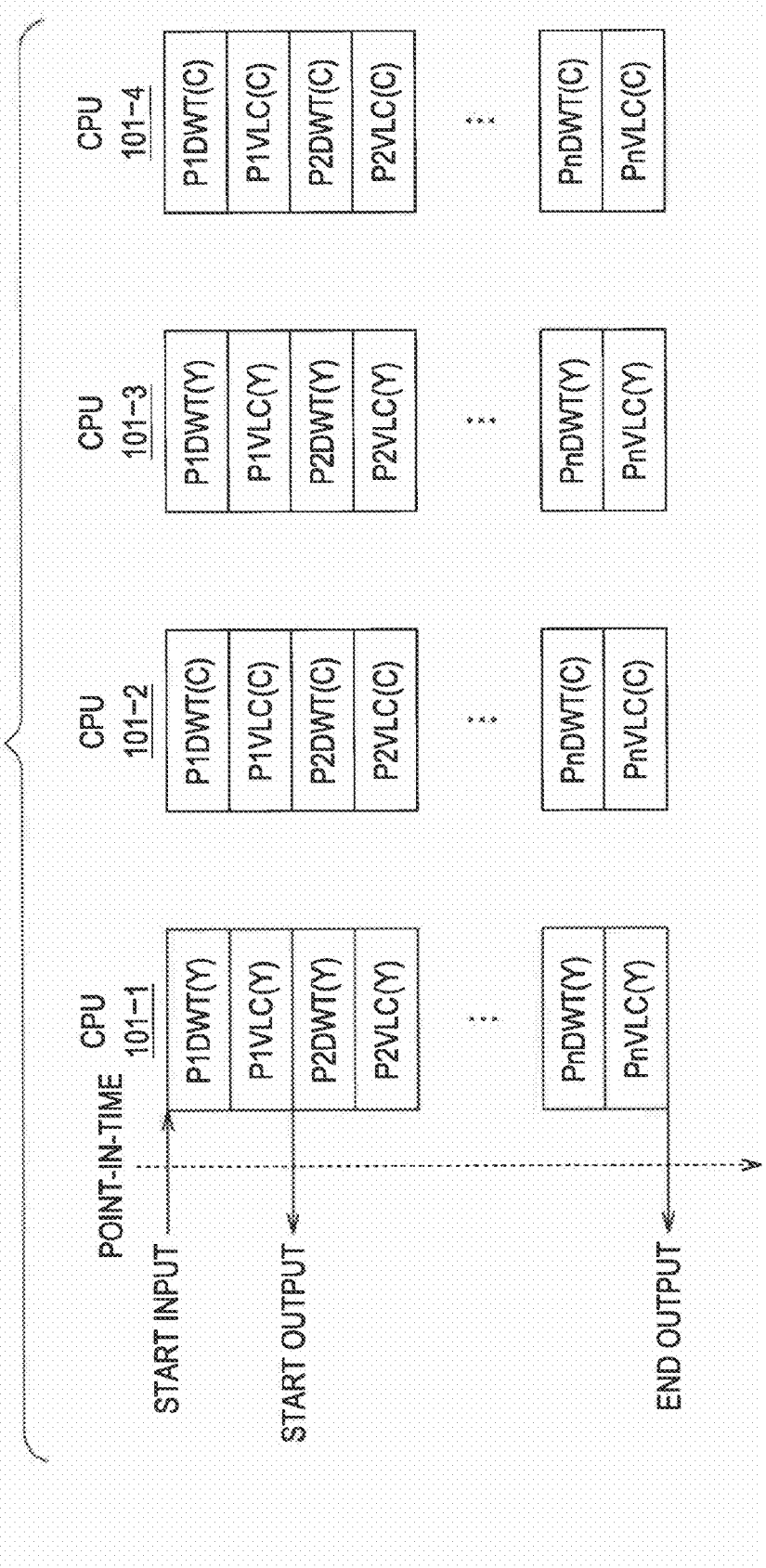
FIG. 15 is a schematic diagram illustrating the processing flow in the case of the example in FIG. 14.

With the example in FIG. 15, the CPU 101-1 reads the image data Y of the lead precinct (P1) of the lead picture from the RAM 103, performs wavelet transformation as to the image data Y while holding the intermediate data in the cache memory 111-1 (P1DWT(Y)), and holds the obtained coefficient data in the RAM 103, following which the coefficient data is subjected to order rearranging and entropy encoding (P1VLC(Y)). The encoded data Y generated with the entropy encoding is accumulated in the RAM 103. In parallel with the processing of the CPU 101-1, the CPU 101-2 reads the image data C of the lead precinct (P1) of the lead picture from the RAM 103, performs wavelet transformation as to the image data C while holding the intermediate data in the cache memory 111-2 (P1DWT(C)), and holds the obtained coefficient data in the RAM 103, following which the coefficient data is subjected to order rearranging and entropy encoding (P1VLC(C)). The encoded data C generated with the entropy encoding is also accumulated in the RAM 103.

Accordingly, at the point-in-time that the CPU 101-1 and CPU 101-2 finish the entropy encoding for the lead precinct, encoded data worth one precinct (encoded data Y and encoded data C) is accumulated in the RAM 103, so the encoding unit 10 in this case can start output of the encoded data.

With the second precinct and thereafter also, the image data Y is encoded with the CPU 101-1, and in parallel therewith, the image data C is encoded with the CPU 101-2. Upon the image data Y and image data C of the last n'th precinct (Pn) being encoded, and the encoded data Y and encoded data C being output, the encoded data of the lead picture is all output, so the output of the encoded data for the lead picture is ended.

In parallel with the processing by the CPU 101-1 and CPU 101-2, as shown in FIG. 15, encoding processing for the second picture can be preformed with the CPU 101-3 and CPU 101-4, similar to the processing with CPU 101-1 and CPU 101-2. That is to say, in this case, the CPU 101-3 performs encoding for the image data Y of the second picture, and the CPU 101-4 performs encoding for the image data C of the second picture.

In this case, upon ending the processing as to the lead picture, the CPU 101-1 and CPU 101-2 perform decoding processing as to the third picture. The CPU 101-3 and CPU 101-4 also perform decoding processing as to the fourth picture similarly, in parallel with the processing of the CPU 101-1 and CPU 101-2. The fifth picture and thereafter are also similarly processed.

Thus, in the case of the allocation example shown in FIG. 14, the image data Y and image data C are encoded in parallel, whereby the output starting timing of the encoded data, i.e. the output timing of the encoded data Y and encoded data C of the lead precinct can be started sooner than in the case of the examples in FIGS. 11 and 13, whereby the delay time of the encoding processing can be decreased. Additionally, for similar reasons, the encoding of the lead picture can be completed faster with the case of the allocation example shown in FIG. 14 than in the case of the examples shown in FIGS. 11 and 13. Accordingly, the encoded data which is encoded with the encoding unit 10 is sequentially decoded with the decoding unit 20 and the image of the restored image data is displayed on a monitor, in which case the delay time from the encoding starting until the first picture is displayed becomes shorter in the case of the allocation example shown in FIG. 14 than in the case of the examples shown in FIGS. 11 and 13.

Also, similar to the case of the example in FIG. 13, the midway calculation buffer unit 12 is formed in the cache memory 111, and the coefficient rearranging buffer unit 13 is formed in the RAM 103, so the capacity of the midway calculation buffer unit 12 and the coefficient rearranging buffer unit 13 can be increased as compared to the example shown in FIG. 11, whereby the occurrence of buffer leakage can be suppressed, and further, the decrease in throughput can be reduced.

Note that in the case of the example in FIG. 14, the intermediate data of the wavelet transformation of the image data Y and the intermediate data of the wavelet transformation of the image data C are accumulated each in a different cache memory 111, whereby the capacity of the midway calculation buffer unit 12 can be further increased as compared to the case of the example in FIG. 13, and the occurrence of buffer leakage can be further suppressed.

However, in actuality, the information amount of the image data Y is greater than the image data C, and the pictures thereof of are more complex, so the time required for encoding processing is longer. Accordingly, waiting time occurs with the CPU 101-2, so the usage efficiency of the CPU 101 is lower than the case in FIG. 13, and throughput is also lower than in the case in FIG. 13.

Figure 16:
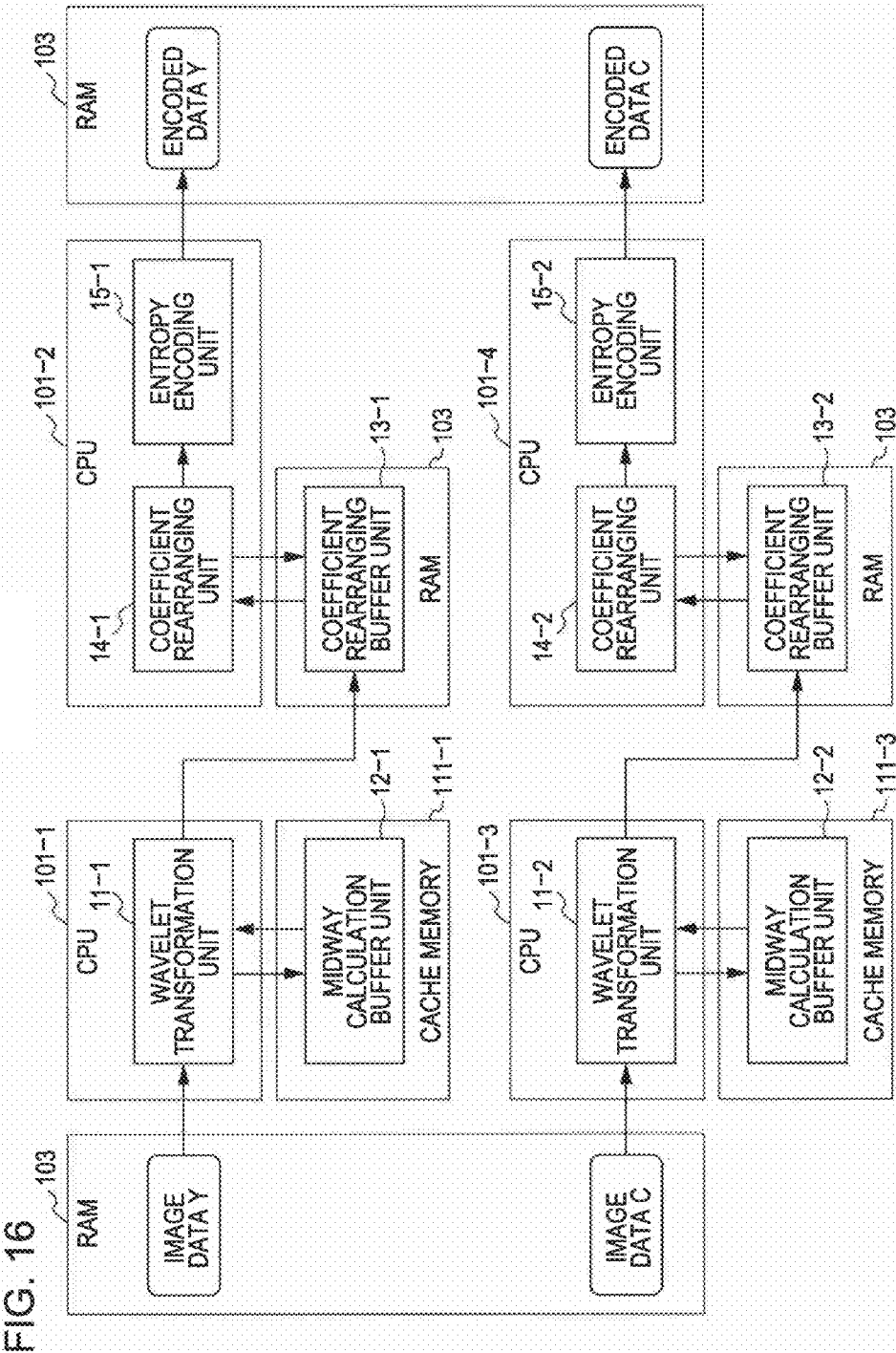
FIG. 16 is a diagram illustrating yet another example of allocating hardware resources as to the encoding unit.

FIG. 16 shows yet another example of allocating hardware resources to the encoding unit 10 in FIG. 1. With the example shown in FIG. 16, further different CPUs 101 are allocated to the wavelet transformation unit 11, coefficient rearranging unit 14, and entropy encoding unit 15 than in the allocation example in FIG. 14.

That is to say, the CPU 101-1 is allocated to the wavelet transformation unit 11-1 which performs wavelet transformation processing for the image data Y, and the CPU 101-2 is allocated to the coefficient rearranging unit 14-1 which performs coefficient rearranging of the coefficient data of the image data Y and the entropy encoding unit 15-1 which performs entropy encoding of the coefficient data of the image data Y. The midway calculation buffer unit 12-1 is formed in the cache memory 111-1 of the CPU 101-1, and the coefficient rearranging buffer unit 13-1 is formed in the RAM 103.

Similarly, the CPU 101-3 is allocated to the wavelet transformation unit 11-2 which performs wavelet transformation processing for the image data C, and the CPU 101-4 is allocated to the coefficient rearranging unit 14-2 which performs coefficient rearranging of the coefficient data of the image data C and the entropy encoding unit 15-2 which performs entropy encoding of the coefficient data of the image data C. The midway calculation buffer unit 12-2 is formed in the cache memory 111-3 of the CPU 101-3, and the coefficient rearranging buffer unit 13-2 is formed in the RAM 103.

At this time, the software program which realizes the function of the wavelet transformation unit 11 is loaded in the cache memory 111-1 and cache memory 111-3, and the software programs which realize the various functions of the coefficient rearranging unit 14 and entropy encoding unit 15 are loaded in the cache memory 111-2 and cache memory 111-4. The CPU 101-1 through CPU 101-4 each read and execute the functions of the software programs from the respective cache memory 111, as needed.

In the case of the example in FIG. 16, the image data Y is encoded with the CPU 101-1 and CPU 101-2, and the image data C is encoded with the CPU 101-3 and CPU 101-4. That is to say, the CPU 101-1 executes the processing of the wavelet transformation unit 11-1 for the image data Y, thereby reading the image data Y from the RAM 103 to perform wavelet transformation processing. In this event, the CPU 101-1 uses a portion or all of the storage region of the cache memory 111-1 as the midway calculation buffer unit 12-1, and holds the intermediate data generated with the analyzing filtering processing in the vertical direction and horizontal direction of the wavelet transformation processing in the midway calculation buffer unit 12-1.

Similar to the case of the example in FIG. 14, the CPU 101-1 uses a portion of the storage region of the RAM 103 as the coefficient rearranging buffer unit 13-1, and holds the coefficient data generated with the wavelet transformation in the coefficient rearranging buffer unit 13-1.

However, in the case of the example in FIG. 16, this differs from the case of the example in FIG. 14. The CPU 101-2 executes processing of the coefficient rearranging unit 14-1, whereby coefficient data generated by the CPU 101-1 and held in the coefficient rearranging buffer unit 13-1 of the RAM 103 is read out while being rearranged in a predetermined order. The CPU 101-2 executes the processing of the entropy encoding unit 15-1, whereby the coefficient data read out from the RAM 103 is encoded while the order is rearranged with the processing of the coefficient rearranging unit 14-1, and encoded data Y is generated. The CPU 101-2 supplies and stores the generated encoded data Y in the RAM 103.

In parallel with the processing by the CPU 101-1 and CPU 101-2, the CPU 101-3 and CPU 101-4 perform wavelet transformation, coefficient rearranging, and entropy encoding for the image data C, similar to the case of the image data Y.

As shown in FIG. 16, in the case of implementing the encoding unit 10 in the personal computer 100, encoding processing is performed with the four CPUs of CPU 101-1 through CPU 101-4 as one set. Accordingly, in this case, one encoding unit 10 is realized with the CPU 101-1 through CPU 101-4. Of course, the encoding unit 10 is arranged such that encoding processing for all of the pictures of the encoded moving image data is performed. The flow of processing in such as case is shown in FIG. 17.

Figure 17:
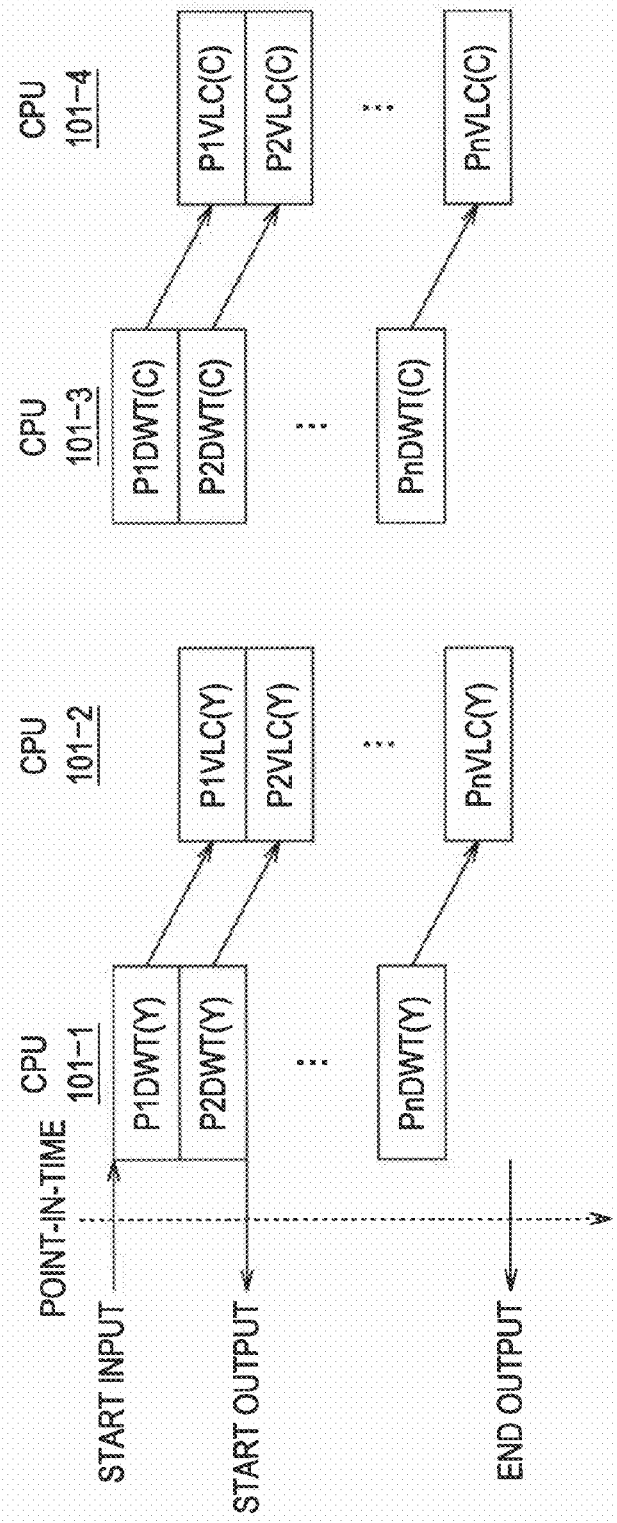
FIG. 17 is a schematic diagram illustrating the processing flow in the case of the example in FIG. 16.

The CPU 101-1 through CPU 101-4 can each be independently operated, and as with the example shown in FIG. 17, the various processes can be executed in parallel.

With the example shown in FIG. 17, the CPU 101-1 reads the image data Y of the lead precinct (P1) of the lead picture from the RAM 103, subjects the image data Y thereof to wavelet transformation while holding the intermediate data thereof in the cache memory 111-1 (P1DWT(Y)), and stores the obtained coefficient data in the RAM 103.

Upon storing the coefficient data in the RAM 103, the CPU 101-1 reads the image data Y of the second precinct (P2) of the lead picture from the RAM 103, subjects the image data Y thereof to wavelet transformation while holding the intermediate data thereof in the cache memory 111-1 (P2DWT(Y)), and stores the obtained coefficient data in the RAM 103. At this time, the CPU 101-2 reads the coefficient data of the lead precinct (P1) stored in the RAM 103, and performs order rearranging and entropy encoding (P1VLC(Y)), in parallel with the P2DWT(Y) processing of the CPU 101-1. Upon storing the obtained encoded data Y in the RAM 103, the CPU 101-2 then reads the coefficient data of the second precinct (P2) stored in the RAM 103, and performs order rearranging and entropy encoding (P2VLC(Y)).

That is to say, the CPU 101-2 and CPU 101-2 each shift the processing subjects by one precinct, and execute the wavelet transformation, coefficient rearranging, and entropy encoding in parallel. The third precinct and thereafter are similarly subjected to wavelet transformation, coefficient rearranging, and entropy encoding in parallel.

Note that the CPU 101-3 and CPU 101-4 perform processing as to the image data C similarly and in parallel to the encoding processing as to the image data Y. That is to say, the CPU 101-3 executes P1DWT(C) processing in parallel with the CPU 101-1 executing the P1DWT(Y) processing, and the CPU 101-4 executes P1VLC(C) processing, the CPU 101-3 executing the P2DWT(C) processing in parallel with the CPU 101-1 executing the P2DWT(Y) processing.

Accordingly, at the point-in-time that the CPU 101-2 and CPU 101-4 end the entropy encoding of the lead precinct, the encoded data (encoded data Y and encoded data C) of one or more precinct worth is accumulated in the RAM 103, so the encoding unit 10 in this case can start output of the encoded data.

With the second precinct and thereafter, similarly, the image data Y is encoded with the CPU 101-1 and CPU 101-2, and in parallel therewith, the image data C is encoded with the CPU 101-3 and CPU 101-4. Upon the image data Y and image data C of the last n'th precinct (Pn) being encoded, and the encoded data Y and encoded data C being output, the encoded data of the lead picture is all output, so the output of the encoded data of the lead picture is ended. The second picture and thereafter is also similarly processed.

Thus, in the case of the allocation example shown in FIG. 16, similar to the case of the example in FIG. 14, the output starting timing of the encoded data can be started earlier, thus decreasing the delay time. Additionally, in the case of the allocation example shown in FIG. 16, encoding of the fist picture can be performed at a greater speed that in the case of the example in FIG. 14, as shown in FIG. 17, so the encoded data which is encoded with the encoding unit 10 is sequentially decoded with the decoding unit 20, and in the case of displaying the image of the restored image data on a monitor, the delay time from the start of encoding until the first picture is displayed can be shortened.

Also, similar to the case of the example in FIG. 13, the midway calculation buffer unit 12 is formed in the cache memory 111, and the coefficient rearranging buffer unit 13 is formed in the RAM 103, so the capacity of the midway calculation buffer unit 12 and coefficient rearranging buffer unit 13 can be increased more than in the case of the example in FIG. 11, enabling the occurrence of buffer leakage to be suppressed and further lessening decreased throughput.

Further, in the case of the example in FIG. 16, similar to the case of the example in FIG. 14, the intermediate data of the wavelet transformation of the image data Y and the intermediate data of the wavelet transformation of the image data C are each accumulated in a different cache memory 111, so the capacity of the midway calculation buffer unit 12 can be further increased, enabling the occurrence of buffer leakage to be suppressed.

However, in actuality, the amount of information is greater with the image data Y than the image data C, and the picture is more complex, so the time needed for encoding processing is longer. Accordingly, waiting time occurs with the CPU 101-3 and CPU 101-4. Further, the CPU 101 switches during the encoding processing so control becomes more complex and the processing time also increases greatly. Accordingly, the usage efficiency of the CPU 101 decreases further than the case in FIG. 14, and throughput also decreases more than the case in FIG. 14.

The various processing of the wavelet transformation, coefficient rearranging, and entropy encoding are each configured with multiple functions, so changing the CPU 101 for allocation other than with the wavelet transformation and coefficient rearranging as described above can be performed, but if the processing cannot be executed in parallel, the processing time cannot be shortened even if different CPUs 101 are allocated for each process. With the encoding unit 10 shown in FIG. 1, performing the detailed processing included in the processing of the wavelet transformation unit 11 is difficult. Also, the coefficient rearranging is a readout of coefficient data from the coefficient rearranging buffer unit 13, so if a different CPU 101 is allocated for each of the coefficient rearranging and the entropy encoding, it becomes necessary to further transfer coefficient data between the CPUs 101, so the processing becomes inefficient. Accordingly, with the encoding unit 10, as described above, separating the allocation into the wavelet transformation, and the coefficient rearranging and entropy encoding, is ideal.

In the case of allocating CPUs wherein the computer automatically executes the processing, as with currently used computers, allocation is performed according to the load situation thereof, so dividing the processing at an optimal position and allocating each to different CPUs does not necessarily occur, whereby depending on the situation, the efficiency of the encoding processing may greatly decrease. By dividing the processing between the wavelet transformation, and the coefficient rearranging and entropy encoding, as in the example in FIG. 17, the encoding unit 10 can efficiently execute the encoding processing.

Note that with FIG. 16, description is given such that the coefficient rearranging buffer unit 13-1 and the coefficient rearranging buffer unit 13-2 are formed in the RAM 103, but an arrangement may be made wherein the coefficient rearranging buffer unit 13-1 is formed in the cache memory 111-2 of the CPU 101-2, and also the coefficient rearranging buffer unit 13-2 is formed in the cache memory 111-4 of the CPU 101-4.

Figure 18:
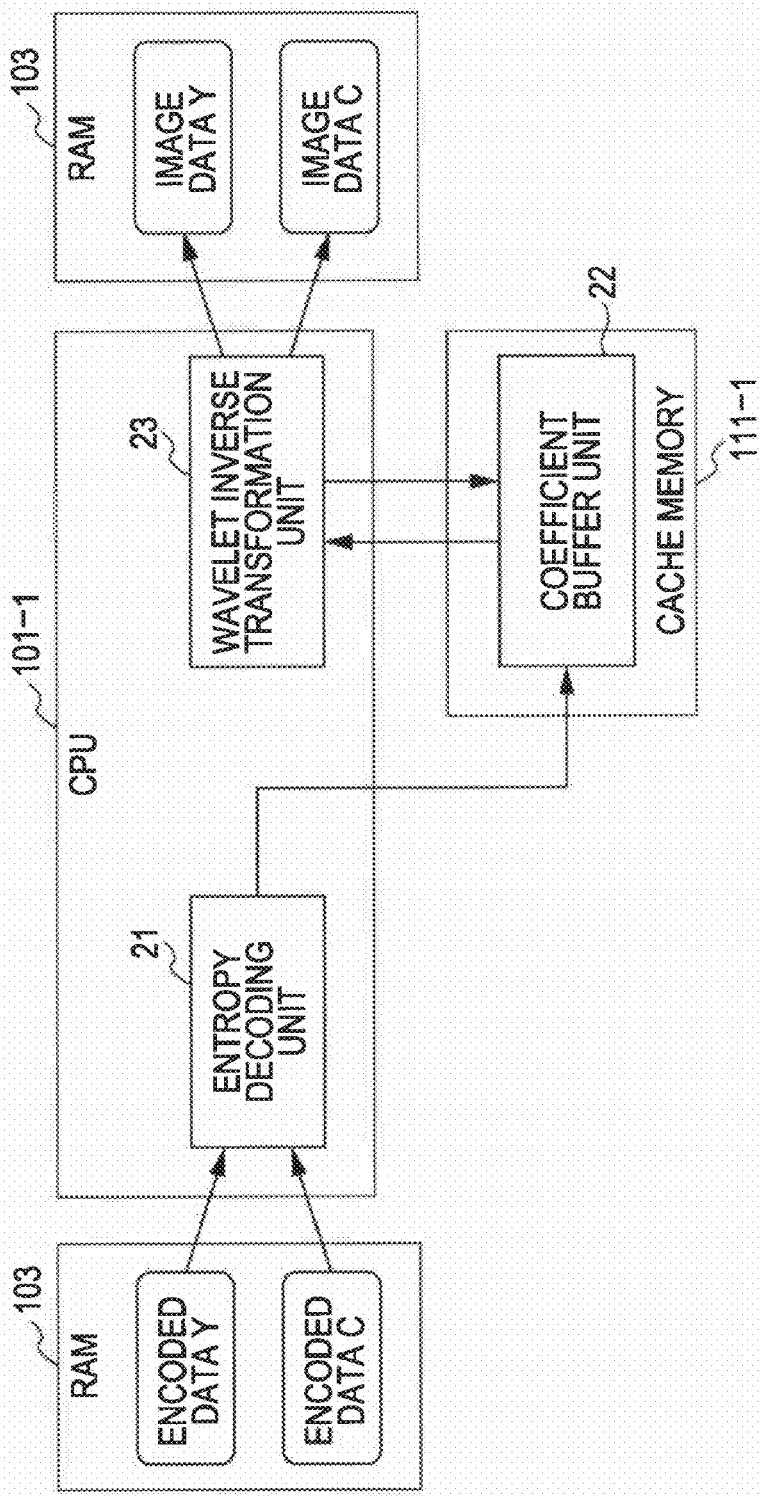
FIG. 18 is a diagram illustrating an example of allocating hardware resources as to the decoding unit.

FIG. 18 is a diagram showing hardware resource allocation as to the decoding unit 20 in FIG. 6. With the example shown in FIG. 18, similar to the case of the example of the encoding unit 10 in FIG. 11, the CPU 101-1 is allocated to all of the processing of the entropy decoding unit 21 and wavelet inverse transformation unit 23 of the decoding unit 20, and the coefficient buffer unit 22 is formed in the cache memory 111-1.

At this time, the software programs to realize the various functions of the entropy decoding unit 21 and wavelet inverse transformation unit 23 are loaded in the cache memory 111-1. The CPU 101-1 reads and executes the functions of the software programs from the cache memory 111-1 as needed.

The encoded data Y and encoded data C to be decoded is held in the RAM 103.

In the case of the example in FIG. 18, the encoded data Y and encoded data C are both decoded with the CPU 101-1. That is to say, by executing the processing of the entropy decoding unit 21, the CPU 101-1 reads the encoded data Y from the RAM 103 and performs entropy decoding. The CPU 101-1 uses a portion or all of the storage region of the cache memory 111-1 as the coefficient buffer unit 22, and holds the coefficient data generated by the entropy decoding in the coefficient buffer unit 22.

By executing the processing of the wavelet inverse transformation unit 23, the CPU 101-1 reads the coefficient data held in the coefficient buffer unit 22 of the cache memory 111-1, performs wavelet inverse transformation processing, and restores the image data Y. The CPU 101-1 supplies and stores the restored image data Y to the RAM 103. The CPU 101-1 performs processing as to the image data C similar to the case of the image data Y.

As shown in FIG. 18, in the case of implementing the encoding unit 10 in the personal computer 100, all of the processing of the decoding unit 20 is executed with one CPU 101, and the coefficient data generated with the entropy decoding processing is stored in the cache memory 111 of the CPU 101.

At this time, an arrangement may be made wherein, for example, the other CPU 101-2 through 101-4 are allocated to the decoding unit 20 similar to the CPU 101-1. That is to say, similar to the case of the CPU 101-1 shown in FIG. 18, the software programs realizing the various functions of the entropy decoding unit 21 and wavelet inverse transformation unit 23 are loaded into each of the cache memory 111-2 through cache memory 111-4. The CPU 101-2 through 101-4 read and execute the software programs from each of the cache memory 111, and execute the entropy decoding unit 21 and wavelet inverse transformation unit 23 of the decoding unit 20. At this time, the coefficient buffer unit 22 is formed in each of the cache memory 111-2 through cache memory 111-4, similar to the cache memory 111-1.

That is to say, in this case, four decoding units 20 are realized with the CPU 101-1 through CPU 101-4. These decoding units 20 are allocated to each picture of the image data before encoding of the encoded data. That is to say, in this case, the CPU 101-1 through CPU 101-4 execute the decoding processing in parallel with one another as to each differing picture. The flow of processing in this case is shown schematically in FIG. 19.

Figure 19:
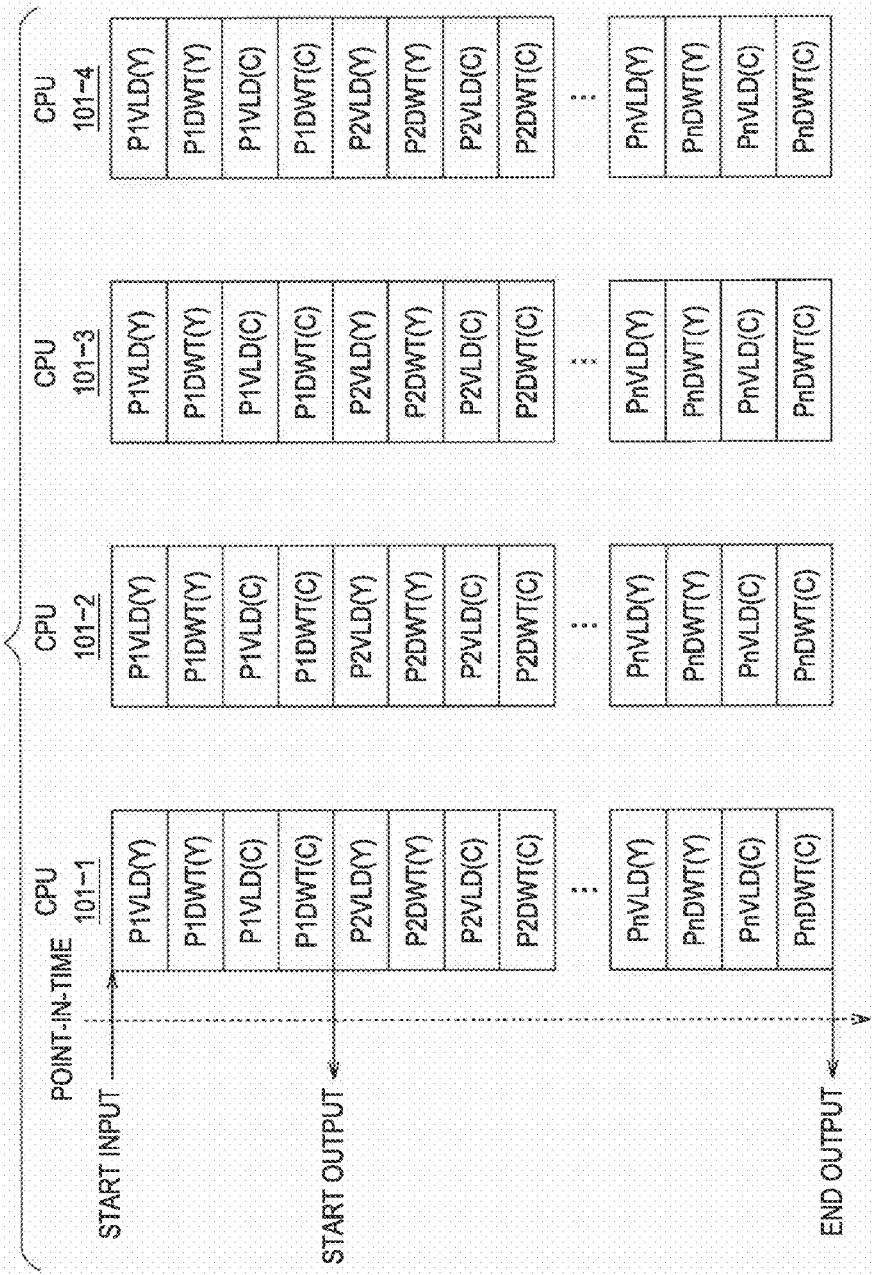
FIG. 19 is a schematic diagram illustrating the processing flow in the case of the example in FIG. 18.

As shown in FIG. 19, the CPU 101-1 which executes the processing of the entropy decoding unit 21 reads the encoded data Y of the lead precinct of the lead picture from the RAM 103 and performs entropy encoding (P1VLD(Y)), and stores the obtained coefficient data in the coefficient buffer unit 22 of the cache memory 111-1. Next, the CPU 101-1 which executes the processing of the wavelet inverse transformation unit 23 reads the coefficient data from the coefficient buffer unit 22, performs wavelet inverse transformation (P1DWT (Y)), and supplies and holds the obtained image data Y in the RAM 103. Upon the processing for the image data Y ending, the CPU 101-1 performs similar processing for the encoded data C (P1VLD(C), P1DWT(C)).

At this point in time, image data Y and image data C of at least one precinct worth is accumulated in the RAM 103, so the output of the image data Y and image data C is started.

Upon the decoding processing as to the lead precinct ending, the CPU 101-2 similarly performs decoding processing as to the second precinct and thereafter (P2VLD(Y), P2DWT (Y), P2VLD(C), P2DWT(C), and so forth).

As shown in FIG. 19, an arrangement may be made wherein similar decoding processing is performed with the CPU 101-2 for the second picture, with the CPU 101-3 for the third picture, and with the CPU 101-4 for the fourth picture, in parallel with the processing of the CPU 101-1. In this case, upon the processing as to the lead picture ending, the CPU 101-1 performs decoding processing as to the fifth picture. In parallel with the processing of the CPU 101-1, the CPU 101-2 through CPU 101-4 also perform decoding processing as to the sixth through eighth picture, respectively. Note that the ninth picture and thereafter are also similarly processed.

That is to say, in the case of the allocation shown in FIG. 18, the decoding unit 20 can simultaneously perform decoding processing for four pictures in parallel. Further, in this case, there is no need to switch between CPUs during a string of decoding processing. Also, the processing can be performed with only the cache memory 111, without using the RAM 103, so the decoding unit 20 can decode the encoded data at a high speed. That is to say, the decoding unit 20 can perform decoding processing with high throughput. Also, the personal computer 100 can implement the decoding unit 20 regardless of the number of CPUs 101 (e.g. even if there is only one).

However, the capacity of the cache memory 111 is small, so there is a limit to the amount of data that can be accumulated at one time, and depending on the data amount or content of the image data to be decoded, the cache memory 111 capacity may be insufficient, resulting in leakage. Therefore, there may be cases wherein the example of allocation shown in FIG. 18 cannot be applied in cases where a large buffer capacity is needed to execute the decoding.

Figure 20:
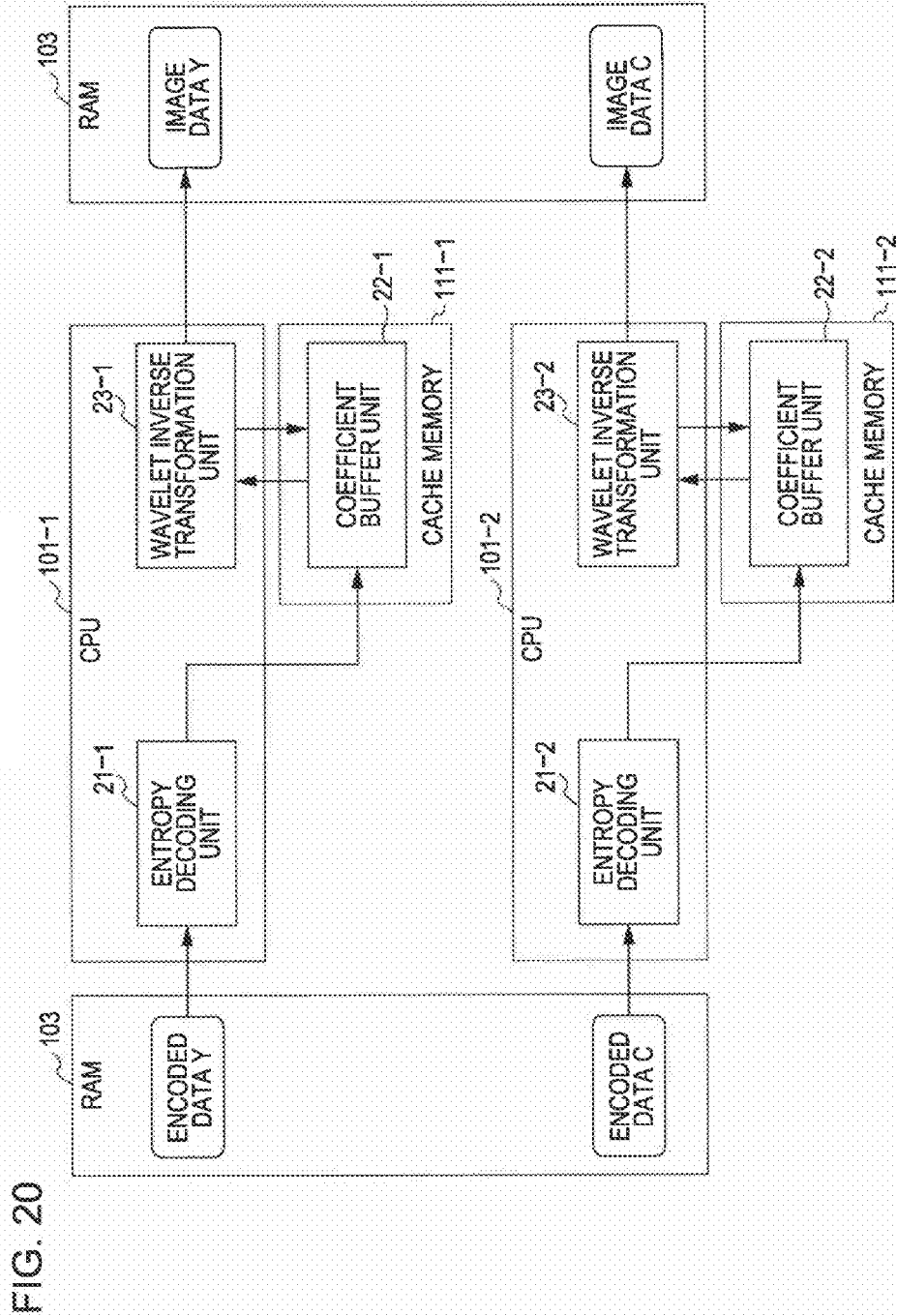
FIG. 20 is a diagram illustrating another example of allocating hardware resources as to the decoding unit.

FIG. 20 is a diagram showing another example of hardware resource allocation as to the decoding unit 20 in FIG. 6. With the example shown in FIG. 20, a different CPU is allocated for each of the decoding unit to perform decoding for the encoded data Y and the decoding unit to perform decoding for the encoded data C.

That is to say, the CPU 101-1 is allocated as to all of the processing of the entropy decoding unit 21-1 and wavelet inverse transformation unit 23-1 of the decoding unit to decode the encoded data Y, and the coefficient buffer unit 22-1 is formed in the cache memory 111-1. Also, the CPU 101-2 is allocated as to all of the processing of the entropy decoding unit 21-2 and wavelet inverse transformation unit 23-2 of the decoding unit to decode the encoded data C, and the coefficient buffer unit 22-2 is formed in the cache memory 111-2.

At this time the software programs realizing the various functions of the entropy decoding unit 21 and wavelet inverse transformation unit 23 are loaded in the cache memory 111-1 and cache memory 111-2. The CPU 101-1 and CPU 101-2 each read and execute the functions of the software programs thereof to the cache memory 111-1 or cache memory 111-2 as needed.

In the case of the example in FIG. 20, the encoded data Y is decoded with the CPU 101-1, and the encoded data C is decoded with the CPU 101-2. That is to say, the CPU 101-1 executes the processing of the entropy decoding unit 21-1, thereby reading the encoded data Y from the RAM 103 and performing entropy decoding. The CPU 101-1 uses a portion or all of the storage region of the cache memory 111-1 as the coefficient buffer unit 22-1, and holds the coefficient data generated with the entropy decoding in the coefficient buffer unit 22-1.

The CPU 101-1 executes the processing of the wavelet inverse transformation unit 23-1, thereby reading the coefficient data held in the coefficient buffer unit 22-1 of the cache memory 111-1, performing wavelet transforming processing, and restoring the image data Y. The CPU 101-1 supplies and stores the restored image data Y in the RAM 103.

The CPU 101-2 executes the processing of the entropy decoding unit 21-2, thereby reading the encoded data C from the RAM 103 and performing entropy decoding. The CPU 101-2 uses a portion or all of the storage region of the cache memory 111-2 as the coefficient buffer unit 22-2, and holds the coefficient data generated with the entropy decoding unit decoding in the coefficient buffer unit 22-2.

The CPU 101-2 executes the processing of the wavelet inverse transformation unit 23-2, thereby reading the coefficient data held in the coefficient buffer unit 22-2 of the cache memory 111-2, performing wavelet transforming processing, and restoring the image data C. The CPU 101-2 supplies and stores the restored image data C in the RAM 103.

As shown in FIG. 20, in the case of implementing the encoding unit 10 in the personal computer 100, all of the processing of the decoding unit 20 as to the image data Y and image data C is executed with one different CPU 101 each, and the coefficient data generated with the entropy decoding processing is stored in the cache memory 111 of each of the CPU 101, and the image data Y and image data C which is restored with the wavelet inverse transformation is stored together in the RAM 103. In other words, encoding processing is performed with two CPUs as one set.

At this time, an arrangement may be made wherein, for example, the other CPU 101-3 and CPU 101-4 are allocated to the decoding unit 20, similar to the CPU 101-1 and CPU 101-2. That is to say, similar to the case of the CPU 101-1 and CPU 101-2, the software programs realizing the various functions of the entropy decoding unit 21 and wavelet inverse transformation unit 23 are also loaded into the cache memory 111-3 and cache memory 111-4. The CPU 101-3 and CPU 101-4 read and execute the software programs with each of the cache memory 111, and execute the various processing of the entropy decoding unit 21 and wavelet inverse transformation unit 23 of the decoding unit 20. At this time, the coefficient buffer unit 22-1 for encoded data Y is formed in the cache memory 111-3, and the coefficient buffer unit 22-2 for the encoded data C is formed in the cache memory 111-4.

That is to say, in this case, two decoding units 20 are realized with the CPU 101-1 through CPU 101-4. These decoding units 20 are allocated for each picture of the image data before encoding of the encoded data, for example. For example, an arrangement may be made wherein the CPU 101-1 and CPU 101-2 perform decoding processing of the odd-numbered pictures, and the CPU 101-3 and CPU 101-4 perform decoding processing of the even-numbered pictures. The flow of the processing in such a case is shown in FIG. 21.

Figure 21:
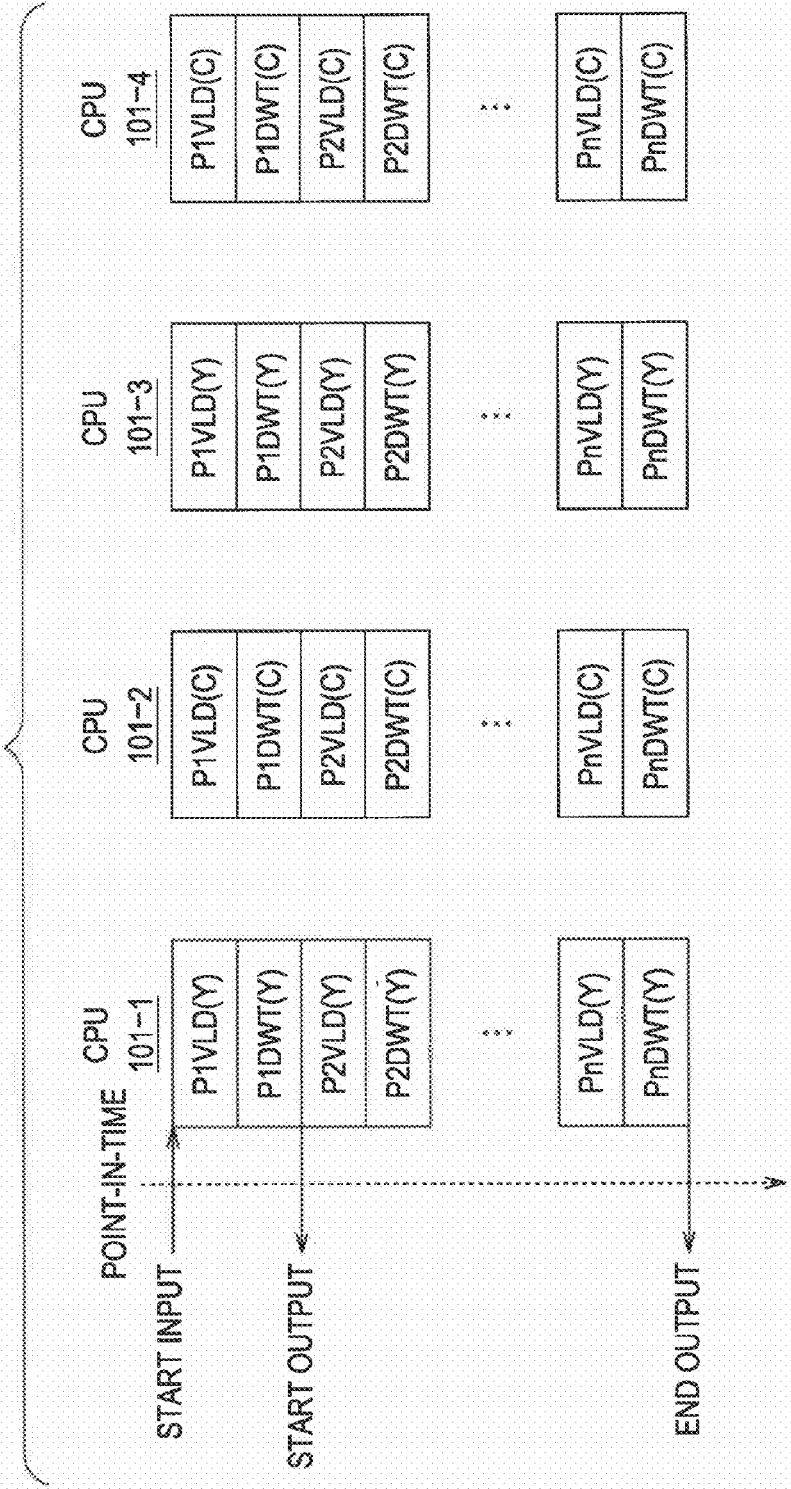
FIG. 21 is a schematic diagram illustrating the processing flow in the case of the example in FIG. 20.

In this case, as shown in FIG. 21, the CPU 101-1 which executes processing of the entropy decoding unit 21-1 reads the encoded data Y of the lead precinct of the lead picture from the RAM 103 (P1VLD(Y)), and stores the obtained coefficient data in the coefficient buffer unit 22-1 of the cache memory 111-1. Next, the CPU 101-1 which executes processing of the wavelet inverse transformation unit 23-1 reads the coefficient data from the coefficient buffer unit 22-1, performs wavelet inverse transformation (P1DWT (Y)), and supplies and holds the obtained image data Y in the RAM 103.

In parallel with this processing, the CPU 101-2 which executes the processing of the entropy decoding unit 21-2 reads the encoded data C of the lead precinct of the lead picture from the RAM 103 and performs entropy decoding (P1VLD(C)), and stores the obtained coefficient data in the coefficient buffer unit 22-2 of the cache memory 111-2. Next, the CPU 101-2 which executes the processing of the wavelet inverse transformation unit 23-2 reads the coefficient data from the coefficient buffer unit 22-2, performs wavelet inverse transformation (P1DWT(C)), and supplies and holds the obtained data C in the RAM 103.

Accordingly, at the point in time wherein the CPU 101-1 and CPU 101-2 have ended the wavelet inverse transformation for the lead precinct, the image data (image data Y and image data C) of at least one precinct worth is accumulated in the RAM 103, so the decoding unit 20 in this case can start outputting the image data.

Similarly with the second precinct and thereafter, the encoded data Y is decoded with the CPU 101-1 and the encoded data C is decoded with the CPU 101-2, in parallel with one another.

An arrangement may be made wherein the CPU 101-3 and CPU 101-4 perform decoding processing for the second picture similar to the processing of the CPU 101-1 and CPU 101-2, in parallel with the processing of the CPU 101-1 and CPU 101-2. In this case, the CPU 101-3 performs decoding for the encoded data Y of the second picture, and the CPU 101-4 performs decoding for the encoded data C of the second picture.

In this case, upon ending the processing as to the lead picture, the CPU 101-1 and CPU 101-2 perform decoding processing as to the third picture. The CPU 101-3 and CPU 101-4 also similarly perform decoding processing as to the fourth picture, in parallel with the CPU 101-1 and CPU 101-2. The fifth picture and thereafter are also similarly processed.

Accordingly, in the case of the allocation example shown in FIG. 20, the encoded data Y and encoded data C are decoded in parallel, whereby the output starting timing of the restored image data, i.e. the output timing of the image data Y and image data C of the lead precinct can be started sooner than in the case of the example in FIG. 18, whereby the delay time of the decoding processing can be reduced. Additionally, for similar reasons, the decoding of the lead picture can be completed faster with the case of the allocation example shown in FIG. 20 than in the case of the example shown in FIG. 18. Accordingly, in the case of displaying the image of the image data restored with the decoding unit 20 on a monitor, the delay time from the decoding processing starting until the first picture is displayed becomes shorter in the case of the allocation example shown in FIG. 20 than in the case of the example shown in FIG. 18.

Also, the coefficient data obtained by the encoded data Y being decoded, and the coefficient data obtained by the encoded data C being decoded, are accumulated each in a different cache memory 111, so the capacity of the coefficient buffer unit 22 can be increased more than in the case of the example in FIG. 18, and the occurrence of buffer leakage can be further suppressed.

Note that the information amount of the image data Y is greater than the image data C, and the pictures thereof are more complex, so the time required for decoding processing is longer. Accordingly, waiting time occurs with the CPU 101-2 and CPU 101-4, so the usage efficiency of the CPU 101 is lower than the case in FIG. 18, and throughput is also lower than in the case in FIG. 18.

Figure 22:
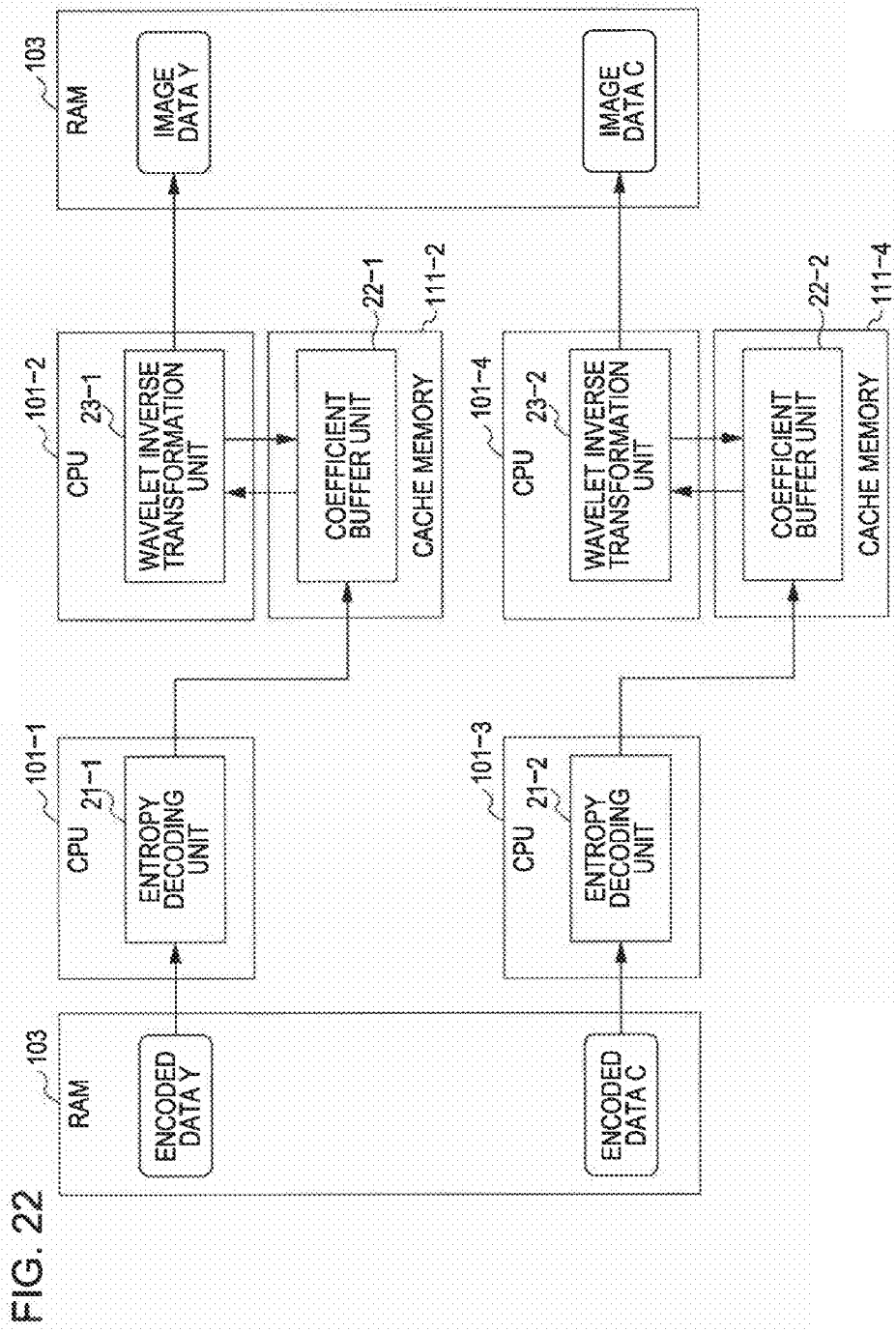
FIG. 22 is a diagram illustrating yet another example of allocating hardware resources as to the decoding unit.

FIG. 22 shows yet another example of the allocation of the decoding unit 20 in FIG. 6. With the example shown in FIG. 22, a different CPU 101 is allocated to each of the entropy decoding unit 21 and wavelet inverse transformation unit 23.

That is to say, the CPU 101-1 is allocated to the entropy decoding unit 21-1 which decodes the encoded data Y, and the CPU 101-2 is allocated to the wavelet inverse transformation unit 23-1 which performs wavelet inverse transformation processing of the coefficient data generated with the entropy decoding unit 21-1. The coefficient buffer unit 22-1 is formed in the cache memory 111-2.

Similarly, the CPU 101-3 is allocated to the entropy decoding unit 21-2 which decodes the encoded data C, and the CPU 101-4 is allocated to the wavelet inverse transformation unit 23-2 which performs wavelet inverse transformation processing of the coefficient data generated with the entropy decoding unit 21-1. The coefficient buffer unit 22-2 is formed in the cache memory 111-4.

At this time, the software program realizing the function of the entropy decoding unit 21 is loaded in the cache memory 111-1 and cache memory 111-3, and the software program realizing the various functions of the wavelet inverse transformation unit 23 is loaded in the cache memory 111-2 and cache memory 111-4. The CPU 101-1 through CPU 101-4 each read and execute the functions of the software programs from each of the cache memory 111 as needed.

In the case of the example in FIG. 22, the encoded data Y is decoded with the CPU 101-1 and CPU 101-2, and the encoded data C is decoded with the CPU 101-3 and CPU 101-4. That is to say, the CPU 101-1 executes the processing of the entropy decoding unit 21-1 for the encoded data Y, thereby reading the encoded data Y from the RAM 103 and performing entropy decoding processing. In this event, the CPU 101-1 uses a portion or all of the storage region of the cache memory 111-2 as the coefficient buffer unit 22, and holds the generated coefficient data in the coefficient buffer unit 22.

The CPU 101-2 executes the processing of the wavelet inverse transformation unit 23-1, thereby reading the coefficient data which the CPU 101-1 generates and which is held in the coefficient buffer unit 22 of the RAM 103, performs synthesizing filtering in the vertical direction and horizontal direction hierarchically as the wavelet inverse transformation processing, and generates the image data Y. The CPU 101-2 supplies and stores the generated image data Y in the RAM 103.

In parallel with the processing of the CPU 101-1 and CPU 101-2, the CPU 101-3 and CPU 101-4 perform entropy decoding processing and wavelet inverse transformation processing for the image data C, similar to the case of the example in FIG. 22.

As shown in the example in FIG. 22, in the case of implementing the decoding unit 20 in the personal computer 100, decoding processing is performed with the four CPUs of CPU 101-1 through CPU 101-4 as one set. Accordingly, in this case, one decoding unit 20 is realized with the CPU 101-1 through CPU 101-4. Of course, the decoding unit 20 is arranged such that decoding processing for all of the pictures of the decoded and restored moving image data is performed. The flow of processing in such as case is shown in FIG. 23.

Figure 23:
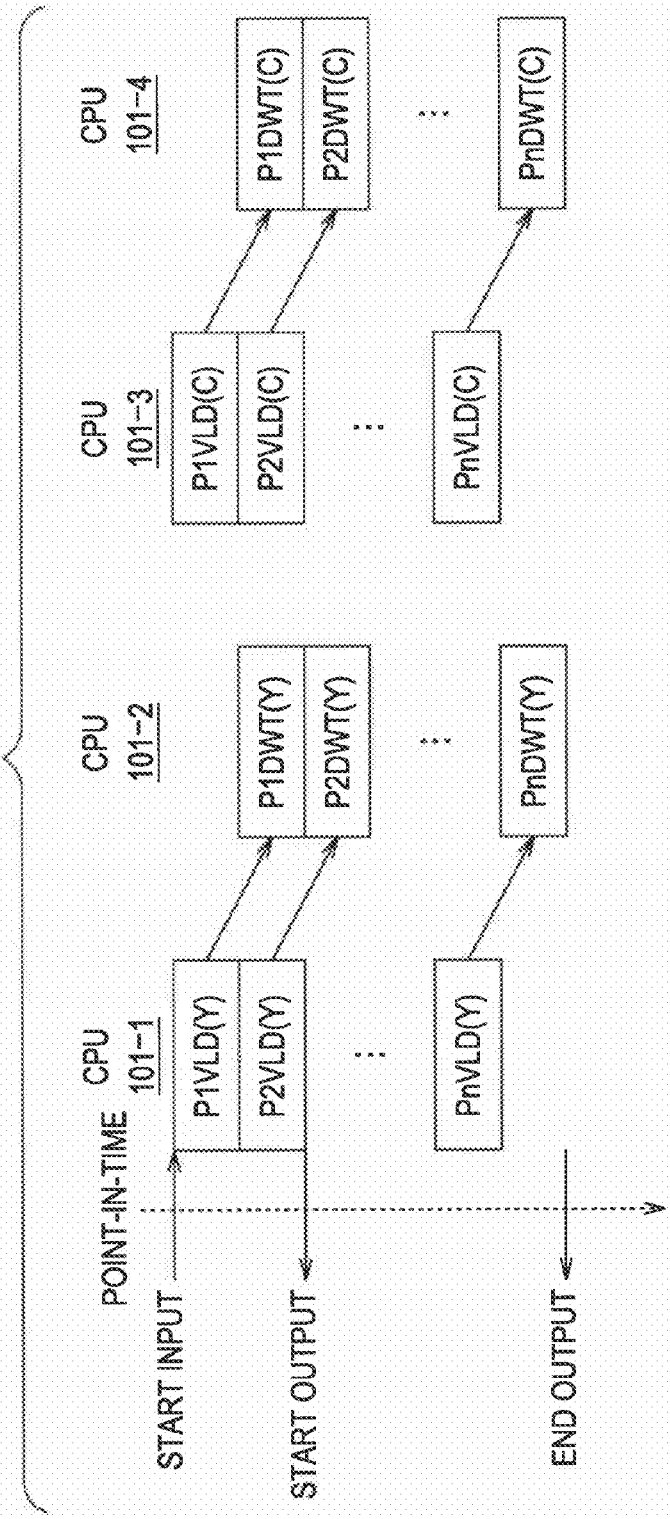
FIG. 23 is a schematic diagram illustrating the processing flow in the case of the example in FIG. 22.

The CPU 101-1 through CPU 101-4 can each be independently operated, and as with the example shown in FIG. 23, the various processes can be executed in parallel.

In this case, as shown in FIG. 23, the CPU 101-1 which executes the processing in the entropy decoding unit 21-1 reads the encoded data Y of the lead precinct of the lead picture from the RAM 103 and performs entropy decoding (P1VLD(Y)), and stores the obtained coefficient data in the coefficient buffer unit 22-1 of the cache memory 111-2. The CPU 101-1 which executes the processing of the entropy decoding unit 21-1 similarly performs entropy decoding as to the encoded data Y of the second precinct (P2VLD(Y)).

In parallel with the P2VLD(Y), the CPU 101-2 which executes the processing of the wavelet inverse transformation unit 23-1 reads the coefficient data of the lead precinct of the lead picture from the coefficient buffer unit 22-1, performs wavelet inverse transformation (P1DWT(Y)), and outputs the obtained image data Y after holding this in the RAM 103. The CPU 101-2 which executes the processing of the wavelet inverse transformation unit 23-1 performs wavelet inverse transformation (P2DWT(Y)) similarly as to the coefficient data of the second precinct.

That is to say, the CPU 101-2 and CPU 101-2 each shift the processing subjects by one precinct as to the third precinct and thereafter, and execute the entropy decoding and wavelet inverse transformation in parallel.

Note that the CPU 101-3 and CPU 101-4 perform decoding processing as to the image data C similarly and in parallel to the decoding processing as to the image data Y. That is to say, the CPU 101-3 executes P1DWT(C) processing in parallel with the CPU 101-1 executing the P1DWT(Y) processing, and the CPU 101-3 executes the P2DWT(C) processing and the CPU 101-4 executes the P1VLC(C) processing in parallel with the CPU 101-1 executing the P2DWT(Y) processing.

Accordingly, at the point in time that the CPU 101-2 and CPU 101-4 finish the wavelet inverse transformation of the lead precinct, the image data (image data Y and image data C) worth one precinct or more is accumulated in the RAM 103, so the decoding unit 20 in this case can start outputting the image data.

Similarly with the second precinct and thereafter, the encoded data Y is decoded with the CPU 101-1 and CPU 101-2, and in parallel therewith, the encoded data C is decoded with the CPU 101-3 and CPU 101-4. The encoded data Y and encoded data C of the last n'th precinct (Pn) being decoded, and the image data Y and image data C being output, the image data of the lead picture has all been output, so the output of the image data for the lead picture is ended. Similar processing is performed for the second picture and thereafter.

Thus, in the case of the allocation shown in FIG. 22, by performing the entropy decoding processing and wavelet inverse transformation processing in parallel, the output starting timing of the restored image data, i.e. the output timing of the image data Y and image data C of the lead precinct can be started sooner than in the case of the example in FIG. 20, so the delay time in the decoding processing can be reduced. Additionally, for similar reasons, in the case of the allocation example shown in FIG. 22, decoding of the lead picture can be completed faster than in the case of the example in FIG. 20. In the case of displaying an image on the monitor of image data restored with the decoding unit 20, the delay time from the time the decoding processing is started until the first picture is displayed is shorter in the case of the allocation example shown in FIG. 22 than in the case of the example in FIG. 20.

Also, similar to the case of the example in FIG. 20, the coefficient data obtained by decoding the encoded data Y and the coefficient data obtained by decoding the encoded data C is each accumulated in a different cache memory 111, enabling the capacity of the coefficient buffer unit 22 to be further increased, and the occurrence of buffer leakage to be further suppressed.

However, in actuality, the amount of information is greater with the image data Y than the image data C, and the picture is more complex, so the time needed for decoding processing is longer. Accordingly, waiting time occurs with the CPU 101-3 and CPU 101-4. Further, the CPU 101 switches during the decoding processing so control becomes more complex and the processing time also increases greatly. Accordingly, the usage efficiency of the CPU 101 decreases further than the case in FIG. 20, and throughput also decreases more than the case in FIG. 20.

The various processing of the entropy decoding and wavelet inverse transformation are each configured with multiple functions, so changing the CPU 101 for allocation other than with the entropy decoding and wavelet inverse transformation as described above can be performed, but if the processing cannot be executed in parallel, the processing time cannot be shortened even if different CPUs 101 are allocated for each process. With the decoding unit 20 shown in FIG. 6, parallelizing the detailed processing included in the processing of the wavelet inverse transformation is difficult. Accordingly, with the decoding unit 20, as described above, separating the allocation into entropy decoding and wavelet inverse transformation is ideal.

In the case of allocating CPUs wherein the computer automatically executes the processing, as with currently used computers, allocation is performed according to the load situation thereof, so dividing the processing at an optimal position and allocating each to different CPUs does not necessarily occur, whereby depending on the situation, the efficiency of the decoding processing may greatly decrease. By dividing the processing between the entropy decoding and wavelet inverse transformation, as in the example in FIG. 22, the decoding unit 20 can efficiently execute the decoding processing.

Note that with FIG. 1, description is made so as to perform coefficient rearranging immediately following the wavelet transformation (before entropy encoding), but the encoded data only needs to be supplied to the wavelet inverse transformation unit 23 of the decoding unit 20 (in FIG. 6) in the order from lowband to highband (i.e. the encoded data only needs to be supplied from the encoded data obtained by encoding the coefficient data affiliated with a lowband subband in the order towards the encoded data obtained by encoding the coefficient data affiliated with a highband subband), and the timing of rearranging may be other than immediately following the wavelet transformation.

Figure 24:
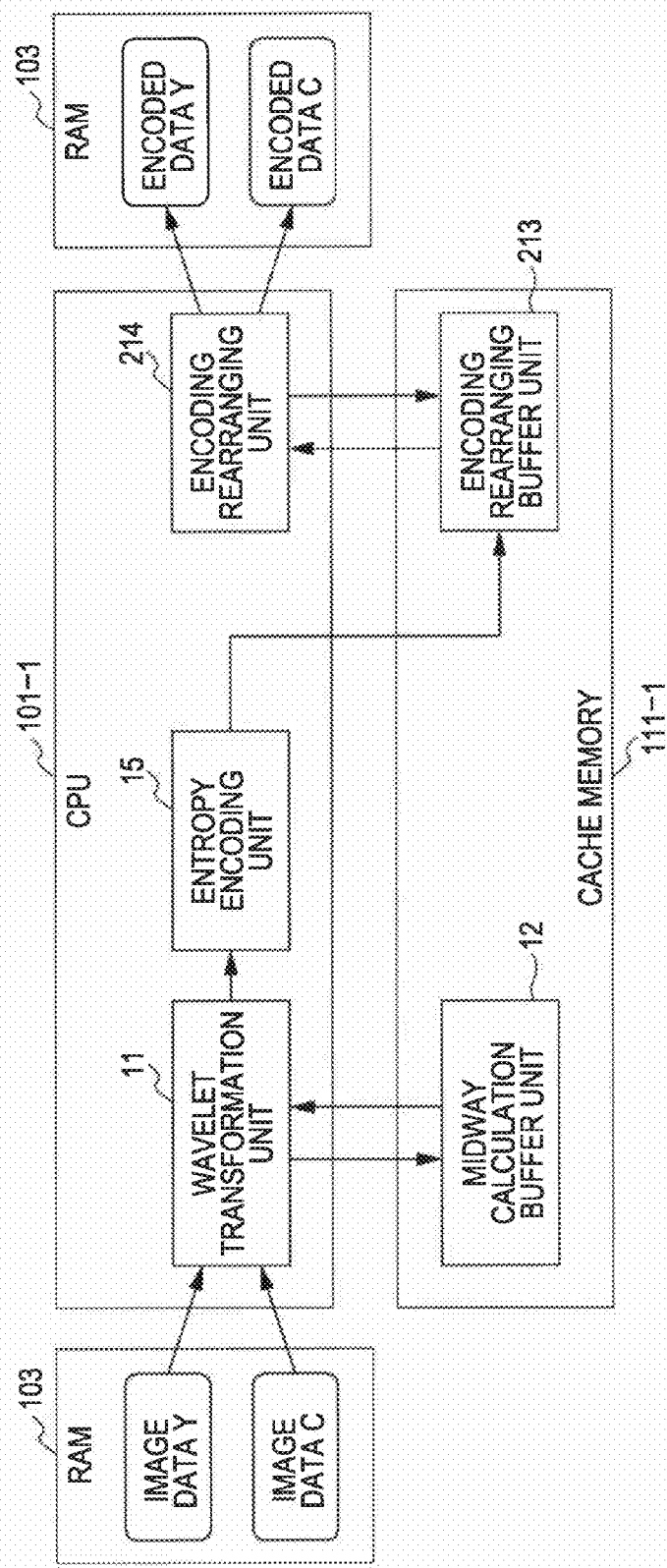
FIG. 24 is a block diagram illustrating another configuration example of the encoding unit.

For example, as shown in FIG. 24, the order of the encoded data obtained with the entropy encoding may be rearranged. The encoding unit 10 in the case of FIG. 24 has a wavelet transformation unit 11, midway calculation buffer unit 12, and entropy encoding unit 15, similar to the case in FIG. 1, but has an encoding rearranging buffer 213 and encoding rearranging unit 214 instead of the coefficient rearranging buffer unit 13 and coefficient rearranging unit 14 in FIG. 1.

The coefficient data output from the wavelet transformation unit 11 is supplied to the entropy encoding unit 15. The entropy encoding unit 15 encodes the supplied coefficient data in the supply order thereof, and holds the encoded data obtained with the encoding in the encoding rearranging buffer unit 213. That is to say, encoded data is supplied to the encoding rearranging buffer unit 213 in the order from highband to lowband. The encoding rearranging unit 214 reads the encoded data held in the encoding rearranging buffer unit 213 in the order that wavelet inverse transformation processing is performed, i.e. in the order from lowband to highband, thereby rearranging the encoded data, holding this in the RAM 103, and thereafter outputting in such order.

FIG. 24 shows a hardware resource allocation example as to such encoding unit 10. In the case of the example in FIG. 24, allocation is performed such that the various processing of the encoding processing is all performed with one CPU 101. That is to say, even in the case of rearranging the order of the encoded data, the hardware resources can be allocated similar to the case of rearranging the coefficient data which is described with reference to FIG. 11. Similarly, hardware resources can be allocated as in the examples in FIG. 13, 14, or 16. The situation of allocating hardware resources as in the example in FIG. 16 is show in FIG. 25.

Figure 25:
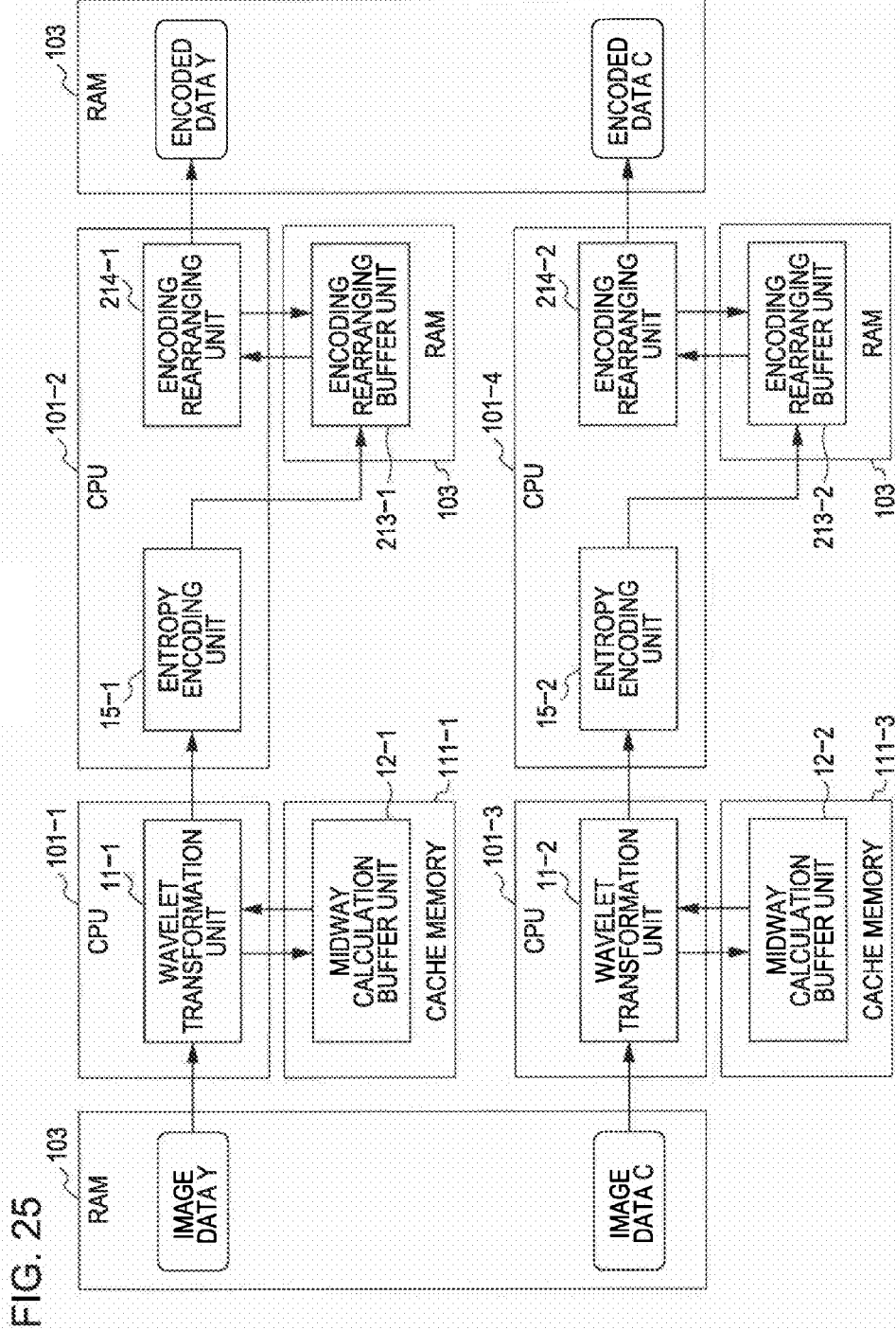
FIG. 25 is a diagram illustrating another example of allocating hardware resources as to the encoding unit in FIG. 24.

As shown in FIG. 25, in this case, the CPU 101-1 is allocated as to the wavelet transformation unit 11-1 which performs wavelet transformation processing of the image data Y, and the CPU 101-2 is allocated as to the entropy encoding unit 15-1 which performs entropy encoding of the coefficient data of the image data Y and the encoding rearranging unit 214-1 which performs rearranging of the encoded data Y. The midway calculation buffer unit 12-1 is formed in the cache memory 111-1 of the CPU 101-1, and the encoding rearranging buffer unit 213-1 is formed in the RAM 103.

Similarly, the CPU 101-3 is allocated as to the wavelet transformation unit 11-2 which performs wavelet transformation processing of the image data C, and the CPU 101-4 is allocated as to the entropy encoding unit 15-2 which performs entropy encoding of the coefficient data of the image data C and the encoding rearranging unit 214-2 which performs rearranging of the encoded data C. The midway calculation buffer unit 12-2 is formed in the cache memory 111-3 of the CPU 101-3, and the encoding rearranging buffer unit 213-2 is formed in the RAM 103.

Thus, even in the case of rearranging the order of the encoded data, similar to the case of rearranging the coefficient data, by appropriately allocating the hardware resources, the encoding unit 10 can efficiently execute encoding processing. Note that even in the case of rearranging the order of the encoded data, when allocating multiple CPUs 101 as to the wavelet transformation unit 11-1, entropy encoding unit 15-1, and encoding rearranging unit 214-1 (or wavelet transformation unit 11-2, entropy encoding unit 15-2, and encoding rearranging unit 214-2), inappropriate allocation of the hardware resources can be suppressed by determining the switchover position of the CPU 101 beforehand.

Note that the hardware resource allocation method may be other than that described above. For example, arrangements may be made with the example in FIG. 25, wherein the encoding rearranging buffer unit 213-1 is formed in the cache memory 111-2, and the encoding rearranging buffer unit 213-2 is formed in the cache memory 111-4, or the CPU 101-1 is allocated as to the entropy encoding unit 15-1 and the CPU 101-3 is allocated as to the entropy encoding unit 15-2, or a different CPU 101 is allocated to each of the wavelet transformation unit 11-1, entropy encoding unit 15-1, and encoding rearranging unit 214-1 and a different CPU 101 is allocated to each of the wavelet transformation unit 11-2, entropy encoding unit 15-2, and encoding rearranging unit 214-2.

Note that in this case, the configuration of the decoding unit 20 and the hardware resource allocation method are similar to the cases described with reference to FIGS. 18 through 23.

Figure 26:
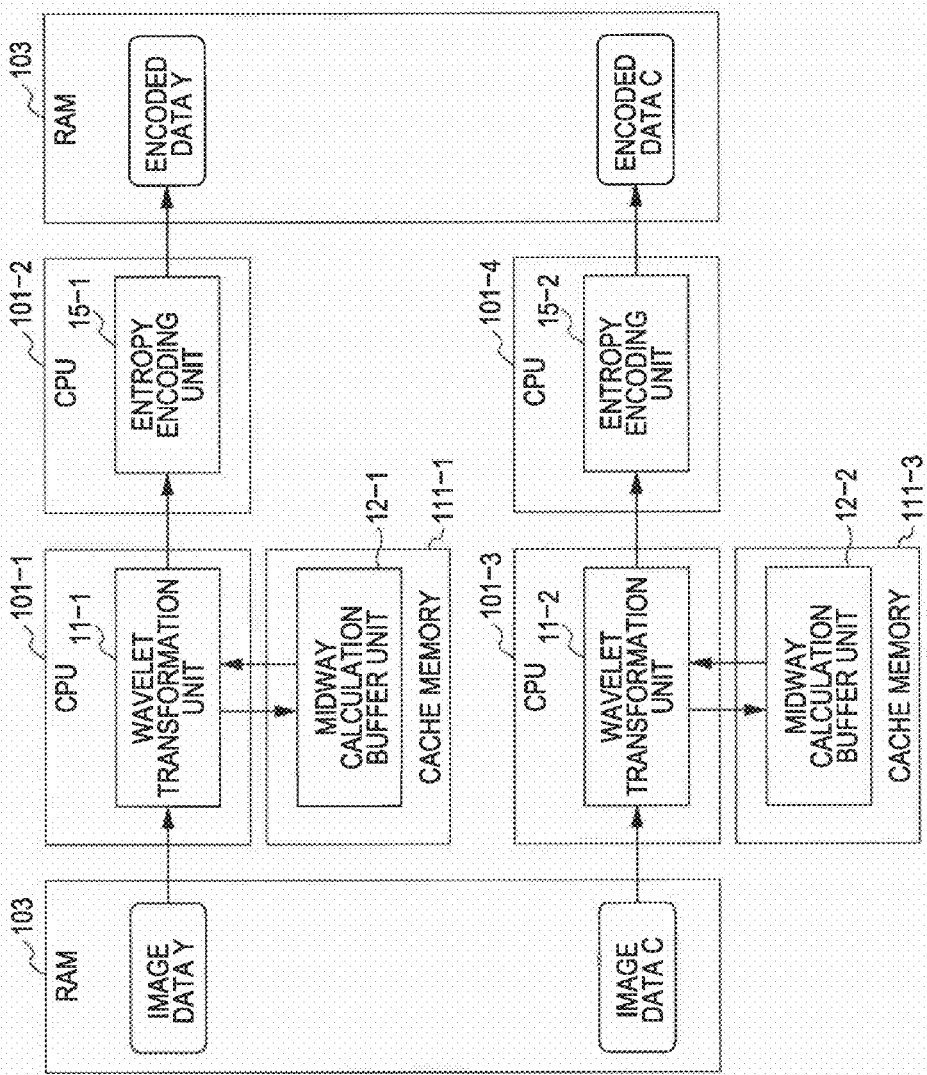
FIG. 26 is a block diagram illustrating yet another configuration example of the encoding unit.

Rearranging may be performed at the decoding unit 20 side. In this case, the encoding unit 10 has a wavelet transformation unit 11, midway calculation buffer unit 12, and entropy encoding unit 15 as shown in FIG. 26, and does not have a coefficient rearranging buffer unit 13 or coefficient rearranging unit 14 such as in FIG. 1.

Of course, allocating the CPU 101 of the encoding unit 10 can be performed similar to the case of rearranging the coefficient data, which is described with reference to FIGS. 12 through 17. That is to say, even in this case, the encoding unit 10 can efficiently execute the encoding processing by appropriately allocating the hardware resources. To exemplify, the example corresponding to the example in FIG. 16 is shown in FIG. 26.

Figure 27:
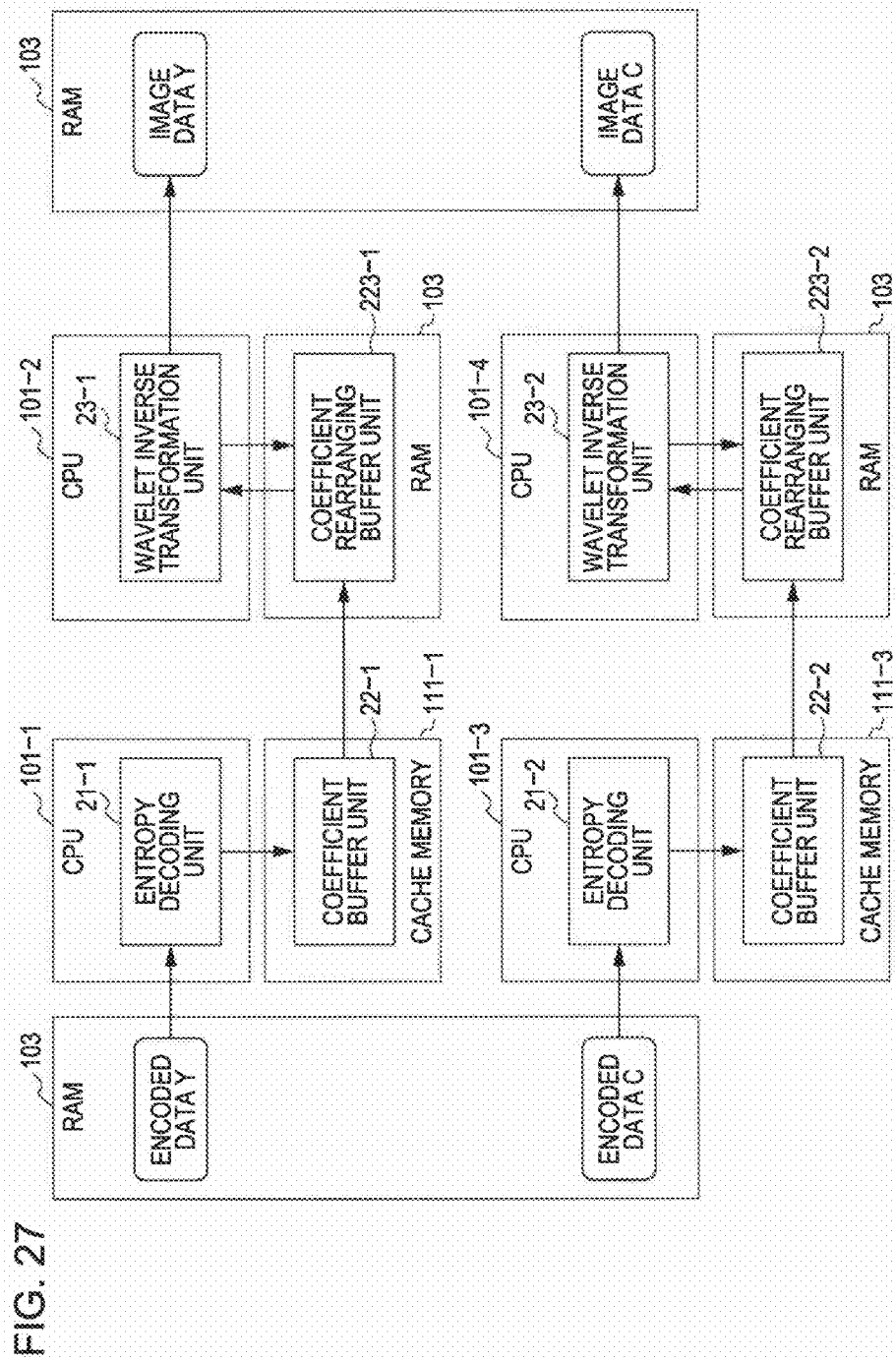
FIG. 27 is a block diagram illustrating a configuration example of the decoding unit corresponding to the encoding unit in FIG. 26.

The configuration of the decoding unit 20 corresponding to the encoding unit 10 at this time becomes as shown in FIG. 27. That is to say, the decoding unit 20 has a coefficient rearranging buffer unit 223 for rearranging the order of coefficient data between the coefficient buffer unit 22 and the wavelet inverse transformation unit 23. Similar to the example described with reference to FIGS. 18 through 23, the decoding unit 20 at this time can also be allocated to the CPU 101. That is to say, in this case also, the decoding unit 20 can efficiently execute decoding processing by appropriately allocating hardware resources. To exemplify, the example corresponding to the example in FIG. 22 is shown in FIG. 27.

In the case of the example in FIG. 27, a coefficient rearranging buffer unit 223-1 which holds the coefficient data of the luminance component Y output from the coefficient buffer unit 22-1, and a coefficient rearranging buffer unit 223-2 which holds the coefficient data of the color difference component C output from the coefficient buffer unit 22-2 are formed in the RAM 103.

The CPU 101-2 which executes processing of the wavelet inverse transformation unit 23-1 reads the coefficient data of the luminance component Y from the coefficient rearranging buffer unit 223-1 of the RAM 103 in the rearranged order, i.e. in the order from lowband towards highband, and performs wavelet inverse transformation processing as to the coefficient data in such order. The CPU 101-2 outputs the generated image data Y after holding the data in the RAM 103.

The CPU 101-4 which executes processing of the wavelet inverse transformation unit 23-2 reads the coefficient data of the color difference component C from the coefficient rearranging buffer unit 223-2 of the RAM 103 in the rearranged order, i.e. in the order from lowband towards highband, and performs wavelet inverse transformation processing as to the coefficient data in such order. The CPU 101-4 outputs the generated image data C after holding the data in the RAM 103.

Thus, by appropriately allocating the various processing of the encoding unit 10 and decoding unit 20 to the CPU 101, the processing efficiency of the encoding unit 10 and decoding unit 20 can be improved, throughput can be increased, and delay time can be reduced.

Note that with FIG. 27, description is given to show the coefficient rearranging buffer unit 223-1 and coefficient rearranging buffer unit 223-2 formed in the RAM 103, but an arrangement may be made wherein the coefficient rearranging buffer unit 223-1 is formed in the cache memory 111-2 of the CPU 101-2, or an arrangement may be made wherein the coefficient rearranging buffer unit 223-2 is formed in the cache memory 111-4 of the CPU 101-4.

Note that the features demanded of the encoding unit 10 and decoding unit 20 may differ depending on the content of the image data (image), encoding method, decoding method, usable hardware resources, usage objectives, and so forth. For example, in the case that a high resolution image wherein the number of pixels in the image of more than 4000×2000 is to be subjected to encoding processing, or in the case that the frame rate is high, the processing amount of the encoding processing and decoding processing (the amount of data to be processed) is great. Therefore, in order to perform encoding and decoding processing in real-time (instantaneously), processing with high throughput is given priority. Also, for example in a case needed to perform transfer of image data with less delay, such as with a television meeting system or a home video game system, the encoding processing and the decoding processing with less delay is given priority. Also, depending on the currently usable hardware resources or the amount of estimated memory, there may be allocation patterns which cannot be realized.

That is to say, examples of hardware allocation patterns have been described above, but which allocation pattern is the best (which can most efficiently perform processing) may differ depending on the image data content (image), encoding method, decoding method, usable hardware resources, or usage objectives and so forth.

Figure 28:
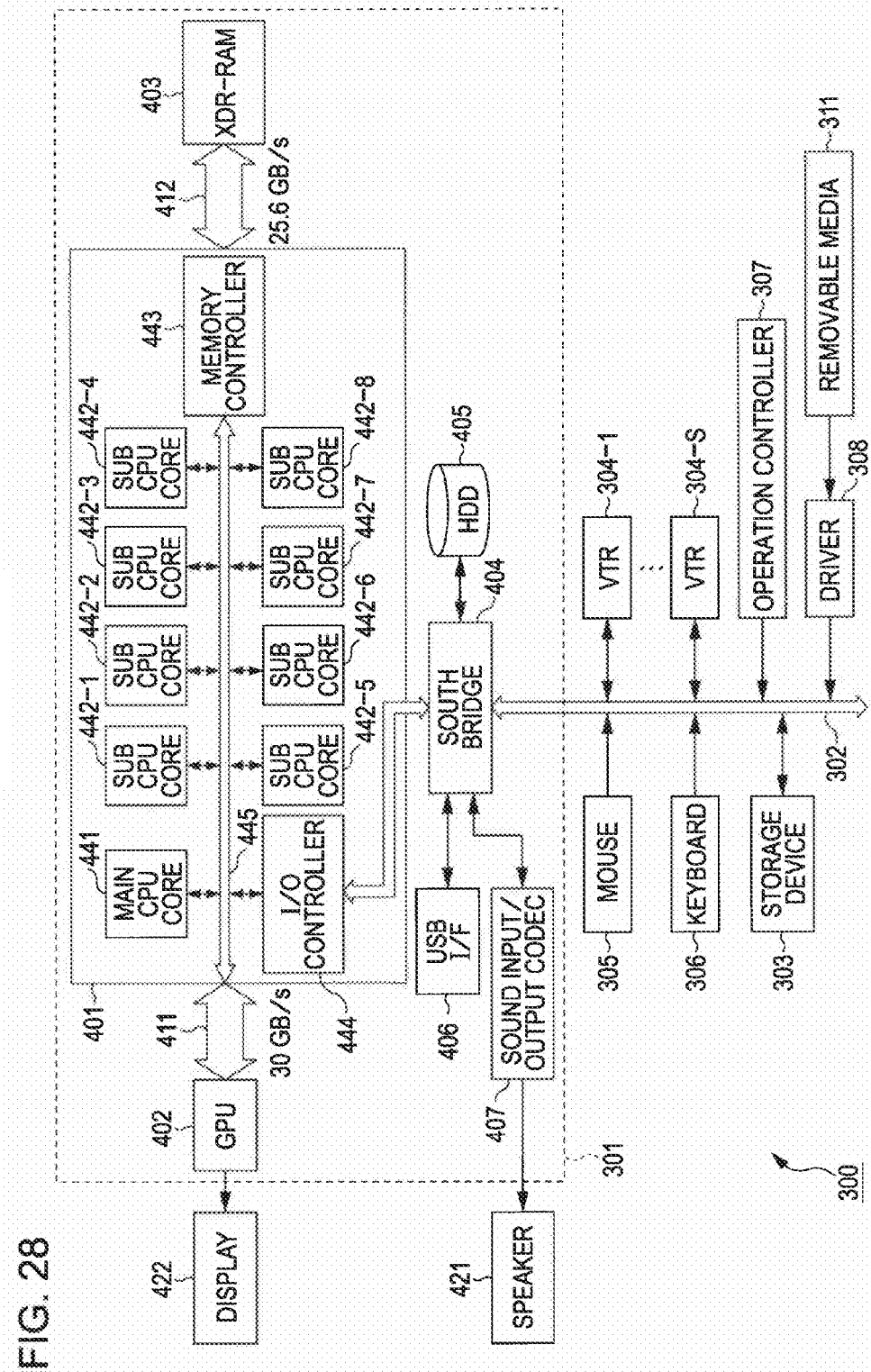
FIG. 28 is a block diagram illustrating a configuration example of an information processing system.

Multiple hardware allocation patterns may be prepared beforehand such as those described above, so that an appropriate allocation pattern can be applied with various types of conditions, appropriately selecting an allocating pattern according to the condition, a case of which will be described below. First, an example of hardware resources allocated to the software encoding unit and software decoding unit will be described. FIG. 28 is a block diagram showing a configuration example of the information processing system wherein the software encoding unit and software decoding unit are implemented.

As shown in FIG. 28, the information processing system 300 is a system configured with an information processing device 301, a storage device 303 which is connected to the information processing device 301 and a PCI bus 302, a VCR 304-1 through VCR 304-S which are multiple video cassette recorders (VCR), and a mouse 305, keyboard 306, and operation controller 307 for a user to perform operational input thereto, and is a system to perform image encoding processing or image decoding processing such as that described above with installed programs.

For example, the information processing device 301 of the information processing system 300 can store the encoded data obtained by encoding the moving image content stored in a large-capacity storage unit 303 made up of RAID (Redundant Arrays of Independent Disks) in the storage device 303, or can store the decoded image data (moving image content) obtained by decoding the encoded data stored in the storage device 303, or can record the encoded data or decoded image data on a video tape via the VCR 304-1 through VCR 304-S. Also, the information processing device 301 can also take in moving image content recorded on the video tape mounted in the VCR 304-1 through VCR 304-S in the storage device 303. In such an event, an arrangement may be made wherein the information processing device 301 encodes the moving image content.

The information processing device 301 has a microprocessor 401, GPU (Graphics Processing Unit) 402, XDR (Extreme Data Rate)-RAM 403, south bridge 404, HDD (Hard Disk Drive) 405, USB interface (USB I/F) 406, and sound input/output codec 407.

The GPU 402 is connected to the microprocessor 401 via a dedicated bus 411. The XDR-RAM 403 is connected to the microprocessor 401 via a dedicated bus 412. The south bridge 404 is connected to an I/O controller 444 of the microprocessor 401 via a dedicated bus. The south bridge 404 is also connected to the HDD 405, USB interface 406, and sound input/output codec 407. The sound input/output codec 407 is connected to a speaker 421. Also, the GPU 402 is connected to a display 422.

Also, the south bridge 404 is further connected to a mouse 305, keyboard 306, VCR 304-1 through VCR 304-S, storage device 303, and operation controller 307 via the PCI bus 302.

The mouse 305 and keyboard 306 receive user operation input, and supply a signal indicating content of the user operation input to the microprocessor 401 via the PCI bus 302 and south bridge 404. The storage device 303 and VCR 304-1 through VCR 304-S can record or play back predetermined data.

The PCI bus 302 is further connected to a driver 308 as needed, and removable media 311 such as a magnetic disk, optical disk, magneto-optical disk, or semiconductor memory is mounted thereupon as appropriate, and the computer program read out therefrom is installed in the HDD 405 as needed.

The microprocessor 401 is configured with a multi-core configuration, having a general-use main CPU core 441 which executes basic programs such as an OS (Operating System), sub-CPU core 442-1 through sub-CPU core 442-8 which are multiple (eight in this case) signal processing processors of a RISC (Reduced Instruction Set Computer) type connected to the main CPU core 441 via a shared bus 445, a memory controller 443 to perform memory control as to the XDR-RAM 403 having a capacity of 256 megabytes for example, and an I/O (In/Out) controller 444 to manage the input/output of data between the south bridge 404, and for example realizes an operational frequency of 4 GHz.

At time of startup, the microprocessor 401 reads the necessary application program stored in the HDD 405 and expands this in the XDR-RAM 403, based on the control program stored in the HDD 405, and executes necessary control processing thereafter based on the application program and operation operations.

Also, by executing the software, the microprocessor 401 realizes the above-described encoding processing and decoding processing, supplies the encoded stream obtained as a result of the encoding via the south bridge 404, and can supply and store this in the HDD, or transfer the data of the playback picture of the moving image content obtained as a result of decoding to the GPU 402, and display this on a display 422.

The usage method for each CPU core within the microprocessor 401 is arbitrary, but an arrangement may be made wherein, for example, the main CPU core 441 performs processing relating to control of the image encoding processing and image decoding processing, and subjects the eight sub-CPU core 442-1 through sub-CPU core 442-8 to execute the various processing of wavelet transformation, coefficient rearranging, entropy encoding, entropy decoding, wavelet inverse transformation, quantizing, and inverse quantizing and so forth, simultaneously and in parallel as described with reference to FIG. 9, for example. In such a case, if the main CPU core 441 allocates processing to each of the eight sub-CPU core 442-1 through sub-CPU core 442-8 in increments of precincts, the encoding processing and decoding processing is executed simultaneously and in parallel in increments of precincts, similar to the case described with reference to FIG. 9. That is to say, the efficiency of the encoding processing and decoding processing can be improved, the delay time of the overall processing can be reduced, and further, load, processing time, and memory capacity necessary for processing can be reduced. It goes without saying that the various processing may be performed with methods other than these described.

In addition to a final rendering processing relating to waiting for texture when the playback picture of the moving image contents displayed on the display 422 is moved, the GPU 402 can control the functions performing coordinate transformation calculating processing for displaying multiple playback pictures of moving image content and still images of still image content on a display 422 at one time, expanding/reducing processing as to the playback picture of the moving image content and still images of the still image content, and lessen the processing load of the microprocessor 401.

The GPU 402 performs, under control of the microprocessor 401, predetermined signal processing as to the supplied picture data of the moving image content or image data of the still image content, and consequently sends the obtained picture data and image data to the display 422, and displays the image signal on the display 422.

Incidentally, the playback images with multiple moving image contents wherein the eight sub CPU core 442-1 through sub CPU core 442-8 of the microprocessor 401 are decoded simultaneously and in parallel are subjected to data transfer to the GPU 402 via the bus 411, but the transfer speed at this time is for example a maximum of 30 gigabytes per second, and is arranged such that a display can be made quickly and smoothly, even if the playback picture is complex and has been subjected to special effects.

Also, of the picture data and audio data of the moving image content, the microprocessor 401 subjects the audio data to audio mixing processing, and sends the edited audio data obtained as a result thereof to the speaker 421 via the south bridge 404 and sound input/output coded 407, whereby audio based on the audio signal can be output from the speaker 421.

Figure 29:
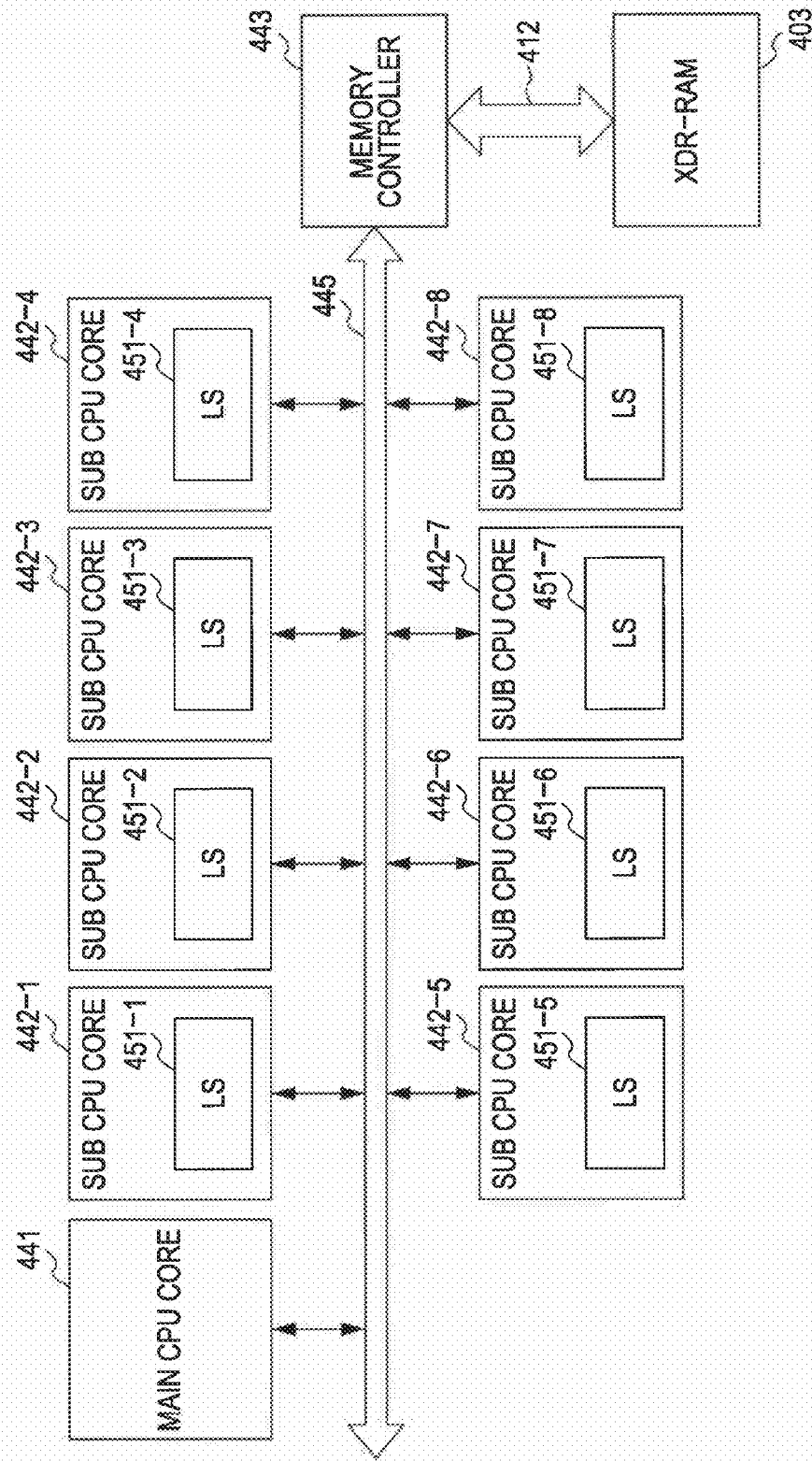
FIG. 29 is a block diagram illustrating a configuration example of a sub CPU core.

LS (Local Store) 451-1 through LS 451-8 are built in as a cache memory, as shown in FIG. 29, into each of the eight sub CPU core 442-1 through sub CPU core 442-8 in the microprocessor 401 of such an information processing system 300. That is to say, the sub CPU core 442-1 through sub CPU core 442-8 can use the storage regions of the LS 451-1 through LS 451-8 respectively built therein, and the XDR-RAM 403.

Similar to the case of the cache memory 111 of the personal computer 100 in FIG. 10, the LS 451-1 through LS 451-8 can be used exclusively by the respective sub CPU core 442-1 through sub CPU core 442-8, and also data reading and writing can be performed without transmitting via a shared bus 445, and further, operations are at a higher speed than the XDR-RAM 403. Accordingly, the LS 451-1 through LS 451-8 can read and wrote data at a higher speed than the XDR-RAM 403. However, the LS 451-1 through LS 451-8 have a higher cost per capacity as compared to the XDR-RAM 403, and the capacity thereof is small.

In actuality, the capacity of the XDR-RAM 403 is limited also, but let us say that hereafter, the capacity of the XDR-RAM 403 is sufficiently large, and conversely, the capacity of the LS 451-1 through LS 451-8 is small, wherein only the minimum necessary data can be held.

Note that hereafter, in the case there is no need to describe the sub CPU core 442-1 through sub CPU core 442-8 as distinguished from one another, these are called a sub CPU core 442. Also, in the case there is no need to describe the LS 451-1 through LS 451-8 as distinguished from one another, these are called an LS 451. The number of sub CPU cores 442 (LS 451) is shown in FIG. 28 such that eight are provided, but the number is arbitrary.

The most appropriate sub CPU core is selected by the main CPU core 441 from the sub CPU core 442-1 through sub CPU core 442-8 with multiple allocation methods prepared beforehand, and according to the allocation method thereof, the various processing of the encoding unit 10 and decoding unit 20 is allocated.

Figure 30:
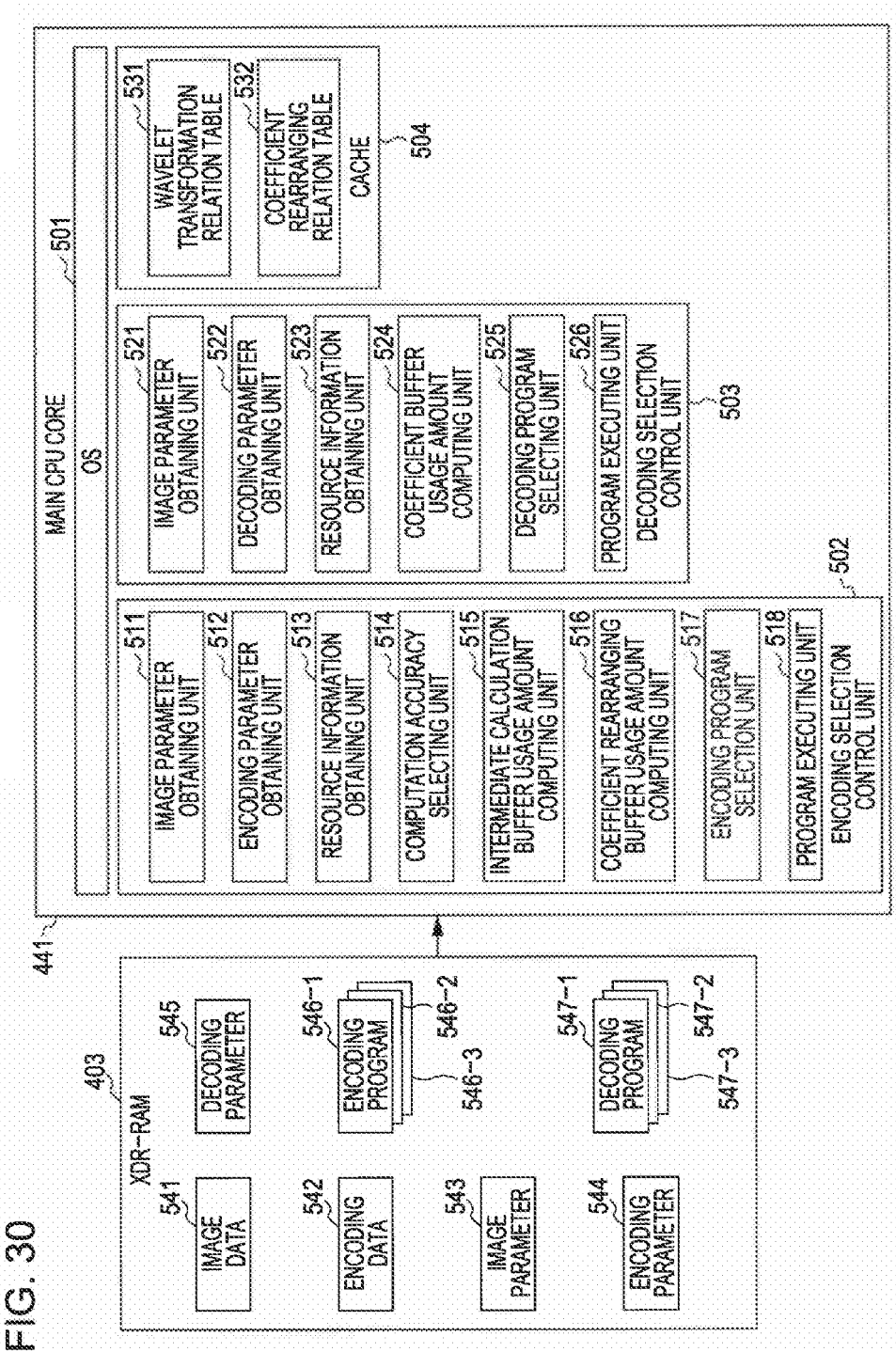
FIG. 30 is a block diagram illustrating a configuration example of a main CPU core.

FIG. 30 shows the function block of the main CPU core 441. As shown in FIG. 30, the main CPU core 441 performs control of the information processing system 300 overall, and has an OS 501 which is a basic software which causes the hardware to execute the processing of the software, an encoding selection control unit 502 to perform selection of the allocation method in the event of implementing the encoding unit 10, a decoding selection control unit 503 to perform selection of the allocation method in the event of implementing the decoding unit 20, and a cache memory 504 which is a local cache memory of the main CPU core 441.

The OS 501 manages the hardware resources of the information processing system 300, and based on request from the encoding selection control unit 502 or decoding selection processing unit 503, provides resource information which is information relating to hardware resources, and allocates hardware resources as to the processing. For example, the OS 501 reads the encoding program and decoding program from the HDD 405, allocates these to the LS 451 and XDR-RAM 403, and causes the sub CPU core 442 to execute processing. Also, the OS 501 secures the capacity region necessary for the XDR-RAM 403, for example.

The encoding selection control unit 502 has an image parameter obtaining unit 511, encoding parameter obtaining unit 512, resource information obtaining unit 513, computation accuracy selecting unit 514, midway calculation buffer usage amount computing unit 515, coefficient rearranging buffer usage amount computing unit 516, encoding program selecting unit 517, and program executing unit 518.

The image parameter obtaining unit 511 obtains an image parameter 543 which is parameter information relating to an image of the image data 541 which is to be subjected to encoding processing, or an image of the encoded data 542 which is to be subjected to decoding processing, which is held in the XDR-RAM 403. The encoding parameter obtaining unit 512 obtains an encoding parameter 544 which is parameter information relating to encoding processing, which is held in the XDR-RAM 403. The resource information obtaining unit 513 obtains resource information of at least one of information of the number of currently usable sub CPU cores, capacity of the LS 451 and so forth, via the OS 501. The computation accuracy selecting unit 514 selects the computation accuracy of the wavelet transformation processing, based on the encoding parameter 544 obtained by the encoding parameter obtaining unit 512.

The midway calculation buffer usage amount computation unit 515 computes the midway calculation buffer usage amount indicating the capacity necessary for the midway calculation buffer unit 12, for each component. The coefficient rearranging buffer usage amount computing unit 516 computes the coefficient rearranging buffer usage amount indicating the capacity needed for the coefficient rearranging buffer unit 13, for each component.

The encoding program selecting unit 517 selects one program to execute (also called use encoding program) from encoding programs 546-1, 546-2, and 546-3 held in the XDR- RAM 403, according to various conditions. The program executing unit 518 executes the encoding program (use encoding program) selected by the encoding program selecting unit 517, whereby the hardware resources of the sub CPU core 442-1 through 442-8 are allocated to each process of the encoding unit 10 in FIG. 10, according to the allocation method of the encoding program thereof, thus causing the hardware resources to perform encoding processing of image data 541. Here a process indicates a processing which the various processing units shown in FIG. 1 execute.

The decoding selection control unit 503 has an image parameter obtaining unit 521, decoding parameter obtaining unit 522, resource information obtaining unit 523, coefficient buffer usage amount computation unit 524, decoding program selecting unit 525, and program executing unit 526.

The image parameter obtaining unit 521 obtains an image parameter 543 which is held in the XDR-RAM 403. The decoding parameter obtaining unit 522 obtains a decoding parameter 545 held in the XDR-RAM 403 which is parameter information relating to decoding processing. The resource information obtaining unit 523 obtains resource information of the information processing system 300 via the OS 501.

The coefficient buffer usage amount computation unit 524 computes coefficient buffer usage amount indicating capacity needed as the coefficient buffer unit 22, for each component.

The decoding program selecting unit 525 selects one program to execute (also called use decoding program) from decoding programs 547-1, 547-2, and 547-3 held in the XDR-RAM 403, according to various conditions. The program executing unit 526 executes the decoding program (use decoding program) selected by the decoding program selecting unit 525, whereby the hardware resources of the sub CPU core 442-1 through 442-8 are allocated to each process of the decoding unit 20 in FIG. 6, according to the allocation method of the decoding program thereof, thus causing the hardware resources to perform decoding processing of encoded data 542. Here a process indicates a processing which the various processing units shown in FIG. 6 execute.

A wavelet transformation relation table 531 employed for selecting the encoding method, and a coefficient rearranging relation table 532, are held in the cache 504.

As shown in FIG. 31, the wavelet transformation relation table 531 is table information made up of the items of division numbers, 5×3 filter, and 9×7 filter, and is table information for finding a relation index to compute the capacity needed for the midway calculation buffer unit 12 for wavelet transformation.

As shown in FIG. 32, the coefficient rearranging relation table 532 is table information made up of the items of division numbers, 5×3 filter, and 9×7 filter, and is table information for finding a relation index to compute the capacity needed for the coefficient rearranging buffer unit 13.

In the XDR-RAM 403 is held image data 541, encoded data 542, image parameters 543, encoding parameters 544, decoding parameters 545, encoding programs 546-1 through 546-3, and decoding programs 574-1 through 547-3.

The image data 541 is data for a moving image for example, to be subjected to encoding processing. The encoded data 542 is data to be subjected to decoding, and is data obtained by encoding the image data.

The image parameter 543 is parameter information relating to an image. The content of the image parameter 543 is arbitrary, and any sort of parameters may be included, but for example, parameters such as the vertical/horizontal size of the image, bit depth, type of wavelet filter, and division numbers of wavelet transformation, and so forth may be included.

The encoding parameter 544 is parameter information indicating encoding conditions set beforehand. The content of the encoding parameter 544 is arbitrary, and any sort of parameters may be included, but for example, parameters such as the type of filter employed for wavelet transformation processing and wavelet inverse transformation processing, division level of the wavelet transformation, computation accuracy, latency, and the existence of priority items such as throughput, and so forth may be included.

The decoding parameter 545 is parameter information indicating decoding conditions set beforehand. The content of the decoding parameter 545 is arbitrary, and any sort of parameters may be included, but for example, parameters such as computation accuracy, latency, and the existence of priority items such as throughput, and so forth may be included.

The encoding programs 546-1 through 546-3 are each software programs realizing the encoding unit 10 in FIG. 1, and further, a hardware allocation method as to itself is determined beforehand. However, such allocation method differs for each software program. Note that hereafter, in the case there is no need to describe the encoding programs 546-1 through 546-3 as distinguished from one another, these are simply called an encoding program 546.

The decoding programs 547-1 through 547-3 are each software programs realizing the decoding unit 20 in FIG. 6, and further, a hardware allocation method as to itself is determined beforehand. However, such allocation method differs for each software program. Note that hereafter, in the case there is no need to describe the decoding programs 547-1 through 547-3 as distinguished from one another, these are simply called a decoding program 547.

FIG. 30 shows three encoding programs 546 to be held in the XDR-RAM 403, but the number of encoding programs 546 (i.e. the number of allocation programs) held in the XDR-RAM 403 is arbitrary, and may be two or less, or may be four or more. Also, FIG. 30 shows three decoding programs 547 to be held in the XDR-RAM 403, but the number of decoding programs 547 (i.e. the number of allocation programs) held in the XDR-RAM 403 is arbitrary, and may be two or less, or may be four or more.

Note that in FIG. 30, one each of the image data 541 through decoding parameter 545 is shown, but this does not necessarily indicated the number of each data. The number of image data 541 through decoding parameter 545 simultaneously held in the XDR-RAM 403 is arbitrary.

Next, various processing executed by the main CPU core 441 such as described above will be described.

Figure 33:
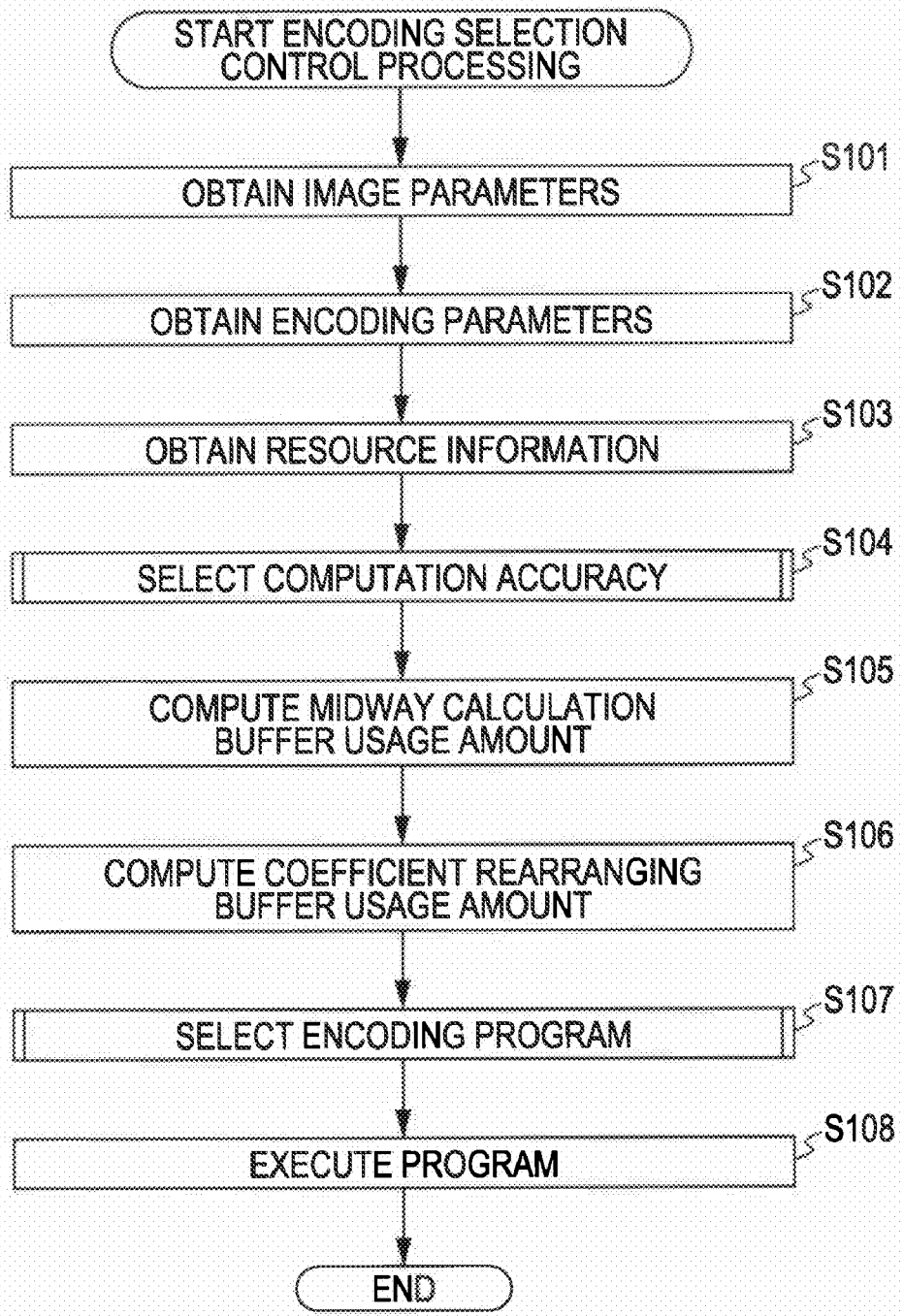
FIG. 33 is a flowchart describing an example of the flow of encoding selection control processing.

First, a flow example of encoding selection control processing executed by the encoding selection control unit 502 will be described with reference to the flowchart in FIG. 33. The encoding selection control processing is processing executed to select one use encoding program from multiple encoding programs 546 of which the allocated sub CPU core 442-1 through sub CPU core 442-8 differs for each, in the event of performing encoding processing. For example, upon the user instructing execution of encoding processing, the encoding selection control unit 502 starts encoding selection control processing.

Upon the encoding selection control processing starting, in step S101 the image parameter obtaining unit 511 obtains the image parameter 543 from the XDR-RAM 403. In step S102, the encoding parameter obtaining unit 512 obtains the encoding parameter 544 from the XDR-RAM 403. In step S103, the resource information obtaining unit 513 obtains resource information which is information relating to usable hardware resources via the OS 501. In step S104, the computation accuracy selecting unit 514 selects and sets the computation accuracy of the wavelet transformation processing, based on the image parameter 543 obtained with the processing in step S101 or the encoding parameter 544 obtained with the processing in step S102. Details of the flow of the computation accuracy selection processing will be described later.

Upon the computation accuracy being selected, the midway calculation buffer usage amount computation unit 515 employs a wavelet transformation relation table 531 in step S105 to compute the midway calculation buffer usage amount indicating the capacity necessary for the midway calculation buffer unit 12. The coefficient rearranging buffer usage amount computing unit 516 employs a coefficient rearranging relation table 532 or the like in step S106 to compute the coefficient rearranging buffer usage amount indicating the capacity necessary for the coefficient rearranging buffer unit 13.

In step S107, the encoding program selecting unit 517 selects an encoding program based on various types of information such as image parameter 543, resource information, selected computation accuracy, the computed midway calculation buffer usage amount and coefficient rearranging buffer usage amount. The details of the encoding program selection processing will be described later.

Upon the encoding program being selected, in step S108 the program executing unit 518 allocates the sub CPU core 442-1 through sub CPU core 442-8 as to the various processes according to the allocation method of the selected encoding program 546 and executes processing. Upon the processing in step S108 ending, the encoding selection control processing is ended.

Next, a flow example of the computation accuracy selection processing executed in step S104 in FIG. 33 will be described with reference to the flowchart in FIG. 34.

Upon the computation accuracy selection processing starting, the computation accuracy selection unit 514 determines whether the filter type used for wavelet transformation processing is a 5×3 filter or a 9×7 filter, based on the encoding parameter 544. In the case determination is made that a 5×3 filter is used, the processing is advanced to step S122.

In step S122, the computation accuracy selecting unit 514 determines whether or not to perform reversible encoding, based on the encoding parameter 544. In the case determination is made to perform reversible encoding, the processing advances to step S123. In step S123, the computation accuracy selecting unit 514 determines whether or not the bit depth of the image data 541 is at or below 13, based on the image parameter 543.

In the case that bit depth is determined to be 13 or less, the processing advances to step S124. In step S124, the computation accuracy selecting unit 514 selects and sets 16-bit fixed-point as the computation accuracy. Upon the processing in step S124 ending, the computation accuracy selection processing is ended, the processing is returned to step S104 in FIG. 33, and the processing in step S105 and thereafter is executed.

Figure 34:
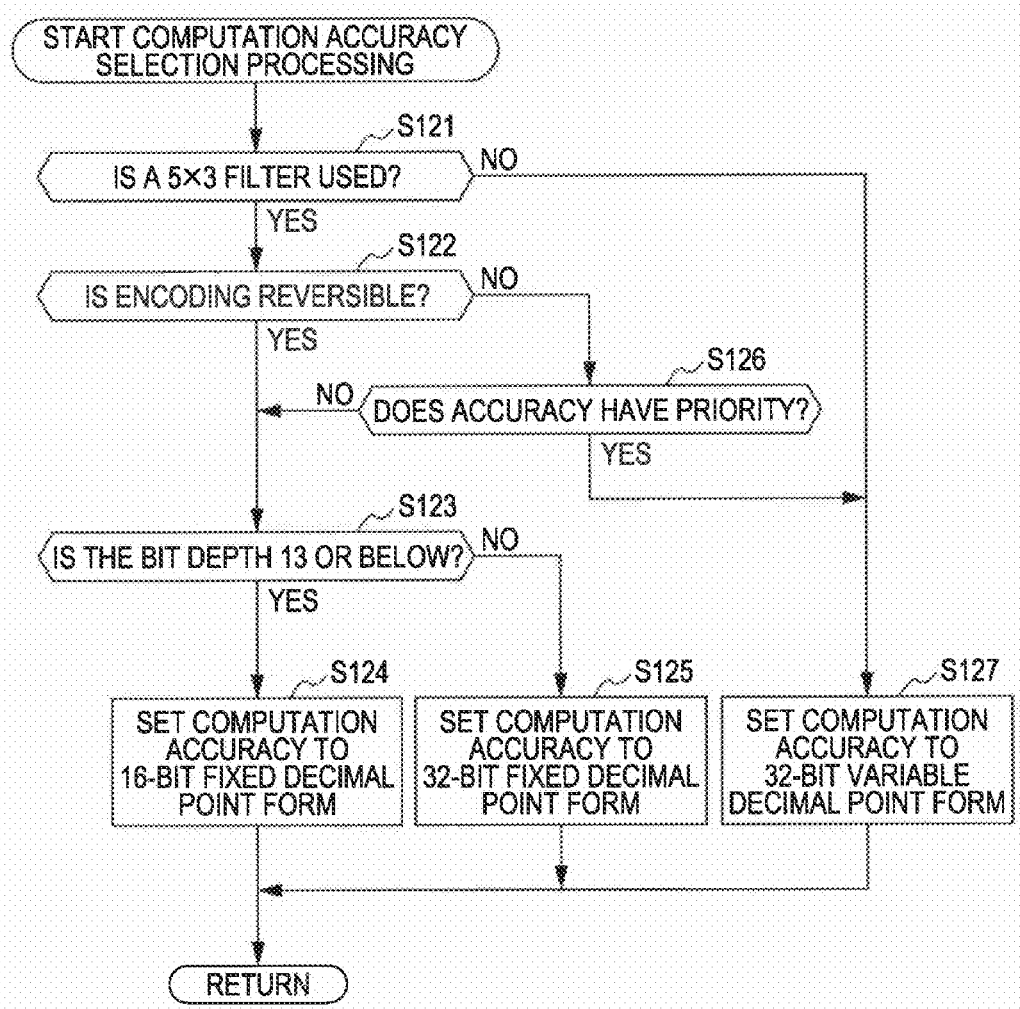
FIG. 34 is a flowchart describing an example of the flow of computation accuracy selection processing.

Also, in the case that bit depth is determined to be greater than 13 in step S123 in FIG. 34, the processing is advanced to step S125. In step S125, the computation accuracy selecting unit 514 selects and sets 32-bit fixed-point as the computation accuracy. Upon the processing in step S125 ending, the computation accuracy selection processing is ended, the processing is returned to step S104 in FIG. 33, and the processing in step S105 and thereafter is executed.

In the case that determination is made in step S122 in FIG. 34 to perform irreversible encoding, the processing is advanced to step S126. In step S126, the computation accuracy selecting unit 514 determines whether or not accuracy has priority, based on the encoding parameter 544. In the case determination is made that accuracy does not have priority, the processing is returned to step S123, and the processing thereafter is repeated.

Also, in the case determination is made in step S126 that accuracy has priority, the processing is advanced to step S127. Further, in the case determination is made in step S121 that the type of filter employed in the wavelet transformation processing is a 9×7 filter, based on the image parameter 543, the processing is advanced to step S127.

In step S127, the computation accuracy selection unit 514 selects and sets 32-bit floating-point as the computation accuracy. Upon the processing in step S127 ending, the computation accuracy selection processing is ended, the processing is returned to step S104 in FIG. 33, and the processing of step S105 and thereafter is executed. Computation accuracy is thus selected.

Next, an example of flow of the encoding program selecting processing executed in step S107 in FIG. 33 will be described with reference to the flowchart in FIG. 35.

In step S141, the encoding program selecting unit 517 determines whether or not the usage amount of the LS 451 has sufficient capacity as two components worth of a midway calculation buffer unit 12, based on the midway calculation buffer usage amount computed by the midway calculation buffer usage amount computation unit 515 and the usable amount indicating usable storage capacity of the LS 451 as confirmed by the resource information obtaining unit 513. That is to say, the encoding program selecting unit 517 determines whether or not the usable amount of the LS 451 is greater than the sum of each of the midway calculation buffer usage amounts of two components. In the case determination is made that this is sufficient, the processing is advanced to step s142.

In step S142, the encoding program selecting unit 517 determines whether or not the usage amount of the LS 451 has sufficient capacity as two components worth of a midway calculation buffer unit 12 and coefficient rearranging buffer unit 13, based on the midway calculation buffer usage amount computed by the midway calculation buffer usage amount computation unit 515, the coefficient rearranging buffer usage amount computed by the coefficient rearranging buffer usage computing unit 516, and the usable amount of the LS 451 as confirmed by the resource information obtaining unit 513. That is to say, the encoding program selecting unit 517 determines whether or not the usable amount of the LS 451 is greater than the sum of each of the midway calculation buffer usage amounts and coefficient rearranging buffer usage amounts of two components. In the case determination is made that this is sufficient, the processing is advanced to step S143.

In step S143, the encoding program selecting unit 517 determines whether or not throughput has priority based on the encoding parameter 544. In the case determination is made that throughput has priority, the processing is advanced to step S144.

In step S144, the encoding program selecting unit 517 selects the encoding program A to which the allocation method described with reference to FIG. 11 is applied. That is to say in this case, as shown in FIG. 11, one sub CPU core 442 is allocated to all of the processing of the encoding unit 10. Also, both the midway calculation buffer unit 12 and coefficient rearranging buffer unit 13 are formed in the LS 451. Upon the processing in step s144 ending, the encoding program selection processing is ended, the processing is returned to step S107 in FIG. 33, and the processing is advanced to step S108.

Figure 35:
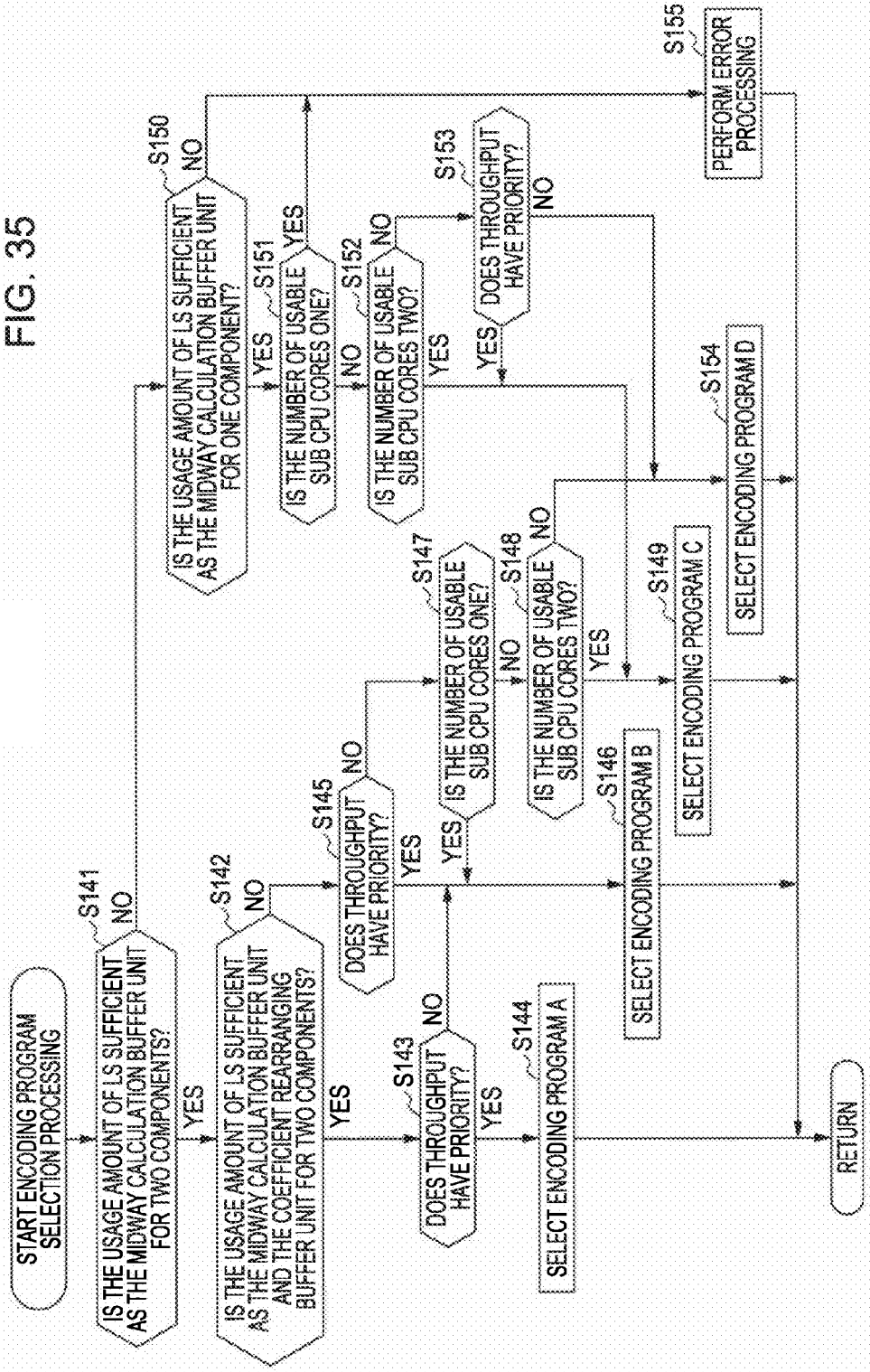
FIG. 35 is a flowchart describing an example of the flow of encoding method selection processing.

In step S142 in FIG. 35, in the case determination is made that the usable amount of LS 451 is insufficient as two components worth of the midway calculation buffer unit 12 and coefficient rearranging buffer unit 13, the processing is advanced to step S145. In step S145, the encoding program selecting unit 517 determines whether or not throughput has priority based on the encoding parameter 544. In the case determination is made that throughput has priority, the processing is advanced to step S146. Also, in the case determination is made in step S143 that throughput does not have priority, the processing is advanced to step S146.

In step S146, the encoding program selecting unit 517 selects the encoding program B to which the allocation method described with reference to FIG. 13 is applied. That is to say in this case, as shown in FIG. 13, one sub CPU core 442 is allocated to all of the processing of the encoding unit 10. Also, the midway calculation buffer unit 12 is formed in the LS 451, and the coefficient rearranging buffer unit 13 is formed in the XDR-RAM 403 which is shared memory. Upon the processing in step S146 ending, the encoding program selection processing is ended, the processing is returned to step S107 in FIG. 33, and the processing is advanced to step S108.

In step S145 in FIG. 35, in the case determination is made that throughput does not have priority, the processing is advanced to step S147. In step S147, the encoding program selecting unit 517 determines whether or not there is one currently usable sub CPU core 442, based on the resource information obtained by the resource information obtaining unit 513. In the case determination is made that there is one, the processing is returned to step S146. Also, in the case determination is made in step S147 that there are multiple usable sub CPU cores 442, the processing is advanced to step s148. In step S148, the encoding program selecting unit 517 determines whether or not there are two currently usable sub CPU cores 442, based on the resource information obtained by the resource information obtaining unit 513. In the case determination is made that there are two, the processing is advanced to step S149.

In step S149, the encoding program selecting unit 517 selects the encoding program C to which the allocation method described with reference to FIG. 14 is applied. That is to say in this case, as shown in FIG. 14, with two sub CPU cores 442 as one set, one sub CPU core 442 is allocated as to all of the processing of the encoding unit 10 which encodes the image data Y, and the other sub CPU core 442 is allocated as to all of the processing of the encoding unit 10 which encodes the image data C. Also, the midway calculation buffer unit 12-1 used with the wavelet transformation as to the image data Y is formed in the LS 451 of the sub CPU core 442 to encode the image data Y, and the midway calculation buffer unit 12-2 used with the wavelet transformation as to the image data C is formed in the LS 451 of the sub CPU core 442 to encode the image data C. Also, the coefficient rearranging buffer unit 13-1 holding the coefficient data generated with the image data Y, and the coefficient rearranging buffer unit 13-2 holding the coefficient data generated with the image data C, are both formed in the XDR-RAM 403 which is shared memory. Upon the processing in step S149 ending, the encoding program selection processing is ended, the processing is returned to step S107 in FIG. 33, and the processing is advanced to step S108.

In step S141 in FIG. 35, in the case determination is made that the usable amount of the LS 451 is not sufficient for two components worth of the midway calculation buffer unit 12, the processing is advanced to step S150. In step S150, the encoding program selecting unit 517 determines whether or not the usable amount of the LS 451 is sufficient capacity as one component worth of the midway calculation buffer unit 12, based on the usage amount of the midway calculation buffer computed by the midway calculation buffer usage amount computing unit 515 and the usable amount of the LS 451 confirmed by the resource information obtaining unit 513. That is to say, the encoding program selecting unit 517 determines whether or not the usable amount of the LS 451 is greater than the midway calculation buffer usage amount for each component. In the case determination is made that this is sufficient, the processing is advanced to step S151.

In step S151, the encoding program selecting unit 517 determines whether or not there is one currently usable sub CPU core 442, based on the resource information obtained by the resource information obtaining unit 513. In the case determination is made that there are multiple usable sub CPU cores 442, the processing is advanced to step S152. In step 152, the encoding program selecting unit 517 determines whether or not there are two currently usable sub CPU cores 442, based on the resource information obtained by the resource information obtaining unit 513. In the case determination is made that there are two, the processing is returned to step S149.

In step S152, in the case determination is made that there are three or more currently usable sub CPU cores 442, the processing is advanced to step S153. In step S153, the encoding program selecting unit 517 determines whether or not throughput has priority, based on the encoding parameter 544. In the case that determination is made that throughput has priority, and the processing is returned to step S149.

Also, in step S153, in the case determination is made that throughput does not have priority, the processing is advanced to step S154. Also, in the case determination is made in step S148 that there are three or more currently usable sub CPU cores 442, the processing is advanced to step S154.

In step S154, the encoding program selecting unit 517 selects the encoding program D to which the allocation method described with reference to FIG. 16 is applied. That is to say in this case, as shown in FIG. 16, with four sub CPU cores 442 as one set, a different sub CPU core 442 is allocated to each of the processing for the wavelet transformation unit 11-1 of the encoding unit 10 to encode the image data Y, the processing for the coefficient rearranging unit 14-1 and entropy encoding unit 15-1 of the encoding unit 10 to encode the image data Y, the processing for the wavelet transformation unit 11-2 of the encoding unit 10 to encode the image data C, and the processing for the coefficient rearranging unit 14-2 and entropy encoding unit 15-2 of the encoding unit 10 to encode the image data C.

Also, the midway calculation buffer unit 12-1 of the encoding unit 10 to encode the image data Y is formed in the LS 451 of the sub CPU core 442 to which the wavelet transformation unit 11-1 processing is allocated, and the midway calculation buffer unit 12-2 of the encoding unit 10 to encode the image data C is formed in the LS 451 of the sub CPU core 442 to which the wavelet transformation unit 11-2 processing is allocated.

Further, the coefficient rearranging buffer unit 13-1 of the encoding unit 10 to encode the image data Y and the coefficient rearranging buffer unit 13-2 of the encoding unit 10 to encode the image data C are both formed in the XDR-RAM 403 which is shared memory. Upon the processing in step S154 ending, the encoding method selection processing is ended, the processing is returned to step S107 in FIG. 33, and the processing is advanced to step S108.

In step S150 in FIG. 35, in the event determination is made that the usable amount of the LS 451 is not sufficient for one component worth of a midway calculation buffer unit 12, the processing is advanced to step S155. Also, in the event determination is made in step S151 that there is one currently usable sub CPU core, the processing is advanced to step S155. In this case, none of the four encoding programs prepared beforehand can be selected (since these cannot be installed), so the encoding program selecting unit 517 performs error processing in step S155, such as notifying the user and so forth. Upon the processing in step S155 ending, the encoding program selecting processing is ended, the processing is returned to step S107 in FIG. 33, and the processing is advanced to step S108.

Thus, the encoding selection control unit 502 can appropriately perform hardware resource allocation, based on the image parameter 543 or resource information or encoding parameter 544, so that the encoding unit 10 can operate more effectively under the actual conditions.

Note that this allocation may be performed in increments of any units, e.g. may be performed in increments of precincts or in increments of pictures. Also, description is given above to prepare four allocation methods beforehand from which the encoding program selecting unit 517 selects one, but there may be any number of hardware resource allocation methods prepared. That is to say, the number of encoding programs 546 is optional. Further, the hardware resource allocation methods are arbitrary, and may be a method other than the above-described four allocation methods.

Also, an arrangement may be made wherein an arbitrary sub CPU core 442 out of the eight sub CPU core 442-1 through sub CPU core 442-8 is employed, and the above-described encoding programs A through D are used together (operated in parallel). That is to say, for example, the encoding selection control unit 502 may employ a different encoding method for each precinct and each picture, and changing the hardware resource allocation method thereof. Thus, the encoding selection control unit 502 can allocate hardware resources to each processing of the encoding unit 10 so that hardware resources are more effectively used, so that the encoding unit 10 can be operated more efficiently.

Next, an example of flow of the decoding selection control processing executed by the decoding selection control unit 503 will be described. The decoding selection control processing is processing executed to select a use decoding program from multiple decoding programs 547 of which the allocation method is different for each sub CPU core 442-1 through sub CPU core 442-8 at the time of performing the decoding processing. For example, upon the user instructing execution of the decoding processing, the decoding selection control unit 503 starts the decoding selection control processing.

Upon the decoding selection control processing starting, in step S201 the image parameter obtaining unit 521 obtains the image parameter 543 of the encoding data 542 to be subjected to processing, which is held in the XDR-RAM 542. In step S202, the decoding parameter obtaining unit 522 obtains the decoding parameter 545 held in the XDR-RAM 403. In step S203, the resource information obtaining unit 523 obtains resource information which is information relating to usable hardware resources, via the OS 501.

The coefficient buffer usage amount computation unit 524 uses the wavelet transformation table 531 or the like in step S204 to compute the coefficient buffer usage amount indicating capacity necessary as the coefficient buffer unit 22.

In step S205, the decoding program selecting unit 525 selects a use decoding program based on the image parameter 543, decoding parameter 545, resource information, and various types of information such as the computed coefficient buffer usage amount or the like. Details of the decoding program selecting processing will be described later.

Upon the decoding program being selected, in step S206 the program executing unit 526 allocates a sub CPU core 442-1 through sub CPU core 442-8 for each process, according to the allocation method of the decoding program 547 selected as the use decoding program, and the processing is executed.

Upon the processing in step S206 ending, the encoding selection control processing is ended.

Next, an example of flow of the decoding program selection processing executed with step S204 in FIG. 36 will be described with reference to the flowchart in FIG. 37.

In step S221, the decoding program selecting unit 525 determines whether or not the usable amount of the LS 451 is sufficient capacity as the coefficient buffer unit 22, based on the coefficient buffer usage amount computed by the coefficient buffer usage amount computing unit 524 and the usable amount of the LS 451 confirmed by the resource information obtaining unit 523. That is to say, the decoding program selecting unit 525 determines whether or not the usable amount of the LS 451 is more than the coefficient buffer usage amount for each component. In the case determination is made that this is sufficient, the processing is advanced to step S222.

In step S222, the decoding program selecting unit 525 determines whether or not the decoding processing gives priority to throughput, based on the decoding parameter 545. In the case determination is made that throughput has priority, the processing is advanced to step S223.

In step S223, the decoding program selecting unit 525 determines whether or not the usable amount of the LS 451 has sufficient capacity as two components worth of the coefficient buffer unit 22, based on the coefficient buffer usage amount computed by the coefficient buffer usage computation unit 524 and the usable amount of the LS 451 confirmed by the resource information obtaining unit 523. That is to say, the decoding program selecting unit 525 determines whether or not the usable amount of the LS 451 is greater than the sum of the coefficient buffer usage amounts of each of the two components. In the case determination is made that this is sufficient, the processing is advanced to step S224.

In step S224, the decoding program selecting unit 525 selects the decoding program A to which the allocation method described with reference to FIG. 18 is applied. That is to say in this case, as shown in FIG. 18, one sub CPU core 442 is allocated to all of the processing of the decoding unit 20. Also, the coefficient buffer unit 22 is formed in the LS 451. Upon the processing in step S224 ending, the decoding program selection processing is ended, the processing is returned to step S204 in FIG. 36, and the processing is advanced to step S205.

Figure 37:
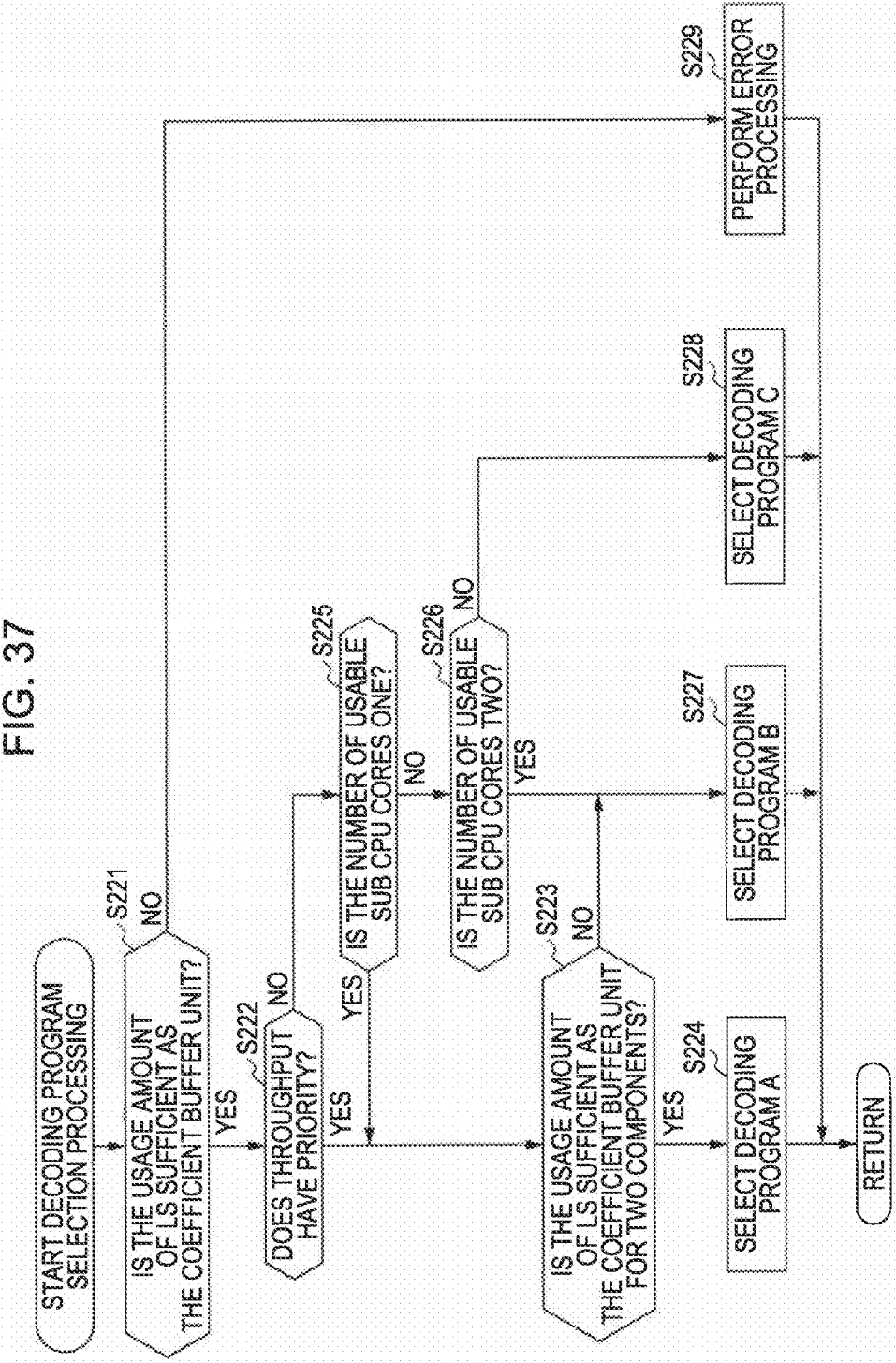
FIG. 37 is a flowchart describing an example of the flow of decoding method selection processing.

In step S222 in FIG. 37, in the case determination is made that throughput does not have priority, the processing is advanced to step S225. In step S225, the decoding program selecting unit 525 determines whether or not there is one currently usable sub CPU core 442, based on the resource information obtained by the resource information obtaining unit 523. In the case determination is made that there is one, the processing is returned to step S223, and the processing thereafter is repeated. Also, in the case determination is made in step S225 that there are multiple usable sub CPU cores 442, the processing is advanced to step S226.

In step S226, the decoding program selecting unit 525 determines whether or not there are two currently usable sub CPU cores 442, based on the resource information obtained by the resource information obtaining unit 523. In the case determination is made that there are two, the processing is advanced to step S227. Also, in the case determination is made that the usable amount of LS 451 is not sufficient as the coefficient buffer unit 22, the processing is advanced to step S227.

In step S227, the decoding program selecting unit 525 selects the decoding program B to which the allocation method described with reference to FIG. 20 is applied. That is to say in this case, as shown in FIG. 20, with two sub CPU cores 442 as one set, one sub CPU core 442 is allocated as to all of the processing of the decoding unit 20 which decodes the image data Y, and the other sub CPU core 442 is allocated as to all of the processing of the decoding unit 20 which decodes the image data C. Also, the coefficient buffer unit 22-1 of the decoding unit 20 which decodes the encoded data Y is formed in the LS 451 of the sub CPU core 442 allocated to the decoding unit 20 to decode the encoded data Y, and the coefficient buffer unit 22-2 of the decoding unit 20 to decode the encoded data C is formed in the LS 451 of the sub CPU core 442 allocated to the decoding unit 20 to decode the encoded data C. Upon the processing in step S227 ending, the decoding program selection processing is ended, the processing is returned to step S204 in FIG. 36, and the processing is advanced to step S205.

In the case determination is made in step S226 in FIG. 37 that there are three or more currently usable sub CPU cores 442, the processing is advanced to step s228.

In step S228, the decoding program selecting unit 525 selects the decoding program C to which the allocation method described with reference to FIG. 22 is applied. That is to say in this case, as shown in FIG. 22, with four sub CPU cores 442 as one set, a different sub CPU core 442 is allocated to each of the processing for the entropy decoding unit 21-1 of the decoding unit 20 to decode the encoded data Y, the wavelet inverse transformation unit 23-1 of the decoding unit 20 to decode the encoded data Y, the entropy decoding unit 21-2 of the decoding unit 20 to decode the encoded data C, and the wavelet inverse transformation unit 23-2 of the decoding unit 20 to decode the encoded data C.

Also, the coefficient buffer unit 22-1 of the decoding unit 20 to decode the encoded data Y is formed in the LS 451 of the sub CPU core 442 allocated to the processing of the wavelet inverse transformation unit 23-1, and the coefficient buffer unit 22-2 of the decoding unit 20 to decode the encoded data C is formed in the LS 451 of the sub CPU core 442 allocated to the processing of the wavelet inverse transformation unit 23-2.

Figure 36:
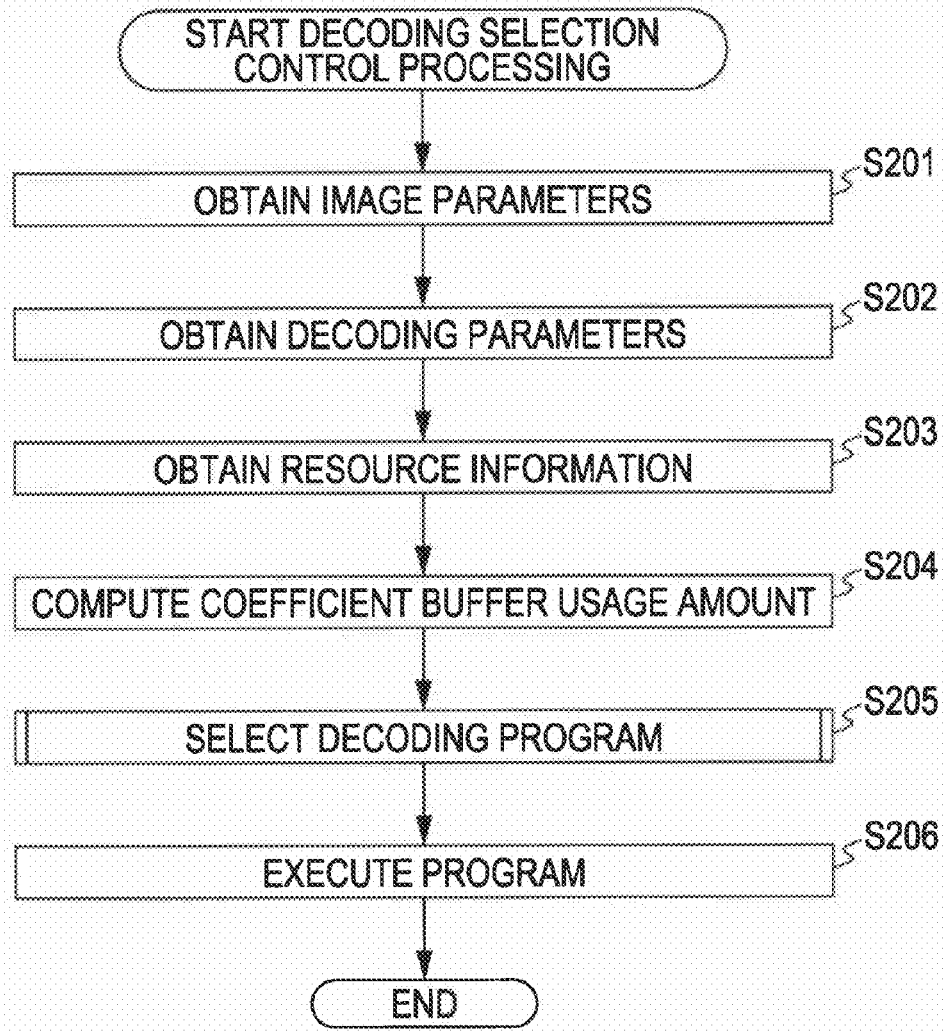
FIG. 36 is a flowchart describing an example of the flow of decoding selection control processing.

Upon the processing in step S228 ending, the decoding program selection processing is ended, the processing is returned to step S204 in FIG. 36, and the processing is advanced to step S205.

In the case determination is made in step S221 in FIG. 37 that the usable amount of the LS 451 is not sufficient as the coefficient buffer unit 22, the processing is advanced to step S229. In this case, none of the three decoding programs prepared in advance can be used (cannot be installed), so the decoding program selection unit 525 performs error processing such as notifying the user, for example. Upon the processing in step S229 ending, the decoding program selection processing is ended, the processing is returned to step S204 in FIG. 36, and the processing is advanced to step S205.

Thus, the decoding selection control unit 503 can appropriately perform hardware resource allocation, based on the image parameter 543, resource information, or decoding parameter 545, so that the decoding unit 20 can operate more effectively under the actual conditions.

Note that this allocation may be performed in increments of any units, e.g. may be performed in increments of precincts or in increments of pictures. Also, description is given above to prepare four allocation methods beforehand from which the decoding program selecting unit 525 selects one, but there may be any number of hardware resource allocation methods prepared. That is to say, the number of decoding programs 547 is arbitrary. Further, the hardware resource allocation methods are arbitrary, and may be a method other than the above-described four allocation methods.

Also, an arrangement may be made wherein an arbitrary sub CPU core 442 out of the eight sub CPU core 442-1 through sub CPU core 442-8 is employed, and the above-described decoding programs A through C are used together (operated in parallel). That is to say, for example, the decoding selection control unit 503 may employ a different decoding method for each precinct and each picture, and changing the hardware resource allocation method thereof. Thus, the decoding selection control unit 503 can allocate hardware resources to each processing of the decoding unit 20 so that hardware resources are more effectively used, so that the decoding unit 20 can be operated more efficiently.

Next, a specific example of allocation will be described. As a first example, let us say that the encoded image data 541 has an image size of 1920 pixels×1080 pixels, the data configuration is a component Y/C made up of luminance components Y and color difference components C, the bit depth thereof is 12 bits, the filter employed for wavelet transformation is a 5×3 filter, the division level for wavelet transformation is 4, and there is no setting for accuracy priority. Also, let us say that there are four or more currently usable sub CPU cores 442, wherein the capacity of the LS 451 of each sub CPU core 442 is 256 kilobytes.

Further irreversible encoding and latency priorities are set as encoding conditions with the encoding parameter 544. Also, latency priority is set as a decoding condition with the decoding parameter 545.

With such a case, the computation accuracy selecting unit 514 performs computation accuracy selection processing as in the flowchart shown in FIG. 34, and selects 16-bit fixed-point based on the conditions of no accuracy priority setting and a bit depth of 13 or less. Also, the midway calculation buffer usage amount computing unit 515 employs the wavelet transformation relation table 531, sets the relation index to "7.5" from the 5×3 filter and division number 4, and further computes the midway calculation buffer usage amount by multiplying the horizontal size of the input image (1920 pixels) and the computation accuracy (16-bits) by the relation index (7.5).

Also, the coefficient rearranging buffer usage amount computing unit 516 employs the coefficient rearranging relation table 532 and sets the relation index to "42.25" from the conditions of 5×3 filter and division number 4, and further computes the coefficient rearranging buffer usage amount by multiplying the horizontal size of the input image (1920 pixels) and the unit size by the relation index (42.25).

Based on the above computation results and resource information and the like, the encoding program selecting unit 517 performs encoding program selection processing such as in the flowchart shown in FIG. 35. The usable amount of the LS 451 is sufficient as two components worth of the midway calculation buffer unit 12 and insufficient as two components worth of the midway calculation buffer unit 12 and coefficient rearranging buffer unit 13, the priority item is latency, and the number of usable sub CPU cores 442 is four, so the encoding program selection unit 517 selects the encoding program D to perform allocation as shown in FIG. 16.

With such allocation, the encoding unit 10 can be advanced as shown in FIG. 17. That is to say, with such allocation, the encoding unit 10 can perform encoding processing with little delay.

Note that in the case of allocating the decoding unit 20 under these conditions, the decoding program selecting unit 525 performs decoding program selecting processing as in the flowchart shown in FIG. 37. The usable amount of LS 451 is sufficient as the coefficient buffer unit 22, the priority item is latency, and the number of usable sub CPU cores 442 is four, so the decoding program selecting unit 525 selects the decoding program C to perform allocation as shown in FIG. 22.

With such allocation, the decoding unit 20 can be advanced as shown in FIG. 23. That is to say, with such allocation, the decoding unit 20 can perform decoding processing with little delay.

For example, with a system such as a television meeting system wherein transfer of images are required in real-time, performing encoding processing and decoding processing with little delay is desired. Even in such a case, the encoding selection control unit 502 and decoding selection control unit 503 can allocate hardware resources appropriately so that the encoding unit 10 and decoding unit 20 can perform processing with little delay.

As a second example, let us say that the encoded image data 541 has an image size of 1280 pixels×720 pixels, the data configuration is a component Y/C made up of luminance components Y and color difference components C, the bit depth thereof is 12 bits, the filter employed for wavelet transformation is a 9×7 filter, the division level for wavelet transformation is 4. Also, let us say that there are four or more currently usable sub CPU cores 442, wherein the capacity of the LS 451 of each sub CPU core 442 is 256 kilobytes.

Further, priority of throughput is set as an encoding condition with the encoding parameter 544. Also, priority of throughput is set as a decoding condition with the decoding parameter 545.

With such as case, the computation accuracy selecting unit 514 performs computation accuracy selecting processing as in the flowchart shown in FIG. 34, and selects 32-bit floating-point based on the condition of a 9×7 filter. Also, the midway calculation buffer usage amount computing unit 515 uses the wavelet transformation relation table 531, and sets the relation index to "11.25" from the conditions of the 9×7 filter and division number 4, and further, by multiplying the horizontal size of the input image (1280 pixels) and computation accuracy (32-bits) by the relation index (11.25), the midway calculation buffer usage amount is computed.

Also, the coefficient rearranging buffer usage amount computing unit 516 uses the coefficient rearranging relation table 532 and sets the relation index as "94.75" from the conditions of the 9×7 filter and division number 4, and further, by multiplying the horizontal size of the input image (1280 pixels) and the unit size, by the relation index (94.75), the coefficient rearranging buffer usage amount is computed.

Based on the above computation results and resource information and so forth, the encoding program selecting unit 517 performs encoding program selecting processing as in the flowchart shown in FIG. 35. The usable amount of the LS 451 is sufficient as two components worth of the midway calculation buffer unit 12, and is insufficient as two components worth of midway calculation buffer unit 12 and coefficient rearranging buffer unit 13, and the priority item is throughput, whereby the encoding program selecting unit 517 selects the encoding program B to perform allocation as shown in FIG. 13.

With such allocation, the encoding unit 10 can advance the encoding processing as shown in FIG. 12. That is to say, with such allocation, the encoding unit 10 can perform high throughput encoding processing.

Note that in the case of allocating the decoding unit 20 under these conditions, the decoding program selecting unit 525 performs decoding program selecting processing as in the flowchart shown in FIG. 37. The usable amount of the LS 451 is sufficient as the coefficient buffer unit 22, the priority item is throughput, and further, the usable amount of the LS 451 is sufficient also as two components worth of the coefficient buffer unit 22, so the decoding program selecting unit 525 selects the decoding program A which performs allocation as shown in FIG. 18.

With such allocation, the decoding unit 20 can advance the decoding processing as shown in FIG. 19. That is to say, with such allocation, the decoding unit 20 can perform high throughput decoding processing.

For example, there are cases wherein encoding processing or decoding processing needs to be performed at a higher speed (high throughput), such as with a system to process image data with a high frame rate. In such a case, the encoding selection control unit 502 and decoding selection control unit 503 can allocate the hardware resources appropriately, as the encoding unit 10 and decoding unit 20 can perform processing with high throughput.

As a third example, the encoded image data 541 has an image size of let us say that the encoded image data 541 has an image size of 4096 pixels×2160 pixels, the data configuration is a component Y/C made up of luminance components Y and color difference components C, the bit depth thereof is 12 bits, the filter employed for wavelet transformation is a 9×7 filter, the division level for wavelet transformation is 4. Also, let us say that there are four or more currently usable sub CPU cores 442, wherein the capacity of the LS 451 of each sub CPU core 442 is 256 kilobytes.

Further, priority of throughput is set as an encoding condition with the encoding parameter 544. Also, priority of throughput is set as a decoding condition with the decoding parameter 545.

With such as case, the computation accuracy selecting unit 514 performs computation accuracy selecting processing as in the flowchart shown in FIG. 34, and selects 32-bit floating-point based on the condition of a 9×7 filter. Also, the midway calculation buffer usage amount computing unit 515 uses the wavelet transformation relation table 531, and sets the relation index to "11.25" from the conditions of the 9×7 filter and division number 4, and further, by multiplying the horizontal size of the input image (4096 pixels) and computation accuracy (32-bits) by the relation index (11.25), the midway calculation buffer usage amount is computed.

Also, the coefficient rearranging buffer usage amount computing unit 516 uses the coefficient rearranging relation table 532 and sets the relation index as "94.75" from the conditions of the 9×7 filter and division number 4, and further, by multiplying the horizontal size of the input image (4096 pixels) and the unit size, by the relation index (94.75), the coefficient rearranging buffer usage amount is computed.

Based on the above computation results and resource information and so forth, the encoding program selecting unit 517 performs encoding program selecting processing as in the flowchart shown in FIG. 35. The usable amount of the LS 451 is insufficient as two components worth of the midway calculation buffer unit 12, but is sufficient as one component worth of midway calculation buffer unit 12, the number of usable sub CPU cores 442 is four, and the priority item is throughput, whereby the encoding program selecting unit 517 selects the encoding program C to perform allocation as shown in FIG. 14.

With such allocation, the encoding unit 10 can advance the encoding processing as shown in FIG. 15. That is to say, with such allocation, the encoding unit 10 can perform encoding processing at a higher throughput than with encoding program D, and with less delay than with encoding program B.

Note that in the case of allocating the decoding unit 20 under these conditions, the decoding program selecting unit 525 performs decoding program selecting processing as in the flowchart shown in FIG. 37. The usable amount of the LS 451 is sufficient as the coefficient buffer unit 22, the priority item is throughput, and further, the usable amount of the LS 451 is insufficient as two components worth of the coefficient buffer unit 22, and the number of usable sub CPU cores 442 is four, so the decoding program selecting unit 525 selects the decoding program B which performs allocation as shown in FIG. 20.

With such allocation, the decoding unit 20 can advance the decoding processing as shown in FIG. 21. That is to say, with such allocation, the decoding unit 20 can perform decoding processing at a higher throughput than with decoding program C, and with less delay than with decoding program A.

For example, there are cases wherein encoding processing or decoding processing needs to be performed at a high speed (high throughput) and the data amount of the image data is large, as with a system processing image data of a high precision picture. In such a case, if encoding processing and decoding processing is performed with one sub CPU core 442 in order to improve throughput, the capacity of the LS 451 will be insufficient, and unnecessary delays can increase greatly. Therefore, the encoding selection control unit 502 and decoding selection control unit 503 can allocate the hardware resources appropriately so that the encoding unit 10 and decoding unit 20 do not unnecessarily increase the delay time due to the occurrence of buffer leakage and so forth, and so as to improve throughput significantly.

Thus, by selecting the allocation pattern of the hardware resources appropriately according to the type of input image signal, the parameters for the encoding processing and decoding processing (required features such as latency and throughput), and usable hardware resources and so forth, encoding processing and decoding processing can be executed more efficiently, and under a wider variety of conditions. At this time, by preparing beforehand the encoding program and decoding program wherein the hardware allocation patter is set, so that encoding processing and decoding processing can be efficiently performed, the decrease in efficiency of the encoding processing and decoding processing can be suppressed.

An encoding program 546 to perform hardware allocation performs wavelet transformation in increments of precincts is described above, but the encoding program 546 may perform wavelet transformation with the entire picture as one unit, or may perform wavelet transformation with tiles as units, which are region portions obtained by dividing the entire picture into a predetermined constant in the vertical direction and horizontal direction. The configuration of the encoding unit 10 in this case is similar to the case performing coefficient rearranging with the decoding unit 20, of which a configuration example is shown in FIG. 26. That is to say, the allocation pattern of the hardware in this case is similar to the case of performing coefficient rearranging with the decoding unit 20.

The decoding program 547 performs decoding with the decoding method according to the encoding method of the encoded data 542. For example, if the encoded data 542 is subjected to wavelet transformation with the entire picture as one unit, the decoding program 547 to decode the encoded data 542 also performs wavelet inverse transformation with the entire picture as one unit. Also, for example, if the encoded data 542 subjects the picture to wavelet transformation with tiles as units, which are region portions obtained by dividing the entire picture into a predetermined constant in the vertical direction and horizontal direction, the decoding program 547 for decoding the encoded data 542 also performs wavelet inverse transformation with the tile thereof as one unit.

Also, the encoding method of the encoding program 546 and the decoding method of the decoding program 547 may also be a method according to the standards of MPEG (Moving Picture Experts Group) 2 or H.264/AVC (Advanced Video Coding).

Figure 38:
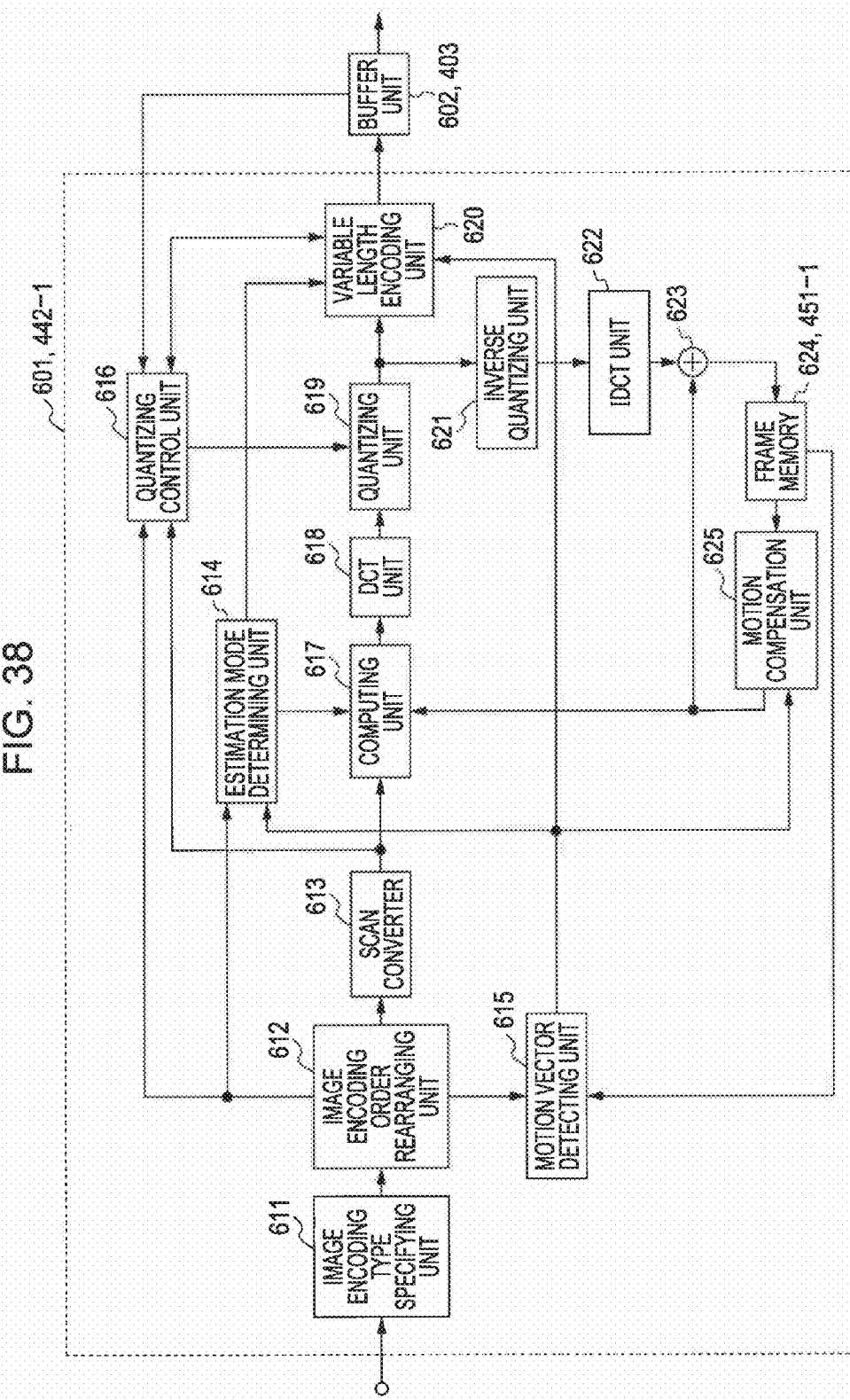
FIG. 38 is a block diagram illustrating yet another configuration example of the encoding unit.

FIG. 38 is a diagram showing a function (process) realized by a software encoding unit according to the standards of MPEG 2, which is configured with the software program and generates encoded data by encoding the image data, executed by a CPU of a predetermined information processing device. As shown in FIG. 38, the software encoding unit is made up of an encoding unit 601 to encode the image data with the MPEG2 method and a buffer unit 602 to temporarily hold the encoded data output with the encoding unit 601.

The encoding unit 601 has an image encoding type specifying unit 611, image encoding order rearranging unit 612, scan converter 613, estimation mode determining unit 614, motion vector detecting unit 615, quantizing control unit 616, computation unit 617, DCT (Discrete Cosine Transform) unit 618, quantizing unit 619, variable length encoding unit 620, inverse quantizing unit 621, IDCT (Inverse Discrete Cosine Transform) unit 622, adding unit 623, frame memory 624, and motion compensation unit 625.

The image signal input in the encoding unit 601 is input in the image encoding type specifying unit 611. The image encoding type specifying unit 611 specifies which image type picture to processing of an I-picture, P-picture, or B-picture for each frame of the input image data, and sends this to the image encoding order rearranging unit 612. The encoding unit 601 processes for example 15 frames as one GOP (Group of Picture) as one unit.

The image encoding order rearranging unit 612 rearranges each frame in the order to be encoded according to the specified image encoding type and sends this to the scan converter 613, while also sending the image encoding type information of the image data to the estimation mode determining unit 614, motion vector detecting unit 615, quantizing control unit 616. Also, in order to detect the motion vector of the currently encoded frame, the image encoding order rearranging unit 612 sends the current image, the image in the instant past from the current image (hereafter called past reference image) and/or the image in the instant future from the current image (hereafter called future reference image) to the motion vector detecting unit 615.

The scan converter 613 converts the image data into a block format signal for each frame, and divides this signal of one frame into N slices, with 16 lines as a unit, while dividing each slice into M macro-blocks made up of a luminance signal corresponding to 16×16 pixels, and sends each macro-block to the quantizing control unit 616 and computing unit 617.

The motion vector detecting unit 615 processes the image data for each frame as an I-picture, P-picture, or B-picture according to the image encoding type synchronized with each frame. That is to say, the image data of the frame processed as an I-picture is stored in a past reference image memory (unshown) which stores past reference images, which is built in to the motion vector detecting unit 615, the image data of the frame processed as a B-picture is stored in a current image memory (unshown) which stores current images, which is built in to the motion vector detecting unit 615, and the image data of the frame processed as an P-picture is stored in a future reference image memory (unshown) which stores future reference images, which is built in to the motion vector detecting unit 615.

At the next timing, upon a frame to be processed as a B-picture or P-picture being input in the motion vector detecting unit 615, the image data of the first P-picture stored in the future reference image memory up to this point is stored in the past reference image memory. Also, the image data of the next B-picture is stored in the current image memory, and the image data of the next P-picture is stored in the future reference image memory. Hereafter such operations are sequentially repeated.

The motion vector detecting unit 615 sends the motion vector of forward direction estimation, and any motion vector presumed difference at the time thereof to the estimation mode determining unit 614. The motion vector detecting unit 615 sends the motion vector of reverse direction estimation and the motion vector presumed difference at the time thereof in the case of a B-picture. The estimation mode determining unit 614 determines which estimation mode to select from an intra-mode, forward direction estimation mode, reverse direction estimation mode, and bi-directional estimation mode.

Here the intra-mode is processing to transmit image data to be subjected to encoding without change as transmission data, and the forward direction estimation mode is processing to transmit the estimated difference between the past reference image and the forward direction motion vector. Also, the reverse direction estimation mode is processing to transmit the estimated difference between the future reference image and the reverse direction motion vector, and the bi-directional estimation mode is processing to transmit the estimation difference between the mean value of two estimation images of the past reference image and future reference image, and two motion vectors of the forward direction and reverse direction. In the case of a B-picture, the four types of estimation modes are switched in macro-block increments.

Based on the image encoding type sent from the image encoding order rearranging unit 612, the estimation mode determining unit 614 selects intra-mode in the case of an I-picture, selects either estimation mode of the intra-mode or forward direction estimation mode in the case of a P-picture, and selects one of intra-mode, forward direction estimation mode, reverse direction estimation mode, or bi-directional estimation mode in the case of a B-picture, and sends the selected estimation mode information to the computing unit 617.

The computing unit 617 performs computing for intra, forward direction estimation, reverse direction estimation, or bi-directional estimation based on the estimation mode as to the macro-blocks read out from the scan converter 613. In the case that image data (macro-block) to be processed as an I-picture is input, the computation unit 617 subjects the image data thereof to intra encoding and sends this to the DCT unit 618. The DCT unit 618 converts the intra encoded image data to DCT coefficients and sends this to the quantizing unit 619.

The quantizing unit 619 quantizes each DCT coefficient with a quantizing step specified by the quantizing control unit 616, and sends this to the variable length encoding unit 620 and reverse quantizing unit 621. The variable length encoding unit 620 transforms quantized image data, estimation mode sent from the estimation mode determining unit 614, and the motion vector sent from the motion vector detecting unit 615 into variable-length coding such as Huffman coding for example, and outputs this as encoded data in the buffer unit 602.

The inverse quantizing unit 621 subjects the quantized image data to inverse quantizing according to the quantizing step at the time of quantizing, and sends this to the IDCT (inverse DCT) unit 622. The IDCT unit 622 subjects the output from the inverse quantizing unit 621 to inverse DCT processing. The output from the IDCT unit 622 is stored in a past reference image storage unit (unshown) which stores past reference images, which is in the frame memory 624 via the adding unit 623.

Next, image data to be processed as a P-picture is input from the scan converter 613 to the computing unit 617, and in the case that the estimation mode sent from the estimation mode determining unit 614 is intra-mode, the image data is subjected to intra encoding, similar to the case of the above-described I-picture, is output to the buffer unit 602 via the DCT unit 618, quantizing unit 619, and variable length encoding unit 620, and is stored in a future reference image storage unit (unshown) which stores future reference images, which is in the frame memory 624 via the inverse quantizing unit 621, IDCT unit 622, and adding unit 623.

In the case that the estimation mode is the forward direction estimation mode, the image data (in this case image data of an I-picture) stored in the past reference image storage unit of the frame memory 624 is read out and sent to the motion compensation unit 625. The motion compensation unit 625 subjects the image data to motion compensation corresponding with the forward direction motion vector sent from the motion vector detecting unit 615.

That is to say, in the case of forward direction estimation mode, the motion compensation unit 625 shifts the readout address of the past reference image storage unit of the frame memory 624 only by an amount so as to correspond with the forward direction vector from the position corresponding to the position of the macro-block currently output by the motion vector detecting unit 615, to read out the data and generate an estimated reference image, and sends this to the computing unit 617 and adding unit 623.

The computing unit 617 subtracts the image data of the estimated reference image corresponding to the macro-block sent from the motion compensation unit 625, from the macro-block data of the reference image sent from the scan converter 613, obtains the difference data as estimation difference, and sends this difference data to the DCT unit 618. The difference data is output to the buffer unit 602 via the DCT unit 618, quantizing unit 619, and variable length encoding unit 620. Also, this difference data is locally decoded by the inverse quantizing unit 621 and IDCT unit 622, and sent to the adding unit 623.

The adding unit 623 adds image data of the estimated reference image sent from the motion compensation unit 625 to the difference data sent from the IDCT unit 622. The image of the P-picture thus locally decoded is obtained. The image data of the P-picture is stored in the future reference image storage unit which stores future reference images in the frame memory 624.

Next, image data of a frame to be processed as a B-picture is input from the scan converter 613 to the computing unit 617, and in the case the estimation mode sent from the estimation mode determining unit 614 is intra-mode or forward direction estimation mode, the image data of such frame is processed similar to the case of the above-described P-picture. Conversely, in the case the estimation mode is set to the reverse direction estimation mode, the image data (in this case, image data of P-picture) stored in the future reference image storage unit of the frame memory 624 is read out and sent to the motion compensation unit 625. The motion compensation unit 625 subjects the image data to motion compensation corresponding to the reverse direction motion vector sent from the motion vector detecting unit 615.

That is to say, in case of the reverse direction estimation mode, the motion compensation unit 625 shifts the readout address of the future reference image storage unit of the frame memory 624 only by an amount so as to correspond with the motion vector from the position corresponding to the position of the macro-block currently output by the motion vector detecting unit 615, to read out the data and generate an estimated reference image, and sends this to the computing unit 617 and adding unit 623.

The computing unit 617 subtracts the image data of the estimated reference image corresponding to the macro-block sent from the motion compensation unit 625, from the macro-block data of the reference image sent from the scan converter 613, obtains the difference data as estimation difference, and sends this difference data to the DCT unit 618. The difference data is output to the buffer unit 602 via the DCT unit 618, quantizing unit 619, and variable length encoding unit 620. Also, this difference data is locally decoded by the inverse quantizing unit 621 and IDCT unit 622, and sent to the adding unit 623. The adding unit 623 adds image data of the estimated reference image sent from the motion compensation unit 625 to the difference data sent from the IDCT unit 622. The image of the B-picture thus locally decoded is obtained.

In the case of bi-directional estimation mode, the image data (in this case image data of an I-picture) stored in the past reference image storage unit of the frame memory 625 and the image data (in this case image data of a P-picture) stored in the future reference image storage unit is read out and sent to the motion compensation unit 625. The motion compensation unit 625 subjects the image data to motion compensation corresponding to the forward direction vector and reverse direction motion vector sent from the motion vector detecting unit 615.

That is to say, in the event of bi-directional estimation mode, the motion compensation unit 625 shifts the readout address of the past reference image storage unit and future reference image storage unit of the frame memory 624 only by an amount so as to correspond with the forward direction motion vector and reverse direction motion vector corresponding to the position of the macro-block currently output by the motion vector detecting unit 615, to read out the data and generate an estimated reference image, and sends this to the computing unit 617 and adding unit 623.

The computing unit 617 subtracts the mean value of the image data of the estimated reference image corresponding to the macro-block sent from the motion compensation unit 625, from the macro-block data of the reference image sent from the scan converter 613, obtains the difference data as estimation difference, and sends this difference data to the DCT unit 618. The difference data is output to the buffer unit 602 via the DCT unit 618, quantizing unit 619, and variable length encoding unit 620. Also, this difference data is locally decoded by the inverse quantizing unit 621 and IDCT unit 622, and sent to the adding unit 623.

The adding unit 623 adds image data of the estimated reference image sent from the motion compensation unit 625 to the difference data sent from the IDCT unit 622. The image of the B-picture thus locally decoded is obtained. The B-picture is not used as an estimated image of another image, so is not stored in the frame memory 624.

The quantizing control unit 616 computes a quantizing step employed in the event of quantizing each macro-block with the quantizing unit 619, according to a predetermined quantizing control algorithm, and supplies the quantizing step to the quantizing unit 619.

Information of the data amount (encoding amount) of the encoded data accumulated in the buffer unit 602 is supplied to the quantizing control unit 616. Based on the encoding amount thereof, the quantizing control unit 616 computes quantizing steps and allocation encoding amounts for each frame, supplies the information for the quantizing steps to the quantizing unit 619, and supplies the information for the allocation encoding amounts to the variable length encoding unit 620.

An example of the hardware allocation method as to each process of such a software encoding unit will be described with an example in the case of allocating to the information processing system 300 shown in FIG. 28. A process here indicates a processing executed by each processing unit shown in FIG. 38 shown in FIG. 38. For example, an arrangement may be made wherein the sub CPU core 442-1 is allocated as to the entire encoding unit 601, the storage unit such as the frame memory 624 or the like within the encoding unit 601 is realized by the LS 451-1, and the buffer unit 602 is realized by the XDR-RAM 403. That is to say, in this case, all of the processing of the encoding unit 601 is executed by one sub CPU core 442, and during the encoding processing the data is held in the LS 451 which is a local memory of the sub CPU core 442 thereof, and the encoding results are held in the XDR-RAM 403 which is shared memory. In this case, an arrangement may be made wherein each of the sub CPU core 442-1 through sub CPU core 442-8 are allocated as to the software encoding unit in increments of predetermined processing such as 1 GOP, for example. In such as case, the encoding processing performed with each sub CPU core 442 is executed in parallel.

With an encoding unit of an MPEG 2 method such as shown in FIG. 38, the load of processing of the motion compensation unit 625 or motion vector detecting unit 615 for example is often greater than the load of the processing executed with other processing units. Therefore, as shown in FIG. 39, multiple sub CPU cores 442 may be allocated (as to the entire process) of the processing of the encoding unit 601.

Figure 39:
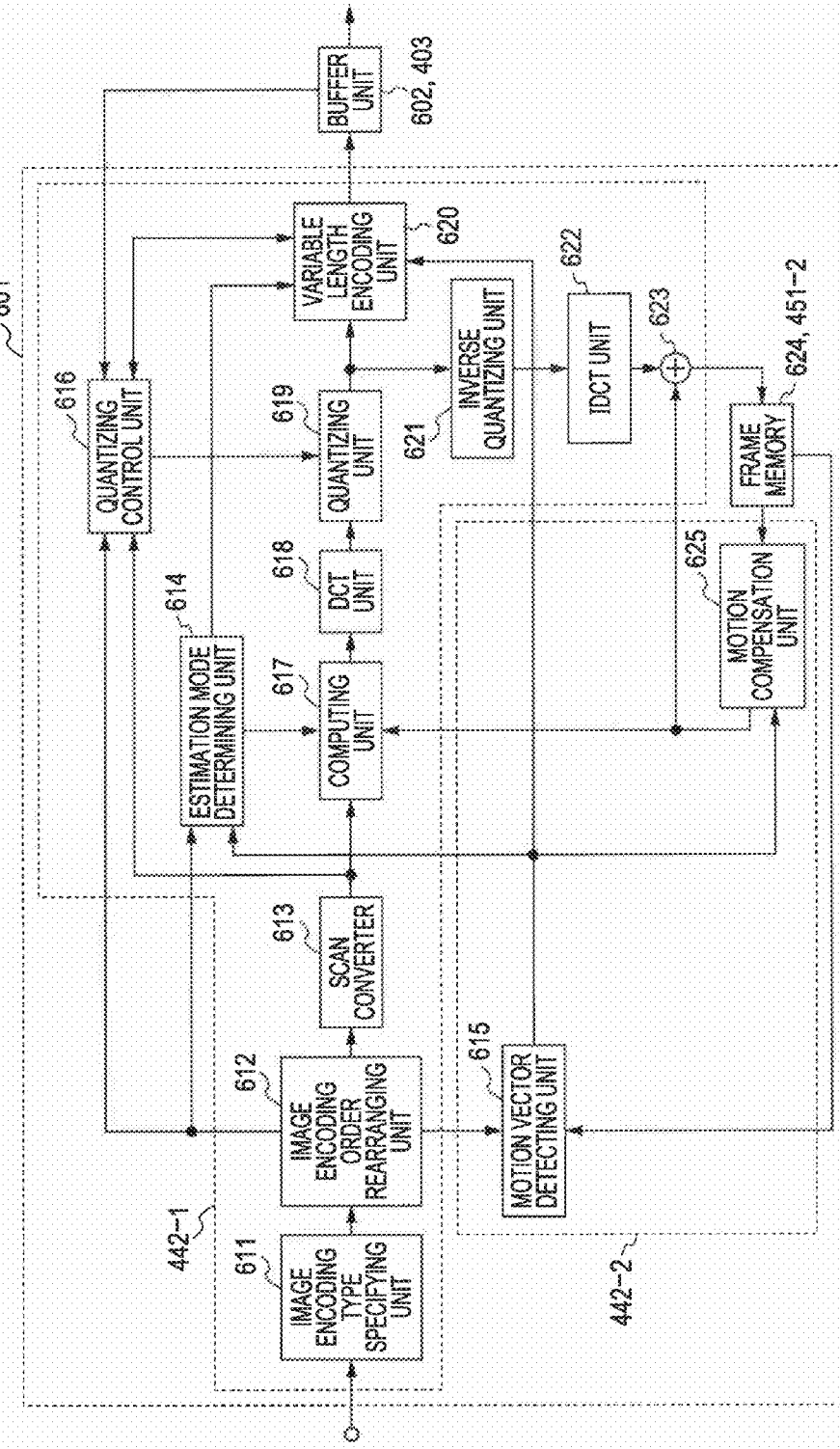
FIG. 39 is a block diagram illustrating yet another configuration example of the encoding unit.

With the example in FIG. 39, of the processing units within the encoding unit 601, the sub CPU core 442-1 is allocated to the image encoding type specifying unit 611, image encoding order rearranging unit 612, scan converter 613, estimation mode determining unit 614, quantizing control unit 616, computing unit 617, DCT unit 618, quantizing unit 619, variable length encoding unit 620, inverse quantizing unit 621, IDCT unit 522, and adding unit 623, and the sub CPU core 442-2 is allocated as to the motion vector detecting unit 615 and motion compensation unit 625. Also, the frame memory 624 is realized with the LS 451-2, and the buffer unit 602 is realized with the XDR-RAM 403.

It goes without saying that allocation methods other than these may be used, and for example, as shown in FIG. 39, in the case of allocating multiple sub CPU cores 442 as to a processing unit (process) within the encoding unit 601, a configuration of a processing unit (process) allocating one sub CPU core 442 is arbitrary, and may be combinations other than that shown in FIG. 39, or three or more sub CPU cores 442 may be allocated to a processing unit (process) within the encoding unit 601. For example, a different sub CPU core 442 may be allocated for each processing unit (process) within the encoding unit 601.

Thus, even in the case that the encoding program 546 is a software program of a software encoding unit according to MPEG 2, multiple hardware allocation patterns can be prepared. That is to say, similar to the case described with reference to FIG. 30, multiple encoding programs 546 can be prepared which each differ in the hardware allocation pattern thereof. Accordingly, in this case as similar to the case described with reference to FIG. 30, the encoding selection control unit 502 can select the encoding program 546 to use from multiple prepared programs, based on an image parameter 543, encoding parameter 544, and resource information and so forth. However, in this case, the midway calculation buffer usage amount unit 515 and coefficient rearranging buffer usage amount computing unit 516 can be omitted.

An example of the flow of encoding selection control processing by the encoding selection control unit 502 in this case will be described with reference to the flowchart in FIG. 40. Note that the encoding selection control processing is repeatedly executed every predetermined processing unit, e.g. every 1 GOP or the like.

Upon the encoding selection control processing starting, the image parameter obtaining unit 511 of the encoding selection control unit 502 obtains image parameter 543 in step S301. In step S302, the encoding parameter obtaining unit 512 obtains an encoding parameter 544. In step s303, the resource information obtaining unit 513 obtains resource information. In step S304, the encoding program selection unit 517 selects a use encoding program from the encoding programs 546, based on image parameters 543 obtained in step S301, encoding parameters 544 obtained in step S302, and resource information obtained in step S303. In step S305, the program executing unit 518 executes the use encoding program selected in step S304. Upon the use encoding program being executed, the encoding selection control processing is ended.

With actual software programs, the various processing units of the encoding unit 601 with the MPEG 2 method shown in FIGS. 38 and 39 are each made up of multiple functions, so the sub CPU core 442 to allocate within each processing unit (process) can be arranged to be changed, but if the processing is not executable in parallel, the processing time cannot be shortened even if different sub CPU cores 442 are allocated for each process, and conversely, the processing may become even less effective.

In the case of a computer allocating CPUs to automatically execute processing, as with some currently used computers, allocation is performed according to the state of load or the like, so the allocation of sub CPU cores 442 as described above is not necessarily performed, and in some cases the efficiency of the encoding processing may greatly decrease. Accordingly, even if the encoding unit 601 with the MPEG 2 method is used, decrease of encoding processing efficiency can be suppressed by preparing encoding programs beforehand wherein the hardware allocation pattern is set so as to perform efficient encoding processing. Also, encoding processing can be efficiently executed under an increasingly wide variety of conditions by preparing multiple encoding programs, each having different allocation patterns, and the encoding selection control unit 502 making a selection therefrom according to the conditions.

Note that although not shown in the diagram, hardware can be allocated to a decoding program realizing a decoding unit according to the MPEG 2 method corresponding to the encoding unit 601 shown in FIG. 38, with multiple patterns. That is to say, similar to the case in FIG. 30, with the decoding selection control unit 503 can select and execute a use decoding program from multiple decoding programs 547 prepared beforehand, each having a different hardware allocation pattern as to each process of the decoding processing.

In the case of this decoding processing, similar to the case of the encoding processing, the decoding program has hardware allocation patterns set so as to efficiently perform decoding processing, and multiple such decoding programs are prepared beforehand wherein the allocation pattern differs for each, thereby enabling decoding processing to efficiently be executed under increasingly varied conditions.

Thus, by selecting a hardware resource allocation pattern appropriately according to the type of input image signal, parameters for encoding processing and decoding processing (required features such as latency and throughput), and usable hardware resources and so forth, encoding processing and decoding processing can be executed more efficiently under increasingly varied conditions.

Figure 41:
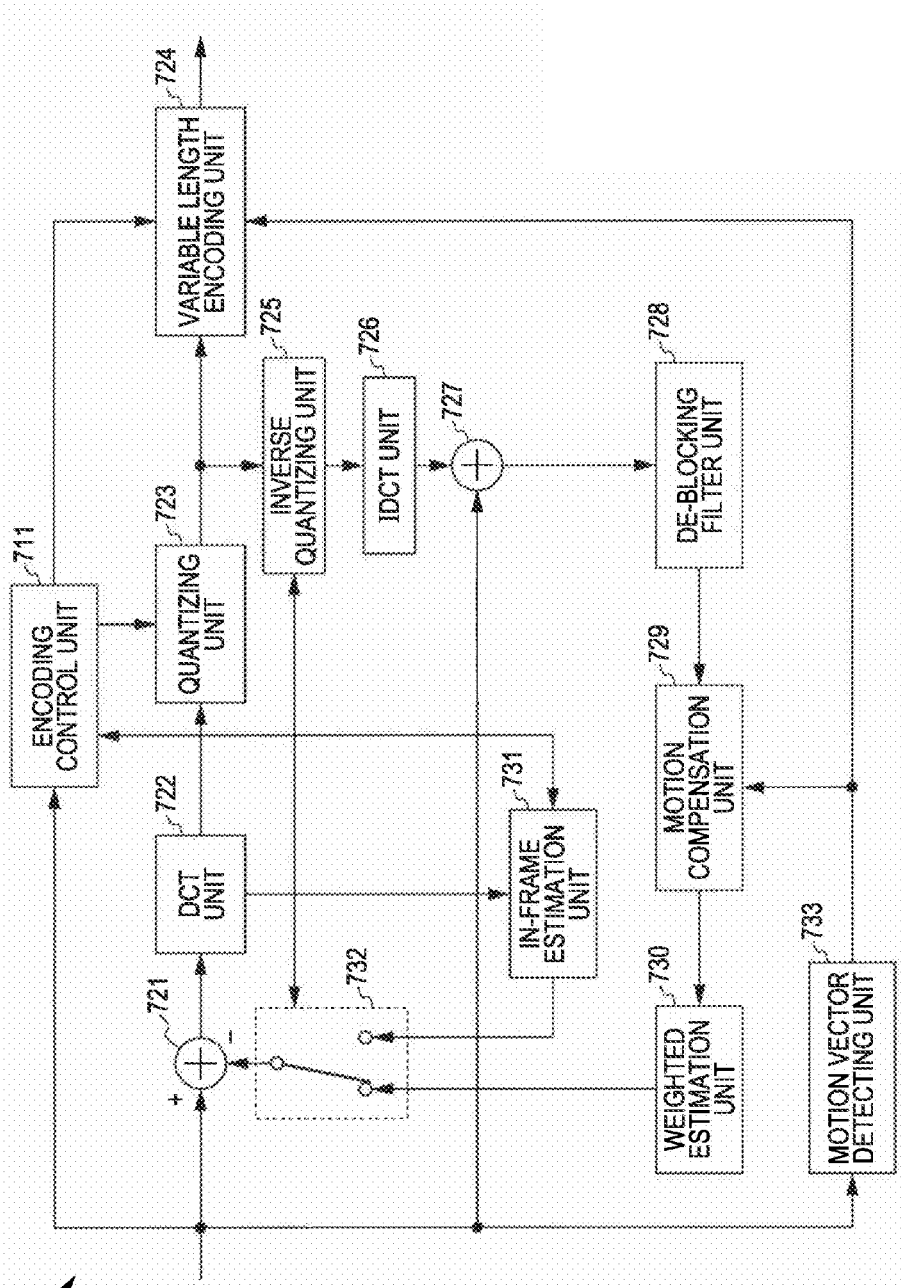
FIG. 41 is a block diagram illustrating yet another configuration example of the encoding unit.

FIG. 41 is a diagram schematically showing a function (process) realized by a software encoding unit according to H.264/AVC standards, which is made up of a software programs and which generates encoded data by encoding image data, being executed by a CPU of a predetermined information device. As shown in FIG. 41, the software encoding unit is made up of an encoding unit 700 which encodes image data with the H.264/AVC method.

The encoding unit 700 has an encoding control unit 711, subtracting unit 721, DCT unit 722, quantizing unit 723, variable length encoding unit 724, inverse quantizing unit 725, IDCT unit 726, adding unit 727, de-blocking filter unit 728, motion compensation unit 729, weighting estimation unit 730, in-frame estimation unit 731, selecting unit 732, and motion vector detecting unit 733.

The encoding control unit 711 computes allocation encoding amounts for each picture and the quantizing step size based on the input image data, supplies the quantizing step size information to the quantizing unit 723, and supplies the allocation encoding amount information to the variable length encoding unit 724. Also, the encoding control unit 711 selects the estimation direction of the in-frame estimate for each block which is a pixel group of a predetermined number of pixels, and supplies the estimation direction information to the in-frame estimating unit 731.

The subtracting unit 721 subtracts the estimation results supplied from the selecting unit 732 from the input image data, and supplies the subtraction results to the DCT unit 722. The DCT unit 722 performs DCT transformation as to the subtraction results supplied from the subtracting unit 721, and supplies the coefficient thereof to the quantizing unit 723 and the in-frame estimating unit 731. The quantizing unit 723 quantizes the output of the DCT unit 722 with a quantizing step size supplied with the encoding control unit 711, and supplies the results thereof to the variable length encoding unit 724 and inverse quantizing unit 725. The variable length encoding unit 724 encodes the quantized coefficient supplied from the quantizing unit 723, based on the allocation encoding amount supplied from the encoding control unit 711 and the motion vector supplied from the motion vector detecting unit 733, and outputs the encoded data.

The inverse quantizing unit 725 performs inverse quantizing with a method corresponding to the quantizing with the quantizing unit 723, and supplies the results thereof to the IDCT unit 726. The IDCT unit 726 performs inverse DCT transformation as to the output of the inverse quantizing unit 725, and supplies the results thereof to the adding unit 727. The adding unit 727 adds the IDCT result and the input image data and supplies the obtained image data to the de-blocking filter unit 728. The de-blocking filter unit 728 appropriately performs removal of block distortion using a filter for the purpose of reducing block distortion as to the output of the adding unit 727 caused at the time of image encoding. The de-blocking filter unit 728 supplies the filtering results to the motion compensation unit 729.

The motion compensation unit 729 uses multiple pictures as reference pictures, selects the most appropriate from the multiple pictures based on the motion vector supplied with the motion vector detecting unit 733, and performs motion compensation as to the output of the de-blocking filter unit 728. The motion compensation unit 729 supplies the motion compensation information to the weighted estimation unit 730. The weighted estimation unit 730 multiplies a predetermined weighting coefficient to the motion compensation information supplied with the motion compensation unit 729, and further by adding a predetermined coefficient thereto, generates weighting compensation information with offset, and supplies this to the selecting unit 732.

The in-frame estimating unit 731 performs in-frame estimation in the estimation direction supplied from the encoding control unit 711 as to the DCT results supplied from the DCT unit 722, and supplies the estimation results to the selecting unit 732. The selecting unit 732 selects, based on whether the control mode or intra-mode, one of the weighting compensation information with offset which is supplied from the weighted estimation unit 730, and the estimation results supplied from the in-frame estimation unit 731, and supplies this to the subtracting unit 721.

The motion vector detecting unit 733 detects the motion vector between pictures based on the input image data, and supplies the motion vector information to the motion compensation unit 729 and variable length encoding unit 724.

An example of the hardware allocation method as to each process of such a software encoding unit will be described with an example in the case of allocating to the information processing system 300 shown in FIG. 28. A process here indicates a processing executed by each processing unit shown in FIG. 41. For example, an arrangement may be made wherein the sub CPU core 442-1 is allocated as to the entire encoding unit 700 shown in FIG. 41. That is to say, in this case, all of the processing of the encoding unit 700 is executed by one sub CPU core 442, and during the encoding processing the data is held in the LS 451 which is a local memory of the sub CPU core 442 thereof, and the encoding results are held in the XDR-RAM 403 which is shared memory. In this case, an arrangement may be made wherein each of the sub CPU core 442-1 through sub CPU core 442-8 is allocated as to the software encoding unit in increments of predetermined processing such as 1 GOP, for example. In such as case, the encoding processing performed with each sub CPU core 442 may be executed in parallel.

With an H.264/AVC encoding unit such as shown in FIG. 41 as well, the load of processing of the motion compensation unit 729 or motion vector detecting unit 733 or the like for example is often greater than the load of the processing executed with other processing units. Therefore, as shown in FIG. 42, multiple sub CPU cores 442 may be allocated (as to the entire process) of the processing of the encoding unit 700.

Figure 42:
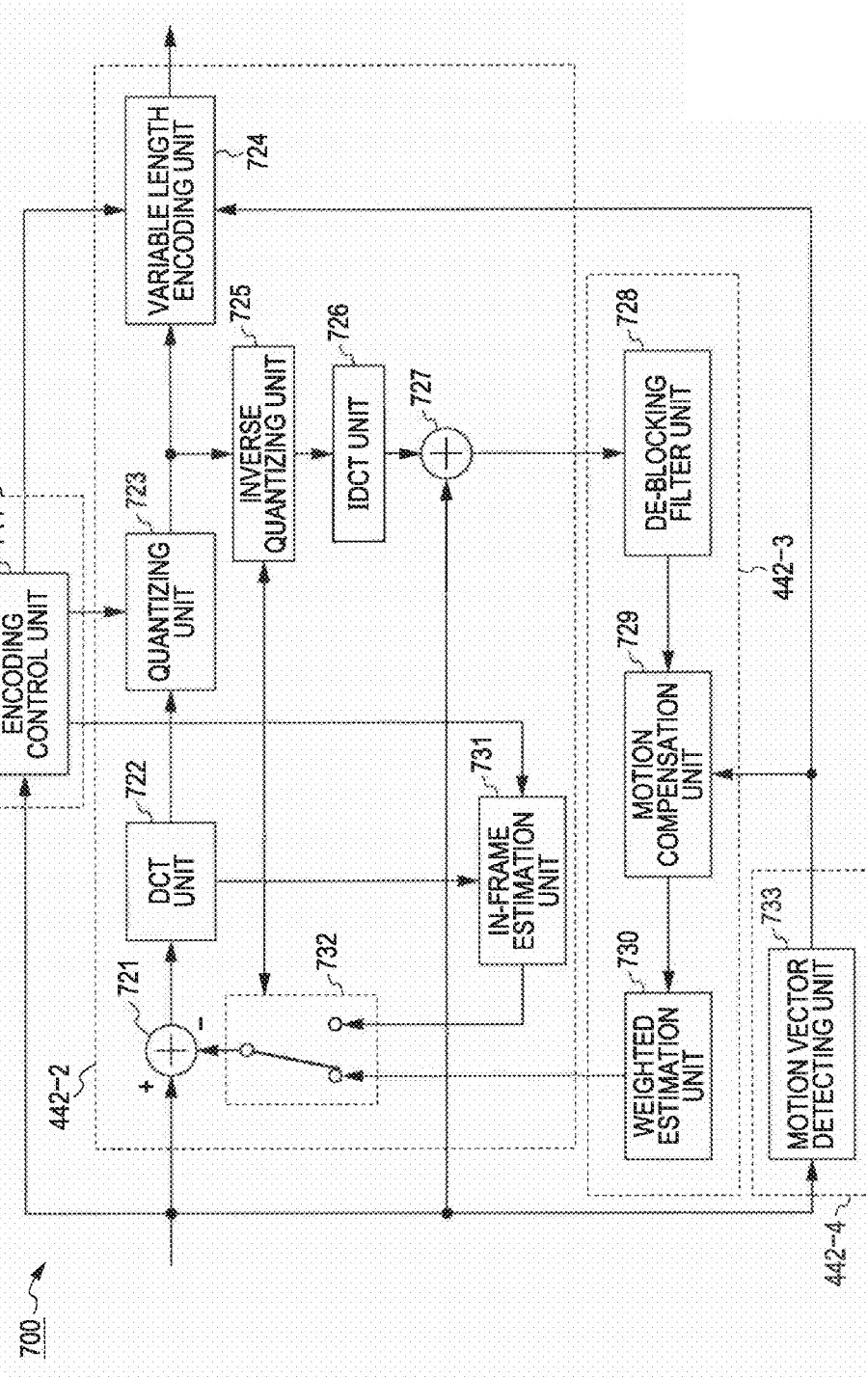
FIG. 42 is a block diagram illustrating yet another configuration example of the encoding unit.

With the example in FIG. 42, the sub CPU core 442-1 is allocated to the encoding control unit 711 of the processing units in the encoding unit 700, the sub CPU core 442-2 is allocated to the subtracting unit 721, DCT unit 722, quantizing unit 723, variable length encoding unit 724, inverse quantizing unit 725, IDCT unit 726, adding unit 727, in-frame estimation unit 731, and selecting unit 732, the sub CPU core 442-3 is allocated to the de-blocking filter unit 728, motion compensation unit 729, and weighted estimation unit 730, and the sub CPU core 442-4 is allocated to the motion vector detecting unit 733.

It goes without saying that allocation methods other than these may be employed, and for example, as shown in FIG. 42, in the case of allocating multiple sub CPU cores 442 to the processing unit (process) in the encoding unit 700, the configuration of a processing unit (process) allocating one sub CPU core 442 is arbitrary, and an arrangement may have a combination other than that shown in FIG. 42, or an arrangement may be made wherein five or more sub CPU cores 442 are allocated to the processing unit (process) in the encoding unit 700. For example, a different sub CPU core 442 may be allocated for each processing unit (process) in the encoding unit 700.

Thus, even in a case wherein the encoding program 546 is a software program of the software encoding unit according to H.264/AVC standards, multiple hardware allocation patterns can be prepared. That is to say, similar to the case described with reference to FIG. 30, multiple encoding programs 546 wherein the hardware allocation patterns are each different can be prepared. Accordingly, in this case also, similar to the case described with reference to FIG. 30, the encoding selecting control unit 502 can selects the encoding program 546 to employ from multiple prepared encoding programs 546, based on the image parameter 543, encoding parameters 544, and resource information and the like. However, in this case, the midway calculation buffer usage amount computing unit 515 and the coefficient rearranging buffer usage amount computing unit 516 can be omitted. Also, the flow of the encoding selection control processing is similar to the case of the encoding program with the MPEG 2 method described with reference to the flowchart in FIG. 40, so the description thereof is omitted.

Figure 40:
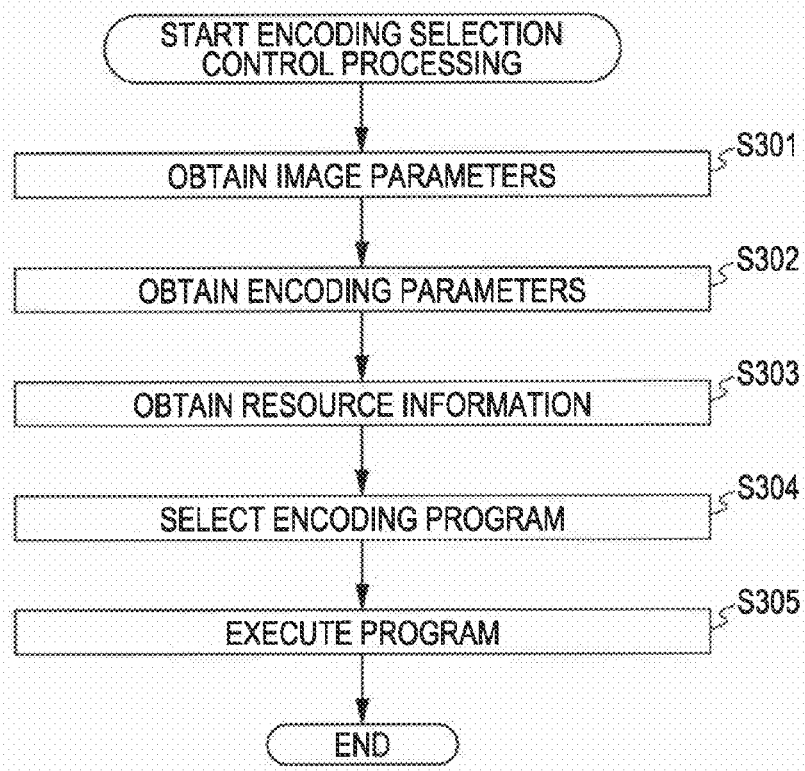
FIG. 40 is a flowchart describing another example of the flow of encoding selection control processing.

With the actual software program, the processing units of the encoding unit 700 with the H.246/AVC method shown in FIGS. 40 and 41 are each made up of multiple functions, so the sub CPU core 442 to allocate within each processing unit (process) can be changed, but if processing is not executable in parallel, the processing time cannot be shortened even if different sub CPU cores 442 are allocated thereto, and conversely, the processing may become even less effective.

In the case of a computer allocating CPU cores to automatically execute processing, as with some currently used computers, allocation is performed according to the state of load or the like, so the allocation of sub CPU cores 442 as described above is not necessarily performed, and in some cases the efficiency of the encoding processing may greatly decrease. Accordingly, even if the encoding unit 700 with the H.246/AVC method is used, decrease of encoding processing efficiency can be suppressed by preparing encoding programs beforehand wherein the hardware allocation pattern is set so as to perform efficient encoding processing. Also, encoding processing can be efficiently executed under an increasingly wide variety of conditions by preparing multiple encoding programs, each having different allocation patterns, and the encoding selection control unit 502 making a selection therefrom according to the conditions.

Note that although not shown in the diagram, hardware can be allocated to a decoding program realizing a decoding unit according to the H.246/AVC method corresponding to the encoding unit 700 shown in FIG. 41, with multiple patterns. That is to say, similar to the case in FIG. 30, with the decoding selection control unit 503 can select and execute a use decoding program from multiple decoding programs 547 prepared beforehand, each having a different hardware allocation pattern.

In the case of this decoding processing, similar to the case of the encoding processing, the decoding program has hardware allocation patterns set so as to efficiently perform decoding processing, and multiple such decoding programs are prepared beforehand wherein the allocation pattern differs for each, thereby enabling decoding processing to efficiently be executed under increasingly varied conditions.

Thus, by selecting a hardware resource allocation pattern appropriately according to the type of input image signal, parameters for encoding processing and decoding processing (required features such as latency and throughput), and usable hardware resources and so forth, encoding processing and decoding processing can be executed more efficiently under increasingly varied conditions.

The above-described series of processing may be executed with hardware or may be executed with software. For example, as shown in FIG. 11, the encoding unit 10 may be configured with one computation processing unit which performs the processing of a wavelet transformation unit 11, coefficient rearranging unit 14, and entropy encoding unit 15, and one storage unit wherein the midway calculation buffer unit 12 and coefficient rearranging buffer unit 13 are formed.

Similarly, as shown in FIG. 13, the encoding unit 10 may be configured with one computation processing unit which performs the processing of a wavelet transformation unit 11, coefficient rearranging unit 14, and entropy encoding unit 15, and one storage unit capable of reading and writing at high speed wherein the midway calculation buffer unit 12 is formed, and a second large-capacity storage unit wherein the coefficient rearranging buffer unit 13 is formed.

Also, similarly, as shown in FIG. 14, the encoding unit 10 may be configured with a first computation processing unit which performs the processing of a wavelet transformation unit 11-1, coefficient rearranging unit 14-1, and entropy encoding unit 15-1, a first storage unit capable of reading and writing at high speed wherein the midway calculation buffer unit 12-1 is formed, a second computation processing unit which performs the processing of a wavelet transformation unit 11-2, coefficient rearranging unit 14-2, and entropy encoding unit 15-2, a second storage unit capable of reading and writing at high speed wherein the midway calculation buffer unit 12-2 is formed, and a third storage unit of large capacity wherein the coefficient rearranging buffer unit 13-1 and coefficient rearranging buffer unit 13-2 are formed.

Further, similarly, as shown in FIG. 16, the encoding unit 10 may be configured with a first computation processing unit which performs the processing of a wavelet transformation unit 11-1, a first storage unit capable of reading and writing at high speed wherein the midway calculation buffer unit 12-1 is formed, a second computation processing unit which performs the processing of a coefficient rearranging unit 14-1 and entropy encoding unit 15-1, a third computation processing unit which performs the processing of the wavelet transformation unit 11-2, a second storage unit capable of reading and writing at high speed wherein the midway calculation buffer unit 12-2 is formed, a fourth computation processing unit which performs the processing of a coefficient rearranging unit 14-2 and entropy encoding unit 15-2, and a third storage unit of large capacity wherein the coefficient rearranging buffer unit 13-1 and coefficient rearranging buffer unit 13-2 are formed.

Similarly, as shown in FIG. 18, the decoding unit 20 may be configured with one computation processing unit which performs the various processing of the entropy decoding unit 21 and wavelet inverse transforming unit 23, and a storage unit wherein the coefficient buffer unit 22 is formed.

Also, similarly, as shown in FIG. 20, the decoding unit 20 may be configured with one computation processing unit which performs the various processing of the entropy decoding unit 21-1 and wavelet inverse transformation unit 23-1, a first storage unit wherein the coefficient buffer unit 22-1 is formed, a second computation processing unit which performs the various processing of the entropy decoding unit 21-2 and wavelet inverse transformation unit 23-2, and a second storage unit wherein a coefficient buffer unit 22-2 is formed.

Further, similarly, as shown in FIG. 22, the decoding unit 20 may be configured with one computation processing unit which performs the various processing of the entropy decoding unit 21-1, a second computation processing unit which performs the processing of the wavelet inverse transformation unit 23-1, a first storage unit wherein the coefficient buffer unit 22-1 is formed, a third computation processing unit which performs the processing of the entropy decoding unit 21-2, a fourth computing processing unit to perform processing of the wavelet inverse transformation unit 23-2, and a second storage unit wherein the coefficient buffer unit 22-2 is formed.

In the case of thus configuring the encoding unit 10 and decoding unit 20, similar effects to the above-described case for each software program can be obtained.

In the case of executing a string of processing with the software, the program making up the software thereof is installed in a computer built into dedicated hardware, or installed in a general-use personal computer for example whereby various types of functions can be executed by installing various types of programs, or installed in an information processing device of an information processing system made up of multiple devices from a program recording medium.

The recording medium may be configured of removable media 131 or removable media 311 configured separately from the device main unit as shown in FIGS. 10 and 28, which is distributed to users in order to distribute the program, such as magnetic disks (including flexible disks), optical disks (including CD-ROM (Compact Disk Read Only Memory) and DVD (Digital Versatile Disk), magneto-optical disks (including MD (Mini-Disk (a registered trademark))), or semiconductor memory or the like, on which the program is recorded, but is not restricted to such removable media, and may be configured of ROM 102, storage unit 123, hard disk included in the storage device 303, HDD 405, or the like, built into the device main unit so as to distribute the program to the user in that state.

Note that it goes without saying that the steps describing the program recorded in the recording medium with the present specification include a time-series arrangement in the order described, but is not limited to a time-series form, and processing executed in parallel or individually also is included.

Also, according to the present specification, the term "system" indicates the entirety of equipment configured of multiple devices.

Note that with the above-described, a configuration described as one device may be divided and configured as multiple devices. Conversely, a configuration described above as multiple devices may be configured together as one device. Also, a configuration other than the device configurations described above may be applied. Further, if the configuration and operation as an entire system are practically the same, a portion of the configuration of a certain device may be included in the configuration of another device. That is to say, the embodiments of the present invention are not limited to the above-described, and various modifications may be made within the scope of the spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device to execute programs performing an overall encoding process configured from a plurality of processes, comprising:
   a plurality of computation processing units;
   program storage means for storing a plurality of encoding programs wherein each encoding program separately defines an allocation method for allocating each of the plurality of processes of said encoding process to one or more of the computation processing units, such that there is at least one encoding program stored in which only one of the computation processing units is utilized to perform all of the plurality of processes and there is at least one encoding program stored in which more than one of the plurality of computation processing units is utilized to perform all of the plurality of processes;
   program selecting means for selecting an encoding program to be utilized in the event of executing the encoding process from the plurality of encoding programs stored within said program storage means, as a utilized encoding program; and
   program executing means for executing the encoding process employing the utilized encoding program selected with said program selecting means.

2. The information processing device according to claim 1, wherein said program selecting means selects said utilized encoding program in accordance with a number of usable computation processing units or memory capacity stored in said computing processing units.

3. The information processing device according to claim 1, wherein said program selecting means selects said utilized encoding program in accordance with image parameters of image data to be subjected to the encoding process.

4. The information processing device according to claim 1, wherein said program selecting means selects said utilized encoding program in accordance with encoding parameters in the event of encoding said image data.

5. The information processing device according to claim 1, wherein said program selecting means selects said utilized encoding program in accordance with the type of codec indicating an encoding processing method.

6. The information processing device according to claim 1, wherein said encoding process follows the MPEG (Moving Picture Experts Group) 2 standard or H.264/AVC (Advanced Video Coding) standard.

7. The information processing device according to claim 1, wherein said encoding process follows the JPEG (Joint Photographic Experts Group)2000 standard.

8. The information processing device according to claim 1, the plurality of processes making up said encoding process further comprising:
   filtering processing to perform filtering processing hierarchically as to said image data and generate a plurality of sub-bands made up of coefficient data broken down by each frequency band;
   intermediate data holding processing to hold intermediate data generated midway in said filtering processing;
   coefficient holding processing to hold said coefficient data generated with said filtering processing;
   coefficient rearranging processing to rearrange said coefficient data held by said coefficient holding processing so as to output said coefficient data in a predetermined order; and
   entropy encoding processing to entropy encode said coefficient data, the order of which has been rearranged by said coefficient rearranging processing.

9. The information processing device according to claim 8, said allocation method of at least one of the encoding programs further including:
   a pattern to execute said filtering processing, said coefficient rearranging processing, and said entropy encoding processing by using a shared computation processing unit.

10. The information processing device according to claim 9, said allocation method of at least one of the encoding programs further including:
    a pattern to execute said filtering processing, said coefficient rearranging processing, and said entropy encoding processing by using said shared computation processing unit as to any of luminance components and color difference components of said image data.

11. The information processing device according to claim 9, said allocation method of at least one of the encoding programs further including:
    a pattern to execute said filtering processing, said coefficient rearranging processing, and said entropy encoding processing by using different computation processing units for processing as to luminance components of said image data and for processing as to color difference components of said image data.

12. The information processing device according to claim 1, said allocation method of at least one of the encoding programs further including:
    a pattern to execute said filtering processing, said coefficient rearranging processing, and said entropy encoding processing by using different computation processing units.

13. An information processing method for an information processing device, that includes a plurality of computation processing units, to execute programs performing an overall encoding process configured from a plurality of processes, comprising the steps of:
    storing, at a storage unit, a plurality of encoding programs wherein each encoding program separately defines an allocation method for allocating each of the plurality of processes of said encoding process to one or more of the computation processing units, such that there is at least one encoding program stored in which only one of the computation processing units is utilized to perform all of the plurality of processes and there is at least one encoding program stored in which more than one of the plurality of computation processing units is utilized to perform all of the plurality of processes;
    selecting an encoding program to be utilized in the event of executing the encoding process from the plurality of encoding programs which are stored beforehand in the storage unit; and
    executing the encoding process by employing the selected utilized encoding program.

14. An information processing device to execute decoding programs performing an overall decoding process configured from a plurality of processes, comprising:
    a plurality of computation processing units;

program storage means for storing a plurality of decoding programs wherein each encoding program separately defines an allocation method for allocating each of the plurality of processes of said decoding process to one or more of the computation processing units, such that there is at least one decoding program stored in which only one of the computation processing units is utilized to perform all of the plurality of processes and there is at least one decoding program stored in which more than one of the plurality of computation processing units is utilized to perform all of the plurality of processes;

program selecting means for selecting a decoding program to be utilized in the event of executing the decoding process from the plurality of decoding programs stored within said program storage means, as a utilized decoding program; and program executing means for executing the decoding process employing the utilized decoding program selected with said program selecting means.

15. The information processing device according to claim 1, the plurality of processes making up said decoding process further comprising:

entropy decoding processing to entropy decode said encoded data and generate coefficient data for the plurality of sub-bands subjected to hierarchical filtering processing as to image data and broken down by frequency band;

coefficient holding processing to hold said coefficient data generated by said entropy decoding processing; and filtering processing to perform filtering processing by reading out said coefficient data held by said coefficient holding processing, and generate image data by synthesizing the coefficient data of the plurality of sub-bands broken down by frequency bands.

16. An information processing method for an information processing device, that includes a plurality of computation processing units, to execute decoding programs performing an overall decoding process configured from a plurality of processes, comprising the steps of:

storing, at a storage unit, a plurality of decoding programs wherein each decoding program separately defines an allocation method for allocating each of the plurality of processes of said encoding process to one or more of the computation processing units, such that there is at least one decoding program stored in which only one of the computation processing units is utilized to perform all of the plurality of processes and there is at least one decoding program stored in which more than one of the plurality of computation processing units is utilized to perform all of the plurality of processes;

selecting a decoding program to be utilized in the event of executing the decoding process as a utilized decoding program from the plurality of decoding programs which are stored beforehand in the storage unit; and executing the decoding process by employing the selected utilized decoding program.

17. An information processing device to execute programs performing an overall encoding process configured from a plurality of processes, comprising:

a plurality of computation processing units;

a program storage unit to store a plurality of encoding programs wherein each encoding program separately defines an allocation method for allocating each of the plurality of processes of said encoding process to one or more of the computation processing units, such that there is at least one encoding program stored in which only one of the computation processing units is utilized to perform all of the plurality of processes and there is at least one encoding program stored in which more than one of the plurality of computation processing units is utilized to perform all of the plurality of processes;

a program selecting unit to select an encoding program to be utilized in the event of executing the encoding process from the plurality of encoding programs stored within said program storage unit, as a utilized encoding program; and a program executing unit to execute the encoding process employing the utilized encoding program selected with said program selecting unit.

18. An information processing device to execute decoding programs performing an overall decoding process configured from a plurality of processes, comprising:

a program storage unit to store a plurality of decoding programs wherein each encoding program separately defines an allocation method for allocating each of the plurality of processes of said decoding process to one or more of the computation processing units, such that there is at least one decoding program stored in which only one of the computation processing units is utilized to perform all of the plurality of processes and there is at least one decoding program stored in which more than one of the plurality of computation processing units is utilized to perform all of the plurality of processes;

a program selecting unit to select a decoding program to be utilized in the event of executing the decoding process from the plurality of decoding programs stored within said program storage unit, as a utilized decoding program; and a program executing unit to execute the decoding process employing the utilized decoding program selected with said program selecting unit.

19. The information processing device according to claim 1, wherein each of the plurality of computation processing units is configured to provide a wavelet transformation unit, a coefficient rearranging unit, and an entropy encoding unit.

* * * * *